United States Patent
Zhao et al.

(10) Patent No.: US 11,487,273 B1
(45) Date of Patent: Nov. 1, 2022

(54) DISTRIBUTED INDUSTRIAL ENERGY OPERATION OPTIMIZATION PLATFORM AUTOMATICALLY CONSTRUCTING INTELLIGENT MODELS AND ALGORITHMS

(71) Applicant: DALIAN UNIVERSITY OF TECHNOLOGY, Liaoning (CN)

(72) Inventors: Jun Zhao, Dalian Liaoning (CN); Feng Jin, Dalian Liaoning (CN); Long Chen, Dalian Liaoning (CN); Fan Zhou, Dalian Liaoning (CN); Zhongyang Han, Dalian Liaoning (CN); Yang Liu, Dalian Liaoning (CN); Wei Wang, Dalian Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/569,671

(22) Filed: Jan. 6, 2022

(30) Foreign Application Priority Data

Apr. 30, 2021 (CN) .......................... 202110478283.0

(51) Int. Cl.
*G05B 19/418* (2006.01)
(52) U.S. Cl.
CPC ... *G05B 19/41885* (2013.01); *G05B 19/4183* (2013.01); *G05B 19/41865* (2013.01); *G05B 2219/25387* (2013.01)
(58) Field of Classification Search
CPC .......... G05B 19/41885; G05B 19/4183; G05B 19/41865; G05B 2219/25387
See application file for complete search history.

(56) References Cited

U.S. PATENT DOCUMENTS

| | | | | |
|---|---|---|---|---|
| 7,552,100 B2 * | 6/2009 | Chen | ........................ | G06N 3/02 |
| | | | | 706/26 |
| 8,321,187 B2 * | 11/2012 | Kaufman | ................ | G06F 30/20 |
| | | | | 703/6 |

(Continued)

OTHER PUBLICATIONS

Tao, L., et al. "A Hybrid LSSVM Model with Empirical Mode Decomposition and Differential Evolution for Forecasting Monthly Precipitation" American Meteorological Society, pp. 159-176 (2017) (Year: 2017).*

(Continued)

*Primary Examiner* — Jay Hann
(74) *Attorney, Agent, or Firm* — Muncy, Geissler, Olds & Lowe, P.C.

(57) ABSTRACT

A distributed industrial energy operation optimization platform which is capable of automatically constructing intelligent models and algorithms, is divided into three parts: a modeling terminal, a background service and a human-computer interface. The models like data pre-processing, energy generation-consumption-storage trend forecasting and optimal scheduling decision models are encapsulated in the modeling terminal as different visualization modules facing with multiple categories production scenarios, by dragging which the complex functional models can be realized conveniently. The background service is capable of automatically constructing the training samples and the production plans/manufacturing signals series according to the device model requirements of each edge side, interacts with the trained intelligent models through corresponding interfaces, and the computing results are saved in the specified relational database. The computing results are displayed through a friendly customer human-computer interface, and the real-time state of current working condition can also be adjusted.

8 Claims, 19 Drawing Sheets

(56) References Cited

U.S. PATENT DOCUMENTS

| | | | |
|---|---|---|---|
| 10,372,118 B2 * | 8/2019 | Li | G05B 19/41885 |
| 10,747,213 B2 * | 8/2020 | Ryu | G05B 19/41885 |
| 11,003,175 B2 * | 5/2021 | Xenos | G05B 19/41885 |

OTHER PUBLICATIONS

Pena, J., et al. "Optimal Scheduling of a By-Product Gas Supply System in the Iron-and Steel-Making Process Under Uncertainties" Computers & Chemical Engineering, vol. 125, pp. 351-364 (2019) (Year: 2019).*

Fung, D. S. "Methods for the estimation of missing values in time series" Thesis, Edith Cowan U. (2006) (Year: 2006).*

Sun et al., "Research on Energy Management for Multi-Energy Flow: Challenges and Prospects," (2016) Automation of Electric Power System, 40(15): 1-8, 9 pages.

Zhao et al., "Data-Based Predictive Optimization for Byproduct Gas System in Steel Industry," IEEE Transactions on Automation Science and Engineering, vol. 14, No. 4, Oct. 2017, 10 pages.

Wang et al., "Adaptive Granulation-Based Prediction for Energy System of Steel Industry," IEEE Transactions on Cybernetics, vol. 48, No. 1, Jan. 2018, 12 pages.

Shamshirband et al., "Heat load prediction in district heating systems with adaptive neuro-fuzzy method," Renewable and Sustainable Energy Reviews 48 (2015) 760-767, 8 pages.

Dinesh et al., "Residential Power Forecasting Using Load Identification and Graph Spectral Clustering," IEEE Transactions on Circuits And Systems—II: Express Briefs, vol. 66, No. 11, Nov. 2019, 5 pages.

Fliess et al., "Prediction bands for solar energy: New short-term time series forecasting techniques," Solar Energy 166 (2018) 519-528, 10 pages.

Zhao et al., "Granular Model of Long-Term Prediction for Energy System in Steel Industry," IEEE Transactions on Cybernetics, vol. 46, No. 2, Feb. 2016, 13 pages.

Li et al., "Prediction and optimal operation on byproduct gas system in steel enterprises," Iron and Steel vol. 51, No. 8, Aug. 2016, 9 pages.

Dan et al., "Research on stochastic optimal scheduling model for electric-thermal integrated system considering thermal storage characteristics of heating system," (2020) Renewable Energy Sources, 38(3): 380-387, 8 pages.

Xu et al., "Safe and optimized scheduling of power system considering demand response," Control and Decision, vol. 33, No. 3, Mar. 2018, 8 pages.

Jin et al., "A joint scheduling method for multiple byproduct gases in steel industry," Control Engineering Practice 80 (2018) 174-184, 11 pages.

Jin et al., "Granular-Causality-Based Byproduct Energy Scheduling for Energy-Intensive Enterprise," IEEE Transactions on Automation Science and Engineering, vol. 17, No. 4, Oct. 2020, 12 pages.

Tan et al., "Research on testing technology of control device based on RTLAB for flexible distribution network," (2019) Power Big Data, 22(7): 1-8, 8 pages.

Starkloff et al., "Development and validation of a dynamic simulation model for a large coal-fired power plant," Applied Thermal Engineering 91 (2015) 496-506, 11 pages.

Liuliang QIU, "Operation simulation and optimal analysis of distributed energy system based on TRNSYS," (2017) Dissertation for Master's Degree, Shanghai University of Electric Power, 75 pages.

Voropai et al., "Simulation Approach to Integrated Energy Systems Study Based on Energy Hub Concept," (2019) IEEE Powertech Conference, 5 pages.

\* cited by examiner

DISTRIBUTED INDUSTRIAL ENERGY OPERATION OPTIMIZATION PLATFORM AUTOMATICALLY CONSTRUCTING INTELLIGENT MODELS AND ALGORITHMS

TECHNICAL FIELD

The present invention belongs to the technical field of information, relates to the technologies of data-driven modeling, multi-objective optimization and edge-cloud cooperation, and is a distributed industrial energy operation optimization platform which is capable of automatically constructing intelligent models and algorithms. The platform is divided into three parts: a modeling terminal, a background service and a human-computer interface. The models like data pre-processing, energy generation-consumption-storage trend forecasting and optimal scheduling decision models are encapsulated in the modeling terminal as different visualization modules facing with multiple categories production scenarios, by dragging which the complex functional models can be realized conveniently. The background service is capable of automatically constructing the training samples and the production plans/manufacturing signals series according to the device model requirements of each edge side, interacts with the trained intelligent models through corresponding interfaces, and the computing results are saved in the specified relational database. The computing results are displayed through a friendly customer human-computer interface, and the real-time state of current working condition can also be adjusted, then provide feedback to the cloud server, which can quickly trigger the parameter updating of each edge side model to make the model quickly adapt to the change of the working condition, so as to realize the edge-cloud cooperation of the platform. The platform of the present invention has the advantages of conveniently operation, short modeling cycle and high computing efficiency, and can be widely applied to energy forecasting and optimal scheduling of the integrated energy system of an industrial park.

BACKGROUND

As the world energy crisis and the environmental pollution become more and more serious, the improvement of comprehensive energy utilization efficiency has become the focus of all countries in the world. The research on the integrated energy system containing various energy chains such as cold, heat, power and gas has gradually become one of the hot spots in the energy field (Sun Hongbin, Pan Zhaoguang, Guo Qinglai (2016). Research on Energy Management for Multi-Energy Flow: Challenges and Prospects [J]. Automation of Electric Power System, 40(15): 1-8). As an important part of social production and energy consumption, industrial parks have the advantages of complementary industrial processes and complementary energy supply and demand and can promote the formation of emerging industrial bases and boost local economic and social development, and thus gradually become important gathering places for domestic science and technology development. However, traditional industrial parks focus on production rather than energy, resulting in loose connection and independent control of various energy media, low comprehensive operational energy efficiency, high cost and great influence on the environment. On the premise of complete energy devices, accurate modeling, trend forecasting and optimal scheduling for energy generation-consumption-storage become an important means of energy conservation and emission reduction as well as cost reduction and efficiency increase (J. Zhao, C. Y. Sheng, W. Wang, W. Pedrycz, Q. L. Liu. (2017). Data-based predictive optimization for byproduct gas system in steel industry [J]. IEEE Transactions on Automation Science and Engineering, 14(4): 1761-1770).

The pipe network of the industrial energy system is widely distributed and complicated, and it is increasingly difficult to establish a model based on physical and chemical mechanisms, and the accuracy cannot be guaranteed with the aging of devices. With the rapid development of industry informatization, the energy control centers in the parks have accumulated massive operation data of production and energy, providing strong support for data-driven methods. In recent years, data-driven methods have been provided for modeling industrial energy systems, such as gas system (T. Y. Wang, Z. Y. Han, J. Zhao, W. Wang. (2018). Adaptive granulation-based prediction for energy system of steel industry [J]. IEEE Transactions on Cybernetics, 48(1): 127-138), steam system (S. Shamshirband, D. Petkovie, R. Enayatifar, A. H. Abdullah, D. Markovic, M. Lee, R. Ahmad. (2015). Heat load prediction in district heating systems with adaptive neuro-fuzzy method [J]. Renewable and Sustainable Energy Reviews, 48: 760-767) and power system (C. Dinesh, S. Makonin, I. V. Bajić. (2019). Residential Power Forecasting Using Load Identification and Graph Spectral Clustering [J]. IEEE Transactions on Circuits and Systems II: Express Briefs, 66(11): 1900-1904). In view of the feature that different energy response time scales are different, short-term energy modeling (M. Fliess, C. Join, C. Voyant. (2018). Prediction bands for solar energy: New short-term time series forecasting techniques [J]. Solar Energy, 166: 519-528) and long-term energy modeling (J. Zhao, Z. Y. Han, W. Pedrycz, W. Wang. (2016). Granular model of long-term prediction for energy system in steel industry [J]. IEEE Transactions on Cybernetics, 46(2): 388-400) are provided. However, the above research is mostly for modeling of single-energy systems without considering mutual coupling under the condition of multiple energy chains. For the optimal scheduling, researchers have studied single-energy systems such as internal by-product gas system (Li Hongjuan, Xiong Wenzhen. Forecasting and optimal scheduling of byproduct gas in steel industry, [J]. Steel, 2016, 51(8): 90-98), thermal system (Zhou Dan, Sun Ke, Zheng Chaoyang, Chen Xixiang, Zheng Weimin. (2020). Research on stochastic optimal scheduling model for electric-thermal integrated system considering thermal storage characteristics of heating system [J]. Renewable Energy Sources, 38(3): 380-387) and power system (Xu Qingshan, Ding Yifan, Zheng Aixia, (2018). Optimal scheduling model for power grid security considering demand response [J]. Control and Decision, 33(3): 549-556). In addition, the scheduling method for coupling of multiple gas media (F. Jin, J. Zhao, Z. Y. Han, W. Wang. (2018). A joint scheduling method for multiple byproduct gases in steel industry [J]. Control Engineering Practice, 80: 174-184) and the long-term scheduling method with discrete production characteristic processes (F. Jin, L. Q. Wang, J. Zhao, W. Wang, Q. L. Liu. (2020). Granular-causality-based byproduct energy scheduling for energy-intensive enterprise [J]. IEEE Transactions on Automation Science and Engineering, in press) are also studied correspondingly. The above methods provide a solution for the operation optimization of energy systems, but the global dynamic optimization of energy in the whole parks has not been realized.

At present, for the modeling of each energy system, researchers have developed corresponding software platforms, such as RT-LAB for power flow analysis (Tan Zhukui, Xu Yutao, Ban Guobang, Lv Qiansu, Yuan Xufeng, Xie Baiming, Cao Mingjie. (2019). Research on testing technology of control device based on RTLAB for flexible distribution network [J]. Power Big Data, 22(7): 1-8), APROS for dynamic simulation of heat supply network (R. Starkloff, F. Alobaid, K. Kamer, B. Epple, M. Schmitz, F. Boehm. (2015). Development and validation of a dynamic simulation model for a large coal-fired power plant [J]. Applied Thermal Engineering, 91: 496-506), TRNSYS (Qiu Liuliang. (2017). Operation simulation and optimal analysis of distributed energy system based on TRNSYS [D]. Shanghai University of Electric Power.) and Simulink for dynamic simulation of gas network (N. Voropai, E. Ukolova, D. Gerasimov, K. Suslov, P. Lombardi, P. Komarnicki. (2019). Simulation approach to integrated energy systems study based on energy hub concept [C]. IEEE Powertech Conference). However, the above platforms only provide the real-time simulation function of the system, and cannot judge the future operation trend of the energy systems or give reasonable optimal scheduling suggestions.

SUMMARY

In order to improve the modeling efficiency and accuracy of the industrial integrated energy system and provide real-time, accurate and optimal guidance and suggestions for energy control personnel, the present invention proposes a distributed industrial energy operation optimization platform which is capable of automatically constructing intelligent models and algorithms. The platform comprises two parts: a software system and a hardware controller which are respectively deployed on the enterprise cloud and the edge side of a device, with the distributed operation architecture shown in FIG. 1. The platform mainly comprises three parts: a modeling terminal, a background service and a human-computer interface, which support each other in functions. In the industrial cloud, the main part is an instruction receiving and processing module. At the edge computing end, the operation architecture is shown in FIG. 2.

Starting from business scenarios, the modeling terminal is the core part of the whole platform, and highly integrates complex mathematical models in the form of visualization modules. In consideration of obvious difference in features of heterogeneous energy flow in the industrial production process, a general intelligent module for multiple production scenarios (e.g. steel making, iron making, etc.), multiple response scales (e.g. short term, medium term, etc.), multiple display modes (e.g., numerical, interval, etc.) and multiple working conditions switching (such as wind break, wind reduction, etc.) is provided. Complex models can be built and trained by logic splicing based on services by means of drag and drop. Meanwhile, an adaptive algorithm is embedded in each module to dynamically optimize parameters, thus ensuring the adaptive and generalization abilities of models. Then, the built models can be saved as separate "*.iail" files for repeated invocation. The modeling terminal is divided into a data pre-processing module, an energy generation-consumption-storage trend forecasting module, an optimal scheduling decision module, a parameter optimization configuration module and a result display module, and each module comprises a plurality of models for different working condition scenarios, wherein The data pre-processing module: comprises filtering, missing value fill and outlier detection models;

The energy generation-consumption-storage trend forecasting module: supports multi-scale (long term, medium term, short term, etc.) and multi-modal (point and interval) forecasting under different scenarios (periodic, aperiodic, etc.);

The scheduling decision module: provides an economic optimal scheduling scheme for an industrial energy system (gas, oxygen, steam, power, etc.) based on the results of the above trend forecasting;

The parameter optimization configuration module: as an auxiliary module, can update parameters adaptively according to samples to achieve the optimum effect;

The result display module: as an auxiliary module, provides forecast effects, scheduling scheme simulation effects and other visual displays through a figure/table module.

The modeling terminal supports the following two interactive modes, as shown in FIG. 3:

(1) On-line model computing: this interactive mode realizes the integration of model training and computing processes. In this interactive mode, a user gets access to the original data through an interface, then automatically completes model training and parameter optimization according to the built logic, and displays the results through the figure/table module. The model is not saved, and will be retrained in the next computing;

(2) Off-line model computing: in this interactive mode, model training and computing are two independent processes. In the real-time computing process, an off-line model obtained by training of historical data is invoked, the parameters of the model are fixed, and the computing process is not updated.

With regard to the two interactive modes of on-line model computing and off-line model computing, the former can better obtain patterns or features in new data because of running in the real-time on-line environment; and for the latter, the model is trained off-line and has good timeliness, but needs periodic updating. In addition, the platform has better compatibility and can run in major operating systems such as Windows7/10 and Linux. The platform supports customized participation and realizes the intervention in model training and computing processes by means of parameter setting. A model file is developed in Python and subjected to interface encapsulation through C++, providing an invocation interface for commonly used programming languages such as C# and Java.

The background service is respectively deployed on the cloud and the edge side. The edge side service performs real-time computing by reading and serializing information such as industrial operation data and production plans/signals, then building training samples according to the standardized format and invoking the saved "*.iail" model file interface, and saves the results in the relational database. The cloud service receives the foreground trigger information and the working conditions switching signals obtained by analysis of the edge side, so as to trigger the edge side model for self-updating to realize the adaptive adjustment of parameters of the model.

The human-computer interface realizes the friendly interface display of the computed result of the model. The interface is refreshed every minute to update the computed result in time. In the case of temporary adjustment of working conditions, the information is fed back to the cloud through human-machine interaction, and the cloud service will trigger the adaptive optimization of the parameters of the edge side model, so as to better meet the actual demand.

The technical solution of the present invention is as follows:

A distributed industrial energy resource operation optimization platform automatically building intelligent models and algorithms, comprises the following steps:

(1) A platform-based modeling terminal builds the required filtering, filling, forecasting and scheduling models by means of visual drag and drop, and saves the models as intelligent model files;

(2) A background service is deployed on the cloud and each edge side. The edge side service reads actual industrial data, builds training samples according to the standardized format, invokes a model file interface, performs real-time computing based on auxiliary information such as real-time data and production plans/signals, and saves the results in the relational database; and the cloud service receives the foreground trigger information and the working conditions switching signals obtained by analysis of the edge side, so as to trigger the edge side model for self-updating;

(3) A human-computer interface is deployed on each edge side, realizing the friendly interface display of the computed result of the model. In the case of temporary change of working conditions, the information can be fed back to the cloud service through human-machine interaction to trigger the self-updating of the parameters of the model.

The present invention has the following beneficial effects:

The present invention establishes a distributed industrial energy resource operation optimization platform automatically building intelligent models and algorithms, takes the intelligent model established by the modeling terminal as the basis for analysis and computing of the background service and the human-computer interface, and realizes high efficiency, precision, flexibility and safety of industrial systems by means of edge-cloud cooperation. It is verified through operation in actual industrial fields that the platform can greatly improve the development efficiency and accuracy of complex business logic models, reduce the development cost, and provide reliable support for the optimal scheduling of the integrated energy system.

DETAILED DESCRIPTION

Figure 1:
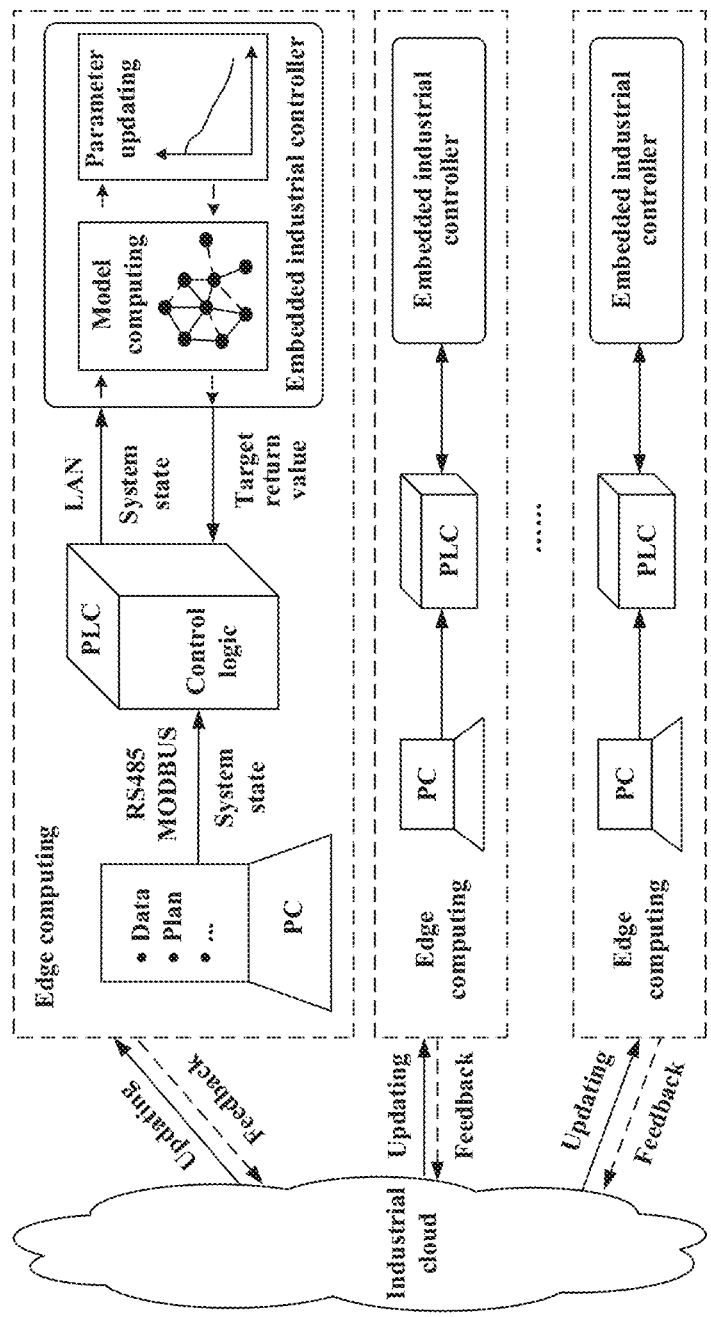
FIG. 1 shows a distributed operation architecture of an industrial energy resource operation optimization platform.
Figure 2:
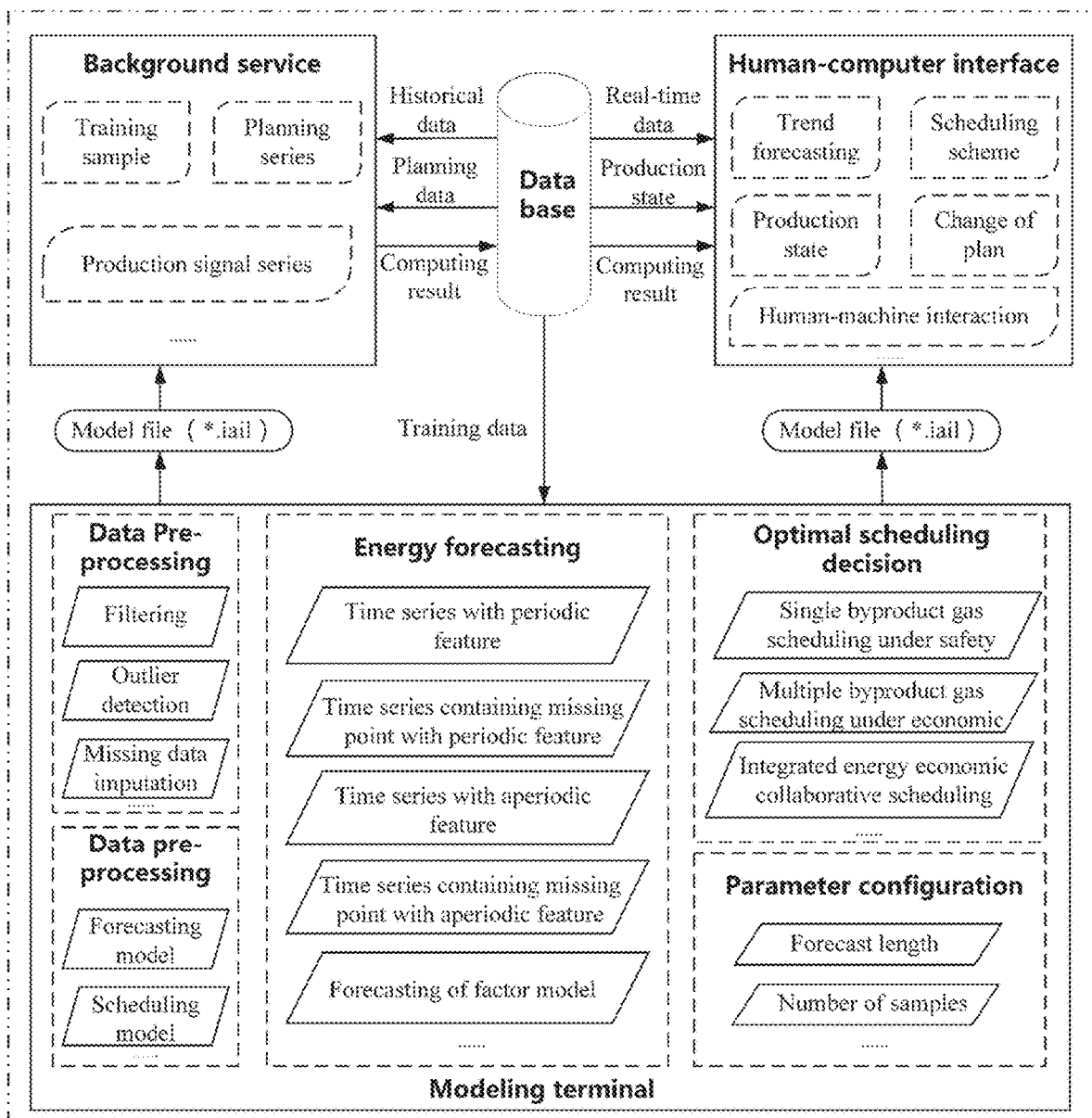
FIG. 2 is an operation architecture diagram of interaction of a background service on an edge side, a human-computer interface and an intelligent model.
Figure 3:
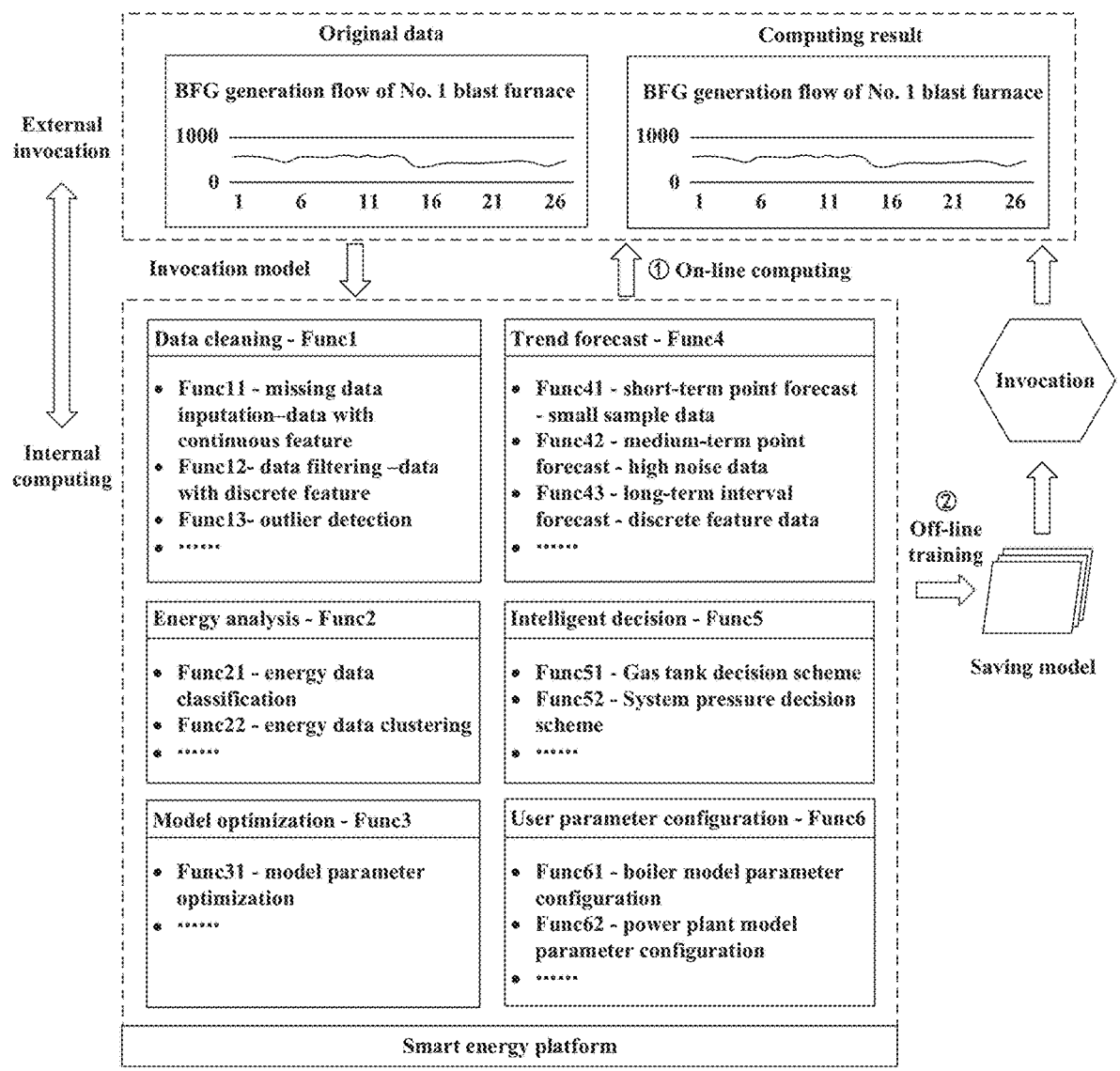
FIG. 3 is a diagram showing on-line and off-line interactive modes of a modeling terminal.
Figure 4:
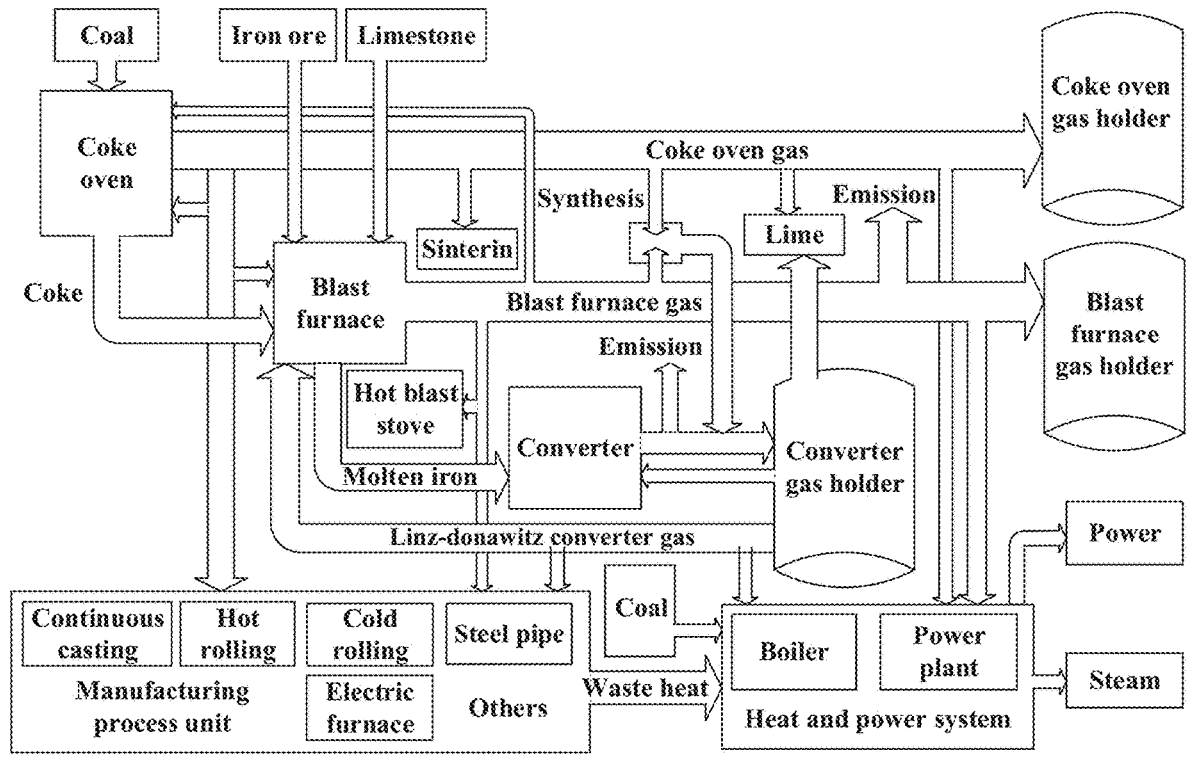
FIG. 4 is a structural diagram of an integrated energy system of a large domestic steel enterprise.

To better understand the technical route and implementation solution of the present invention, with data pre-processing, generation-consumption-storage trend forecasting and multi-energy flow optimal scheduling processes of an energy system of a large domestic steel enterprise as an example, the algorithm of the modeling terminal and the hardware design of an embedded industrial controller of the background service on the edge side of the platform are described in detail. The energy system comprises multiple energy flows such as steam, gas and power, as shown in FIG. 4. As important secondary energy for steel enterprises, byproduct gas can replace primary energy (natural gas) in many links due to the advantages of high calorific value and low cost. Therefore, accurate forecasting and optimal scheduling of the whole process of generation-consumption-storage are of great significance for enterprises to conserve energy, reduce emissions, reduce costs and increase efficiency.

(1) Modeling terminal: data pre-processing, energy generation-consumption-storage trend forecasting and multi-energy flow optimal scheduling model The historical data of the capacity, the total generated flow and the total consumption flow of the gas system are subjected to filtering, missing value fill and outlier correction by a data pre-processing module, and trained as the input of a forecasting model. The parameters are updated adaptively, so as to obtain a forecasting model with the corresponding capacity. Furthermore, with gas capacity safety, steam demand and adjustable user load capacity as constraint conditions and with economy as the target, an optimal scheduling model of an integrated energy system can be built by logic splicing of the modules, and a reasonable scheduling proposal can be given. The following is the sub-working condition processing algorithm of each module required to build the optimal scheduling model of an integrated energy system.

1) Data Pre-Processing

Filtering

Considering that process data such as energy and production actually acquired in industry generally contain noise, it is necessary to filter the data first to reduce the influence of noise on data forecasting and other results. For real-time data (such as square wave data and data containing white noise) of different working condition scenarios, different intelligent methods are integrated into a filtering module to achieve targeted filtering for different feature data and improve the filtering reliability.

Figure 5:
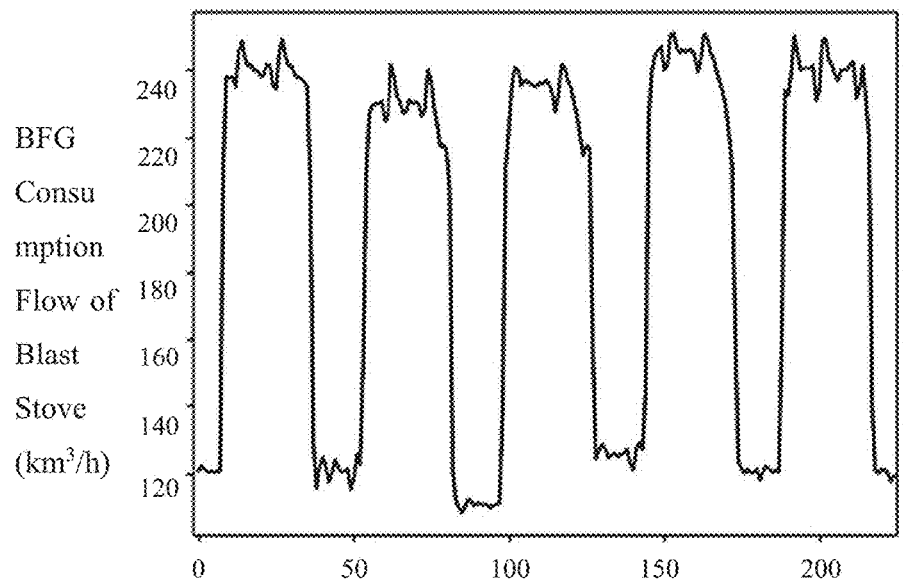
FIG. 5 is a data feature map of working condition scenarios of a square wave.

For working condition scenarios with square wave features in the production process, the feature data are obvious. The BFG consumption flow of a blast furnace hot blast stove shown in FIG. 5 is a typical square wave feature scenario. The present invention adopts a moving average filtering method. For the time series $X^f$ with $M^f$ samples, the formula is shown in formula (1):

$$\overline{X} = \frac{1}{N^f} \sum_{i^f=n^f-N^f+1}^{n^f} X_{i^f}^f, n^f = N^f, N^f+1, \ldots, M^f \quad (1)$$

wherein $\overline{X}$ is the average value of sampling values at the past $N^f$ ($N^f<M^f$) moments, and $X^f_{i^f}$ is a sampling value at the $(i^f)^{th}$ sampling moment. A temporary storage area for $N^f$ pieces of data is correspondingly opened in a storage area. Each newly sampled datum is saved in the temporary storage area, and the oldest datum is removed at the same time, so as to continuously update and iterate sampled data and realize filtering.

For working condition scenarios with continuous production features, the data generally contain white noise. The present invention adopts an empirical mode decomposition (EMD) method to process the acquired data. In the method, selective reconstruction is carried out on the intrinsic mode function (IMF) to realize denoising and provide support for improving forecasting accuracy. The calculation steps are as follows:

Step 1: calculating all extreme points of a signal series. Respectively connecting local maximum points and minimum points through cubic spline curves to form an upper envelope and a lower envelope, and calculating a new signal $h_1^1(t)$ with low frequency signals removed, as shown in formula (2):

$$h_1^1(t) = x^{fc}(t) - \overline{m}_1^{fc}(t) \quad (2)$$

wherein $\overline{m}_1^{fc}(t)$ is the average value of the upper envelope and the lower envelope at the moment t, and $x^{fc}(t)$ is the original acquisition series. During the decomposition process, IMF is required to satisfy two conditions, i.e., on the whole signal, the difference between the number of extreme points and the number of zero crossing points is not more than 1, and the average value of the upper envelope and the lower envelope at any point is 0. If $h_1^1(t)$ is satisfactory, $h_1^1(t)$ can be considered as the first IMF component $IMF_1(t)$ of $x^{fc}(t)$, or $h_1^1(t)$ can be used as original data for repeated calculation.

Step 2: supposing the $(n^{fc})^{th}$ IMF component $IMF_{n^{fc}}(t)$. When the margin $r_{n^{fc}}^{fc}(t)$ is less than the preset value and is a monotonic function or a constant, the calculation ends. At this moment, the original signal can be expressed in the form of formula (3):

$$x^{fc}(t) = \sum_{i^{fc}=1}^{n^{fc}} IMF_{i^{fc}}(t) + r_{n^{fc}}^{fc}(t) \quad (3)$$

wherein $r_{n^{fc}}^{fc}(t)$ is a signal average trend or a trend item of the average value. According to the continuous mean-square error criterion, an appropriate order $k^{fc}$ is selected to reconstruct the signal, and finally, the filtered reconstructed signal $\tilde{x}^{fc}(t)$ can be obtained, as shown in formula (4):

$$\tilde{x}^{fc}(t) = \sum_{j^{fc}=k^{fc}+1}^{n^{fc}} IMF_{j^{fc}}(t) \quad (4)$$

Figure 6A:
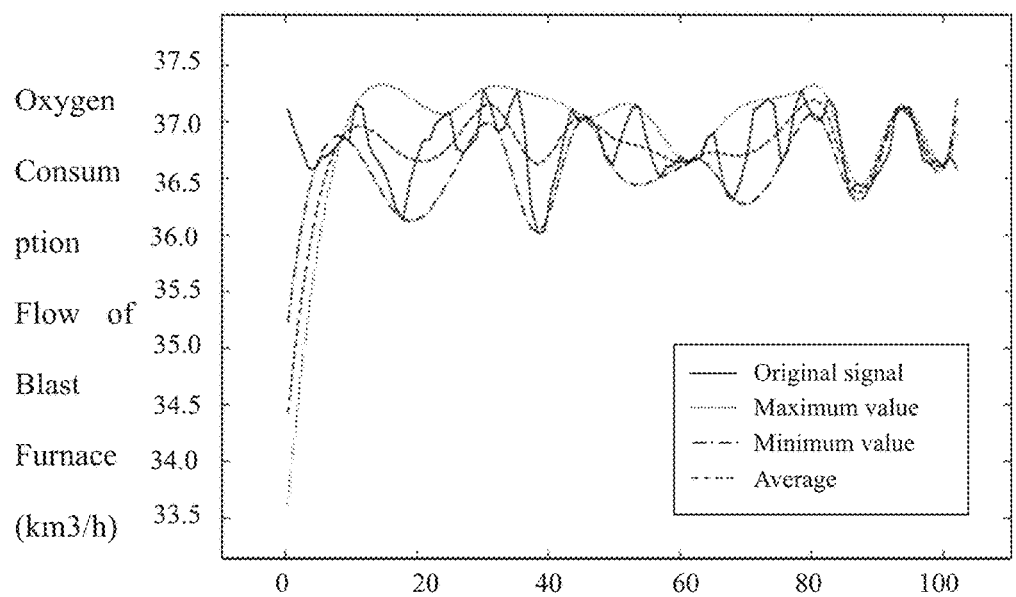
FIG. 6(a) is an envelope diagram of EMD filtering of oxygen flow of a blast furnace.
Figure 6B:
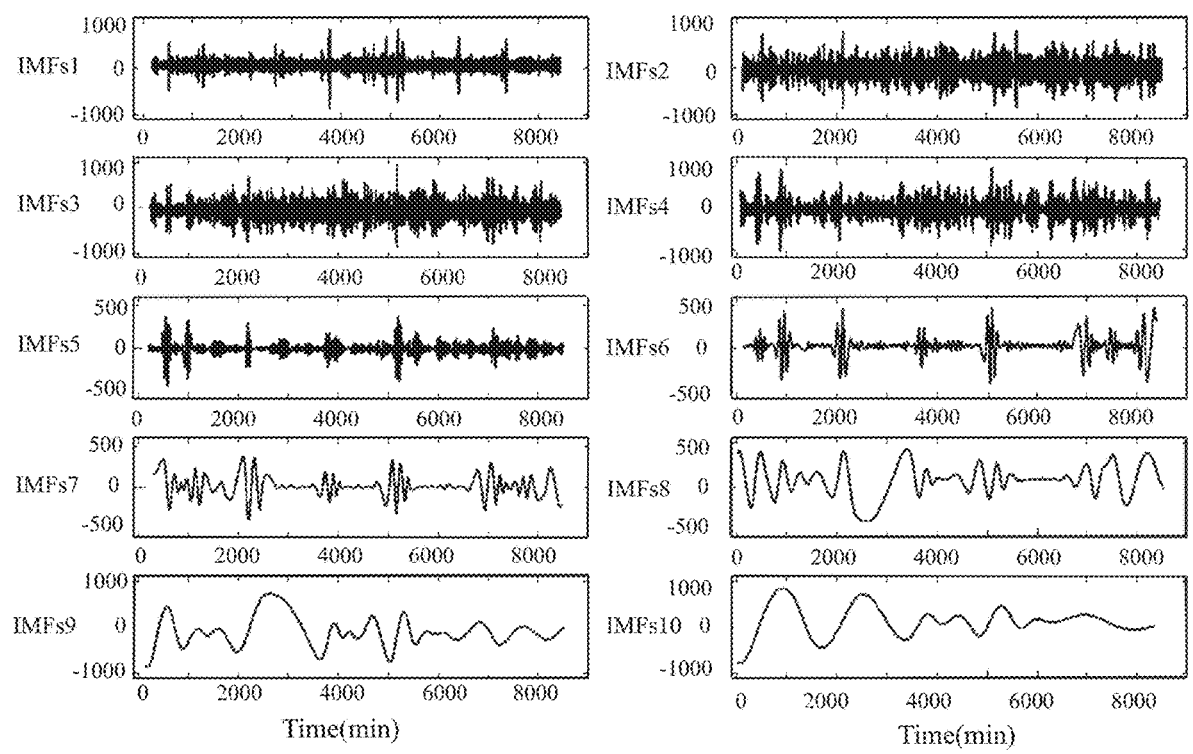
FIG. 6(b) is an IMF exploded view of EMD filtering of oxygen flow of a blast furnace.
Figure 7:
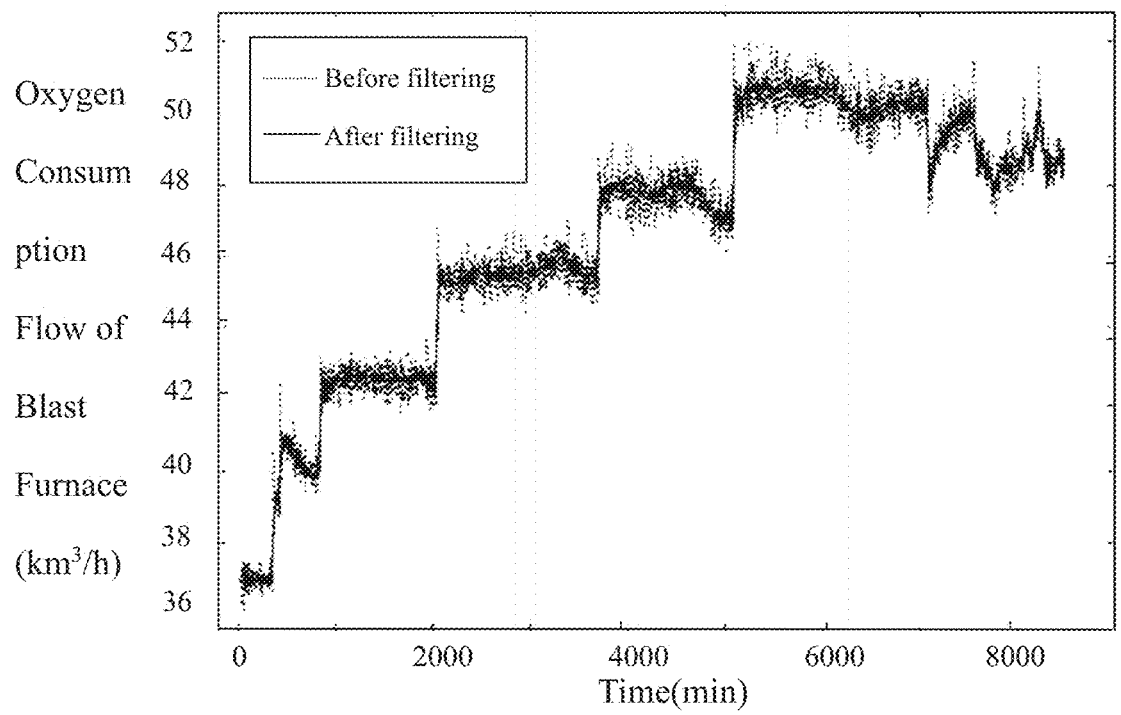
FIG. 7 shows an EMD filtering effect of oxygen flow of a blast furnace.

The data of oxygen flow of a blast furnace of a steel enterprise are adopted to conduct a contrast experiment. FIG. 6(a) and FIG. 6(b) are respectively an envelope diagram and an IMF exploded view of EMD filtering of oxygen flow of a blast furnace. The original signal is processed and decomposed into ten IMF components and residual components. Each IMF component is shown in FIG. 6(b). FIG. 7 is an actual effect diagram after filtering with EMD in combination with a continuous mean square error. Results show that outliers and noises in the data are filtered out after being filtered by the platform, which can provide a good data basis for the subsequent energy forecasting and optimal scheduling.

Outlier Detection

Due to long transmission distance, complex pipe network and violent fluctuation in generation and consumption of the industrial energy system, data exceptions easily occur under the influence of environment and sensor in the data acquisition process. The present invention builds corresponding outlier detection models respectively for working condition scenarios with class period and aperiodic characteristics of the data.

Figure 8:
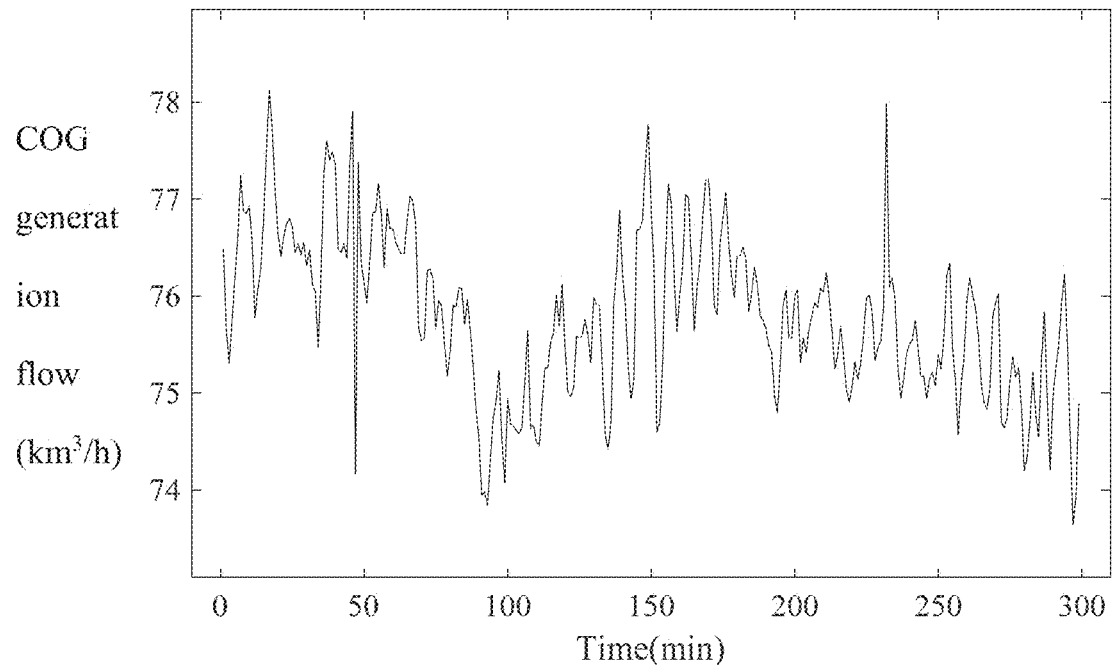
FIG. 8 is a trend chart of typical aperiodic feature data.

Typical working conditions with aperiodic characteristics of production data (such as input flow of first-stage COG) are shown in FIG. 8. An adaptive fuzzy C-means (AFCM) clustering method is proposed to detect outliers of such data. The method can effectively identify outliers and improve the clustering quality by introducing adaptive vectors and adaptive indexes to adjust and control clustering. AFCM is an improvement on the basis of FCM, and the objective function of AFCM is expressed by $J_{AFCM}^{od}$, as shown in formula (5):

$$\begin{cases} J_{AFCM}^{od} = \sum_{j^{od}=1}^{n^{od}} \left(w_{j^{od}}^{od}\right)^{p^{od}} \sum_{i^{od}=1}^{c^{od}} \left(u_{i^{od}j^{od}}^{od}\right)^{m^{od}} \left(d_{i^{od}j^{od}}^{od}\right)^2 \\ \text{s.t.} \sum_{j^{od}=1}^{n^{od}} u_{i^{od}j^{od}}^{od} > 0, \sum_{i^{od}=1}^{c^{od}} u_{i^{od}j^{od}}^{od} = 1, \prod_{j^{od}=1}^{n^{od}} w_{j^{od}}^{od} = 1 \end{cases} \quad (5)$$

wherein $w_{j^{od}}^{od}$ represents the adaptivity of a sample point $x_{j^{od}}^{od}$, i.e., the influence of $x_{j^{od}}^{od}$ on the result of the objective function $J_{AFCM}^{od}$. $p^{od}$ is an adaptive index affecting the clustering quality and the convergence rate, and the value range is generally $1 \leq |p^{od}| \leq 10$, wherein $p^{od} \neq 0$. The constraint condition $$\prod_{j^{od}=1}^{n^{od}} w_{j^{od}}^{od}$$

reflects the internal relation between sample data points. $u_{i^{od}j^{od}}^{od}$ is the subjection degree of the adaptive model, $m^{od}$ and $c^{od}$ are respectively a fuzzy coefficient and a clustering number, and $d_{i^{od}j^{od}}^{od}$ represents the distance between a sample data point $x_{j^{od}}^{od}$ and a cluster center $v_{i^{od}}^{od}$. $u_{i^{od}j^{od}}^{od}$, $v_{i^{od}}^{od}$ and $w_{j^{od}}^{od}$ can be obtained respectively by formula (6) to formula (8):

$$u_{i^{od}j^{od}}^{od} = \frac{\left(d_{i^{od}j^{od}}^{od}\right)^{-\frac{2}{m^{od}-1}}}{\sum_{i^{od}=1}^{c^{od}} \left(d_{i^{od}j^{od}}^{od}\right)^{-\frac{2}{m^{od}-1}}} \quad (6)$$

$$v_{i^{od}}^{od} = \frac{\sum_{j^{od}=1}^{n^{od}} w_{j^{od}}^{od} \left(u_{i^{od}j^{od}}^{od}\right)^{m^{od}} x_{j^{od}}^{od}}{\sum_{j^{od}=1}^{n^{od}} w_{j^{od}}^{od} \left(u_{i^{od}j^{od}}^{od}\right)^{m^{od}}} \quad (7)$$

$$w_{j^{od}}^{od} = \frac{\left[\prod_{j^{od}=1}^{n^{od}} \left(\sum_{i^{od}=1}^{c^{od}} \left(u_{i^{od}j^{od}}^{od}\right)^{m^{od}} \left(d_{i^{od}j^{od}}^{od}\right)^2\right)\right]^{1/n^{od}}}{\sum_{i^{od}=1}^{c^{od}} \left(u_{i^{od}j^{od}}^{od}\right)^{m^{od}} \left(d_{i^{od}j^{od}}^{od}\right)^2} \quad (8)$$

The steps of outlier detection based on AFCM are as follows:

Step 1: performing AFCM clustering on a time series to be detected to obtain $c^{od}$ cluster centers which are defined as $v_1^{od}, \ldots, v_{c^{od}}^{od}$;

Step 2: calculating the minimum distance between each data point in the time series and each cluster center;

Step 3: determining the threshold of an abnormal distance through a box figure. The distance value which is more than the threshold will be determined as an outlier. First, arranging the data from small to large, and respectively calculating an upper quartile $Q_3^{od}$ and a lower quartile $Q_1^{od}$; then calculating an interquartile range $IQR^{od} = Q_3^{od} - Q_1^{od}$; and finally, calculating an outlier cut-off point $Q^{od} = Q_3^{od} + 1.5 * IQR^{od}$.

The accuracy of the method is judged by a misjudgment ratio $\eta_{w^{od}}^{od}$ and an omission factor $\eta_{f^{od}}^{od}$, of which the formulae are respectively shown in formula (9) and formula (10):

$$\eta_{w^{od}}^{od} = \frac{n_{w^{od}}^{od}}{n_r^{od}} \quad (9)$$

$$\eta_{f^{od}}^{od} = \frac{n_{f^{od}}^{od}}{n_{w_r}^{od}} \quad (10)$$

wherein $n_{w^{od}}^{od}$ and $n_{f^{od}}^{od}$ are respectively the number of misjudgments and the number of detection results, and $n_{f^{od}}^{od}$ and $n_{w_t}^{od}$ are respectively the number of omissions and the number of actual outliers.

Figure 9:
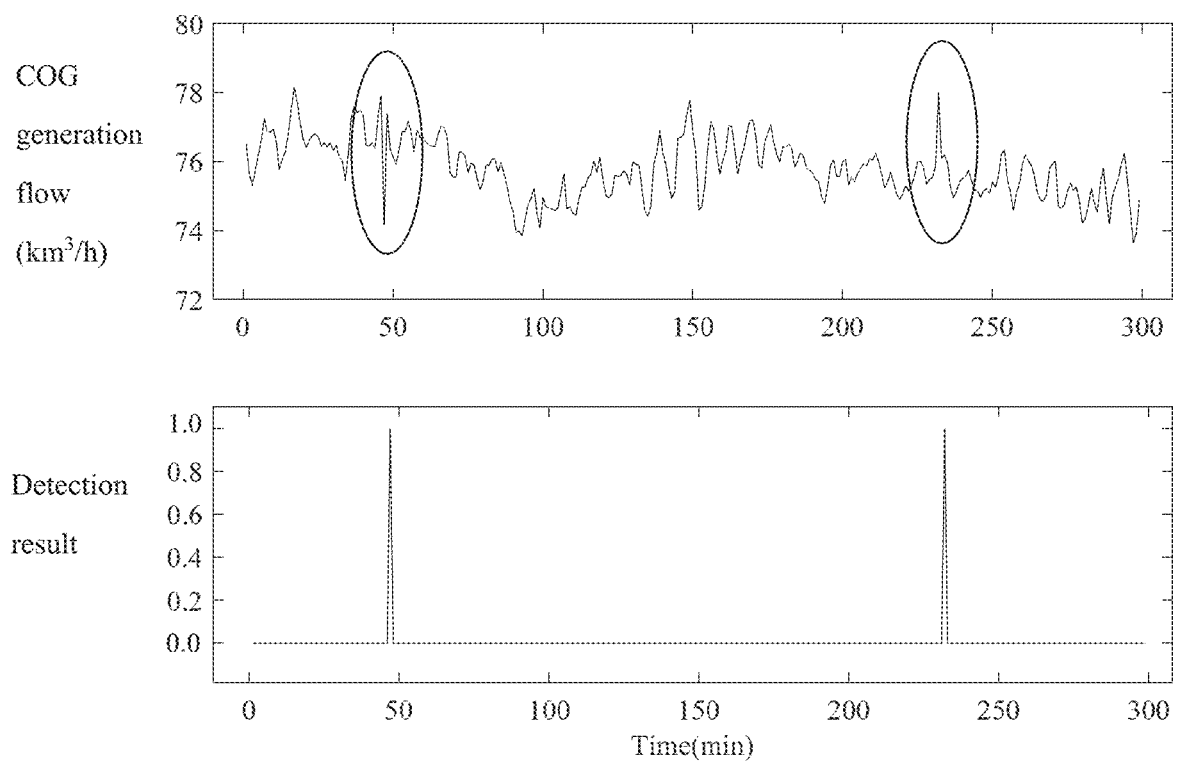
FIG. 9 is a diagram of outlier detection results of aperiodic feature data.

With the input flow of first-stage COG as an example, 30,000 samples are selected, the outlier detection results of the local outlier factor (LOF) and the K-Means method are shown in FIG. 9, and the accuracy statistics are shown in Table 1. It can be seen from the table that the method of the present invention effectively overcomes the problem that other methods cannot realize effective detection in the case of different fluctuation ranges at different moments and has high accuracy and efficiency for data outlier detection in such scenarios.

TABLE 2

Outlier Detection Accuracy of Aperiodic Feature Data

| Percentage of Outliers (%) | Method | Omission Factor (%) | Misjudgment Ratio (%) | Detection Time(s) |
|---|---|---|---|---|
| 1 | LOF | 1.5903 | 0.8274 | 61 |
|   | K-means | 1.5988 | 0.7631 | 153 |
|   | The present invention | 0.12258 | 0.12258 | 51 |
| 2 | LOF | 1.6196 | 0.8515 | 61 |
|   | K-means | 1.6198 | 0.7531 | 157 |
|   | The present invention | 0.13482 | 0.14543 | 61 |
| 5 | LOF | 1.6275 | 0.8579 | 61 |
|   | K-means | 1.6264 | 0.7817 | 161 |
|   | The present invention | 0.13888 | 0.16993 | 69 |

Figure 10:
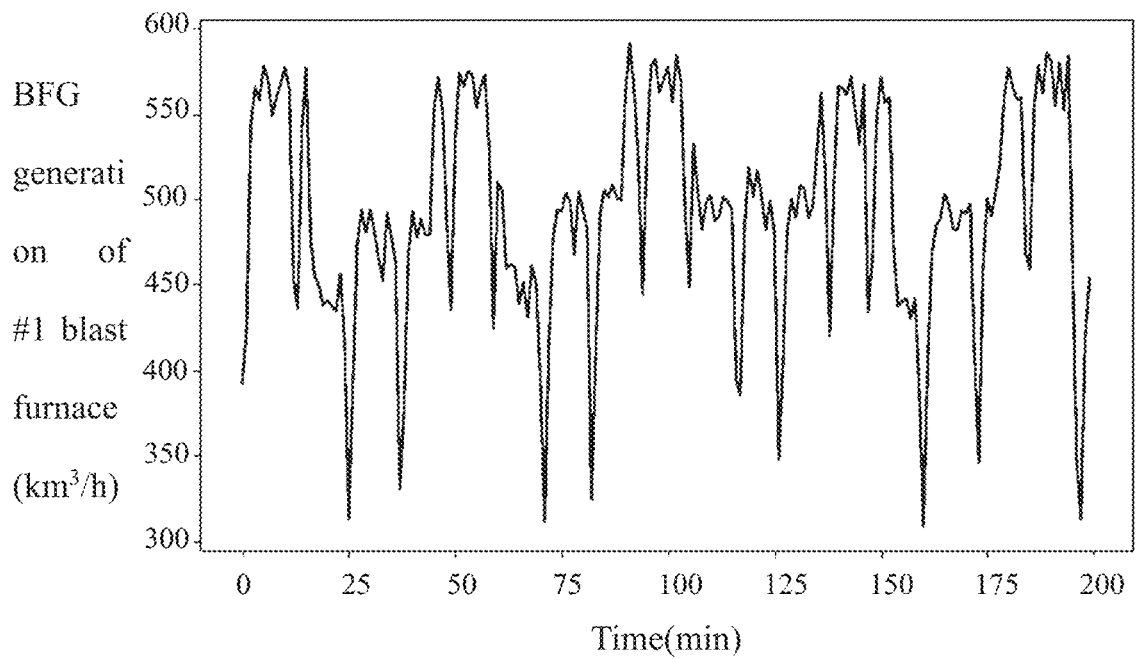
FIG. 10 is a trend chart of typical class period feature data.

The energy generation/consumption data of some production processes (such as blast furnace iron making process) are similar in form but not strictly identical in duration within each period. Such working conditions can be considered to have class period characteristics, and typical data are shown in FIG. 10. For such data, an outlier detection method based on dynamic time warping (DTW) is proposed. The method comprises the following specific detection steps:

Step 1: dividing historical data samples into $n^{od}$ sample series $[x_1^{od}, \ldots, x_{n^{od}}^{od}]$ with similar length to the data to be detected according to the periodic characteristics;

Step 2: calculating the sum $SumD_{j^{od}}^{od}$ of DTW distances between the series $X_{j^{od}}^{od}$ and other $n^{od}-1$ series. When $SumD_{k^{od}}^{od} = \min\{SumD_{k^{od}}^{od}, \ldots, SumD_{n^{od}}^{od}\}$ for the $(k^{od})^{th}$ series, taking the corresponding $X_{k^{od}}^{od}$ as a center sample, which is recorded as $Y^{od}$. Letting the time warping function be $C^{od} = \{c^{od}(1), c^{od}(2), \ldots c^{od}(N)\}$, where N represents the path length, $c^{od}(n_{x_i}^{od}) = (i^{od}, j^{od})$ represents the $(n_{x_i}^{od})^{th}$ matching point pair composed of the $(i^{od})^{th}$ feature vector $x_i^{od}$ of the series $X^{od}$ and the $(j^{od})^{th}$ feature vector $Y_{j^{od}}^{od}$ of the series $Y^{od}$, and the distance $d^{od}(i^{od}, j^{od})$ between the two is the local matching distance. The DTW algorithm minimizes the sum of distances through local optimization, as shown in formula (11):

$$D^{od}(m_1^{od}, m_2^{od}) = \min\left\{\sum_{n^{od}=1}^{N^{od}} d^{od}(x_{i^{od}}^{od}, y_{j^{od}}^{od})\right\} \quad (11)$$

Step 3: with the series $X^{od}$ of a sample to be detected as the reference, scaling the center sample $Y^{od}$ based on DTW to obtain $Y_*^{od}$, wherein the scaling process meets formula (12):

$$Y_*^{od}[j^{od}] = \frac{1}{\left|\{k^{od} \mid x_{i^{od}}^{od} \to y_{j^{od}}^{od}\}\right|} \sum_{x_{i^{od}}^{od} \to y_{j^{od}}^{od}} y_{j^{od}}^{od} \quad (12)$$

wherein $k^{od}$ represents the number of points corresponding to the series $Y^{od}$ and the series $X^{od}$ in the DTW process, and the symbol $x_{i^{od}}^{od} \to y_{j^{od}}^{od}$ represents that the point $x_{i^{od}}^{od}$ in the series $X^{od}$ corresponds to the point $y_{j^{od}}^{od}$ in the series $Y^{od}$.

Step 4: performing AFCM clustering on the scaled series $Y_*^{od}$ to obtain a cluster center $v_*^{od}$, and calculating the minimum distance between each point in the sample to be detected and all cluster centers;

Step 5: obtaining a threshold for determining an abnormal distance by calculation through a box figure. The distance value which is more than the threshold will be determined as an outlier.

Figure 11:
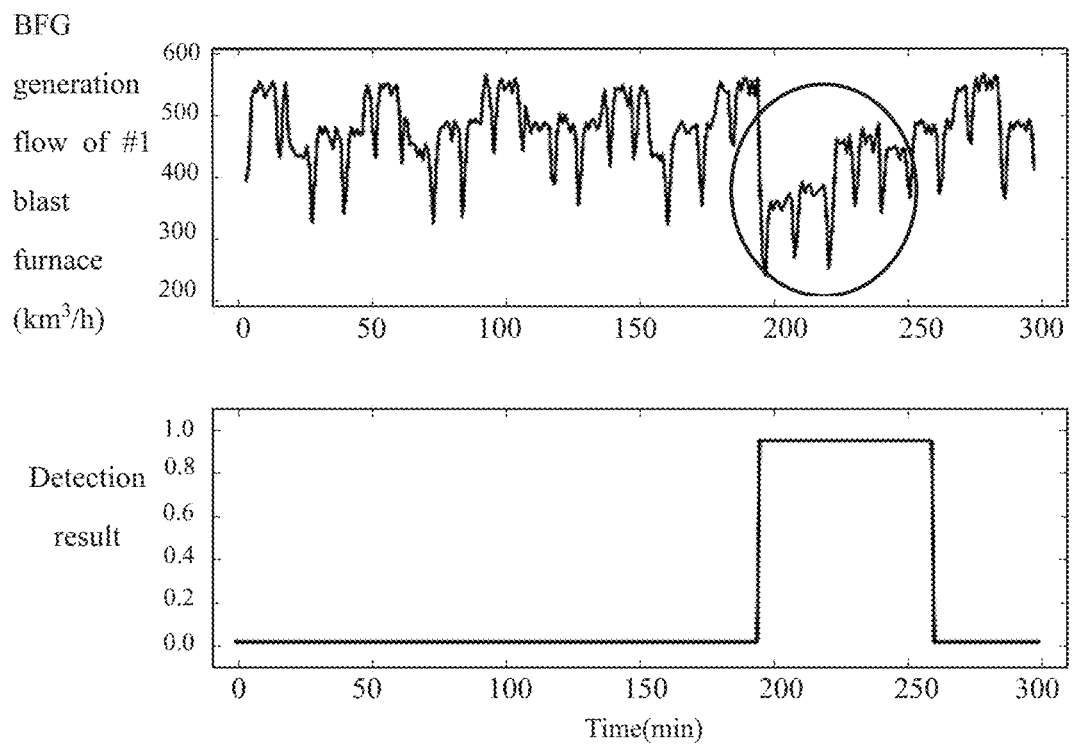
FIG. 11 is a diagram of outlier detection results of class period feature data.

With the BFG input flow of No. 1 blast furnace as an example, 3,000 samples are selected, and the effect of outlier detection is shown in FIG. 11. It can be seen from the figure that the method of the present invention can effectively detect abnormal period segments in the time series by extracting period information from class period data, which can effectively solve the problem of data outlier detection in such scenarios.

Missing Value Fill

Due to bad measurement environment and serious noise interference in the industrial production field, acquisition points are easily missing at some moment due to temporary failure of sensors, which affects the subsequent analysis and computing of the model. Generally, the missing points may be discrete or continuous. In the process of filling missing points, in order to maximize the filling effect and minimize the error, it is necessary to adopt different methods to fill data respectively. In view of the above situation, the present invention proposes a filling method for multiple scenarios (discrete single-point missing and continuous missing). In the method, the basic features are analyzed based on the historical sample data and divided into different working condition scenarios, and different filling methods are respectively proposed for discrete single-point missing and continuous multi-point missing.

Figure 12:
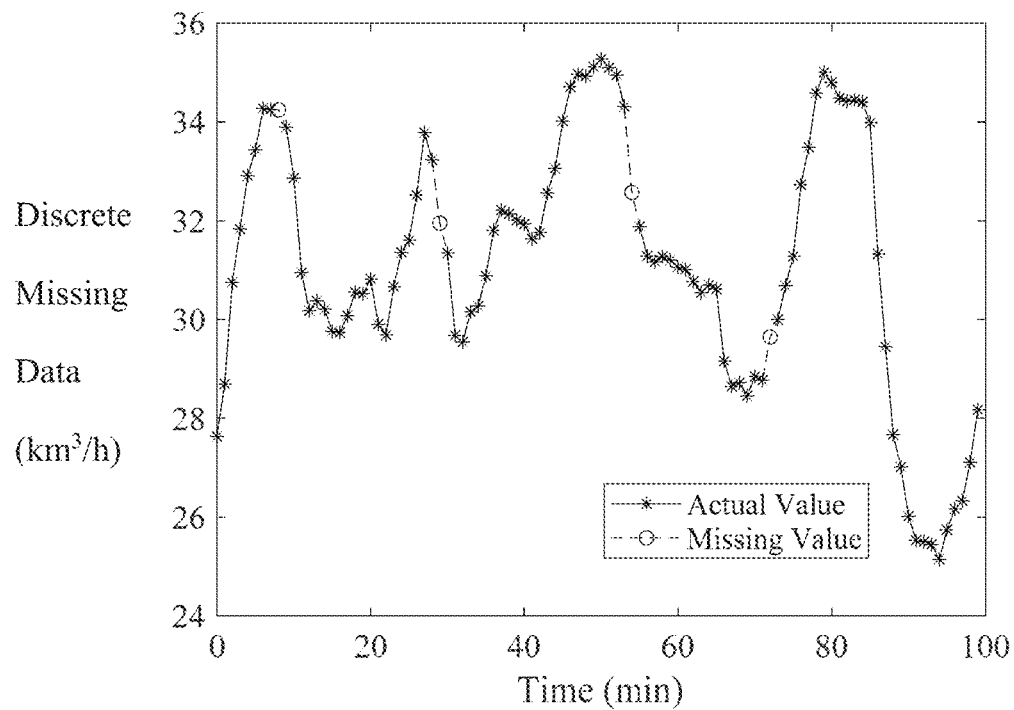
FIG. 12 is a trend chart of discrete missing data.

FIG. 12 shows typical discrete missing. For discrete single-point missing, filling can be divided into two conditions according to the data standard deviation. Under the working condition where the standard deviation is less than $\varepsilon$, data are filled by means of moving average, as shown in formula (13):

$$F_{t^{tb}+1}^{tb} = \frac{1}{n^{tb}}(y_{t^{tb}}^{tb} + y_{t^{tb}-1}^{tb} + \ldots + y_{t^{tb}+1-n^{tb}}^{tb}) \quad (13)$$

wherein $y_{t^{tb}}^{tb}$ is the value in the original sample series at the moment $t^{tb}$, $F_{t^{tb}+1}^{tb}$ is the fill value at the missing moment $t^{tb}+1$, and $n^{tb}$ is the number of sample points.

Under the working condition where the standard deviation is more than $\varepsilon$, data are filled by means of cubic spline interpolation. The index value of non-missing points in the sample series is $\{x_1^{tb}, \ldots, x_{n^{tb}}^{tb}\}$, and the corresponding data are $\{y_1^{tb}, \ldots, y_{n^{tb}}^{tb}\}$. Then on $\{x_j^{tb}, x_{j+1}^{tb}\}$, an expression $S_j^{tb}(x^{tb})$ meets constraint conditions (14):

$$\begin{cases} S_j^{tb}(x^{tb}) = a_j^{tb}(x^{tb})^3 + b_j^{tb}(x^{tb})^2 + c_j^{tb}x^{tb} + d_j^{tb} \\ S_j^{tb}(x_j^{tb}) = y_j^{tb} \\ S_j^{tb}(x_{j+1}^{tb}) = y_{j+1}^{tb} \\ S_j^{tb'}(x_{j+1}^{tb}) = S_{j+1}^{tb'}(x_{j+1}^{tb}) \\ S_j^{tb''}(x_{j+1}^{tb}) = S_{j+1}^{tb''}(x_{j+1}^{tb}) \end{cases} \quad (14)$$

wherein $j^{tb}=1, 2, \ldots, n^{tb}-1$. $S_j^{tb}(x^{tb})$ is a third expression on $[x_j^{tb}, x_{j+1}^{tb}]$, $a_j^{tb}$, $b_j^{tb}$, $c_j^{tb}$ and $d_j^{tb}$ are respectively the corresponding power coefficients of the expression, and $S_j^{tb'}(x_{j+1}^{tb})$ and $S_j^{tb'}(x_{j+1}^{tb})$ are respectively the first derivative and the second derivative of the expression $S_j^{tb}(x^{tb})$. The constraint conditions specify interpolation conditions as well as continuity at non-endpoints and continuity of derivatives. Then, the value at the missing moment can be calculated based on the fitted curve, so as to realize filling under such working conditions.

Figure 13:
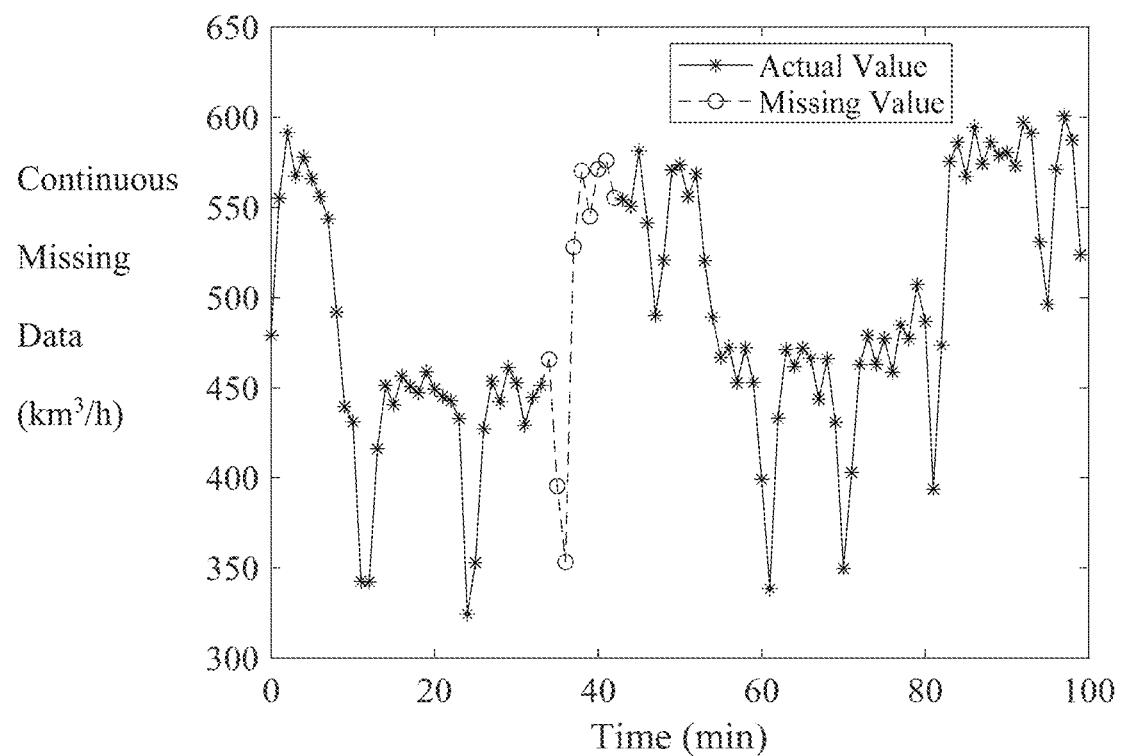
FIG. 13 is a trend chart of continuous missing data.
Figure 14A:
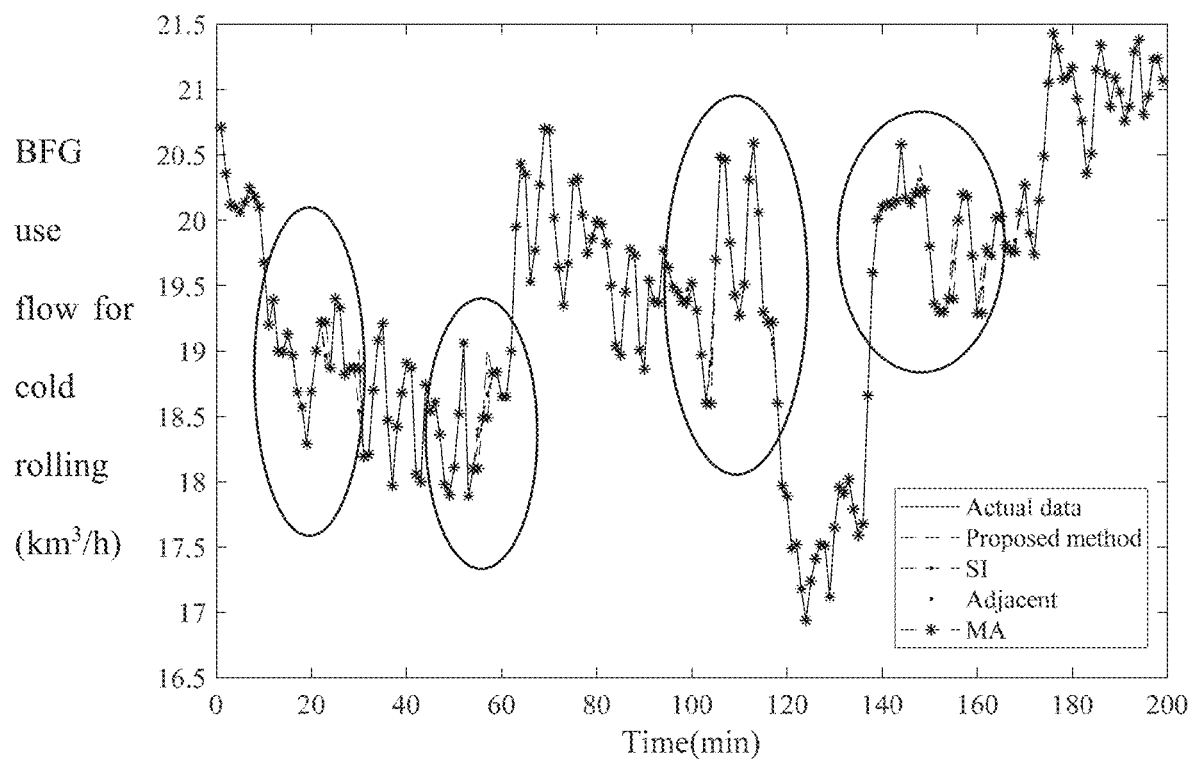
FIG. 14(a) is a comparison diagram of filling effects in the case of discrete missing with the miss rate of 5%.
Figure 14B:
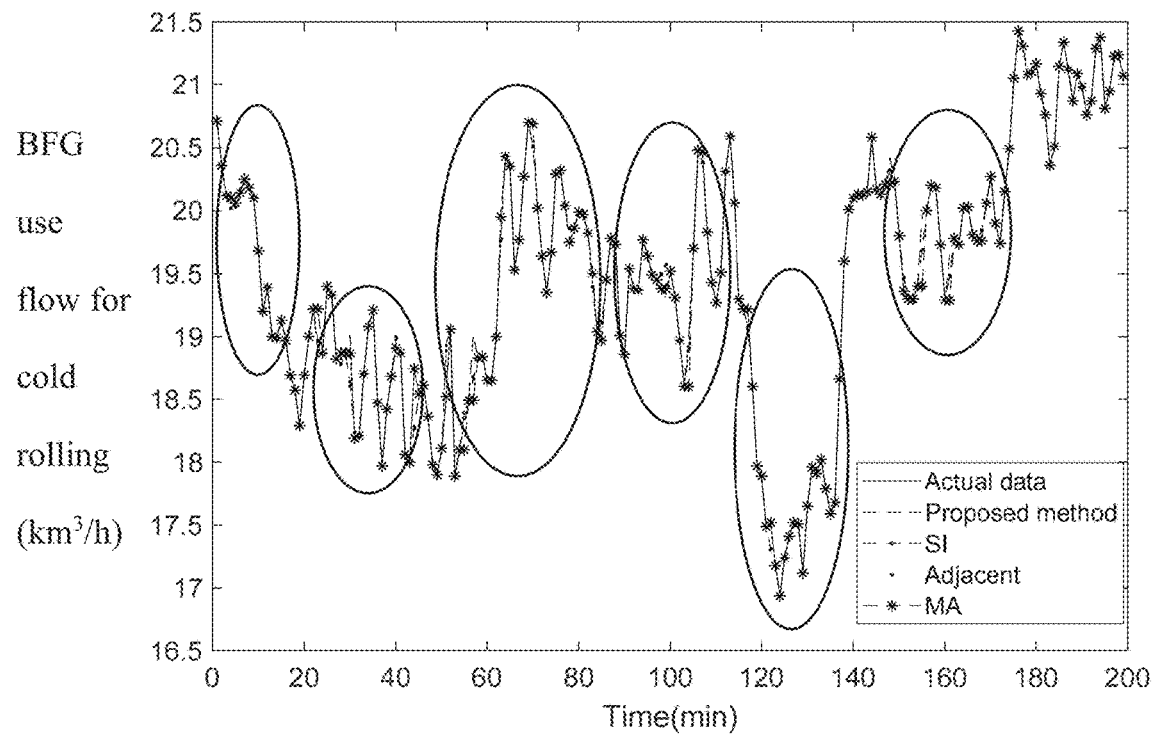
FIG. 14(b) is a comparison diagram of filling effects in the case of discrete missing with the miss rate of 15%.
Figure 14C:
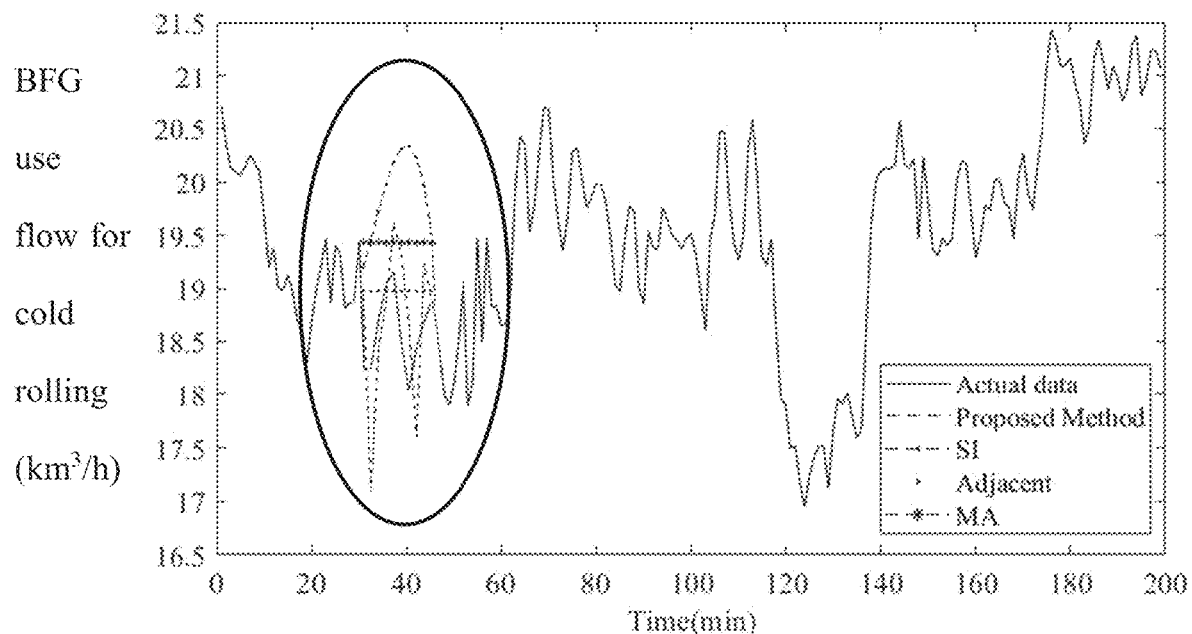
FIG. 14(c) is a comparison diagram of filling effects in the case of continuous missing with the miss rate of 5%.
Figure 14D:
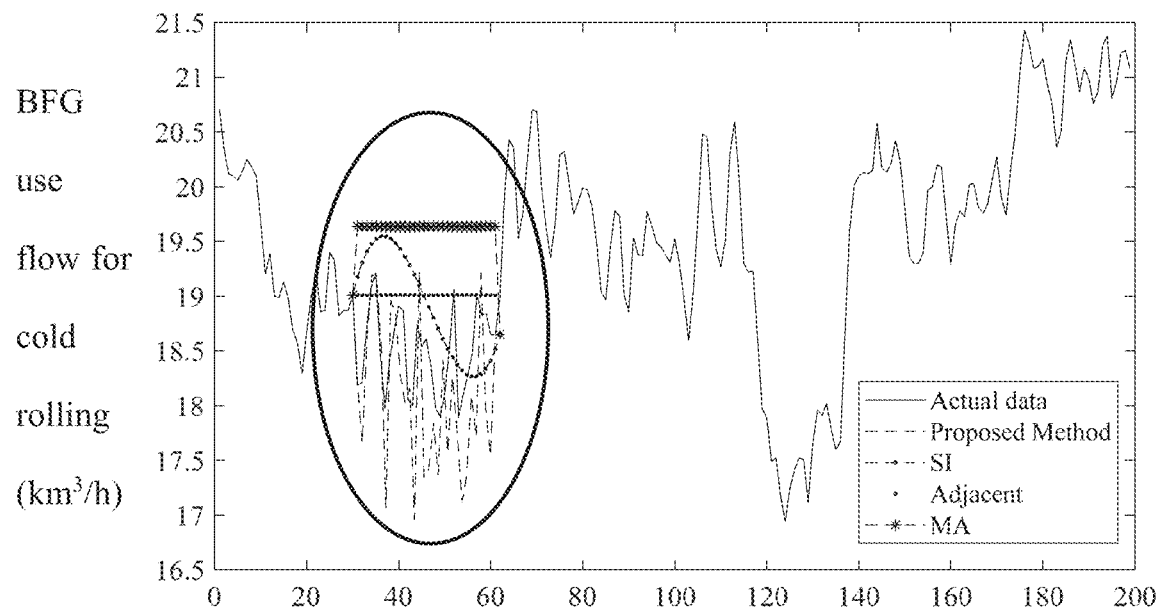
FIG. 14(d) is a comparison diagram of filling effects in the case of discrete missing with the miss rate of 15%.

For continuous missing in data, an autoregressive integrated moving average model (ARIMA Model) is adopted to fill segments. FIG. 13 shows the trend of continuous missing data. First, the sample series is differentiated and processed as a stationary series, so as to determine the order of parameters of the model. The mathematical model of the ARIMA model can be described as formula (15):

$$\Delta^{d^{tb}} y_{t^{tb}}^{tb} = \theta_0^{tb} + \sum_{i^{tb}=1}^{p^{tb}} \phi_{i^{tb}-1}^{tb} \Delta^{d^{tb}} y_{t^{tb}-1}^{tb} + \sum_{j^{tb}=1}^{q^{tb}} \theta_{j^{tb}}^{tb} \varepsilon_{t^{tb}-1}^{tb} \quad (15)$$

wherein $\Delta^{d^{tb}} y_{t^{tb}}^{tb}$ represents a stationary series of $y_{t^{tb}}^{tb}$ differentiated for $d^{tb}$ times, and represents the random error series of zero-mean white noise. $\phi_{i^{tb}}^{tb}(i^{tb}=1, 2, \ldots, p^{tb})$ and $\theta_{j^{tb}}^{tb}(j^{tb}=1, 2, \ldots, q^{tb})$ are parameters to be estimated of the model. The ARIMA model comprises three parameters: $p^{tb}$, $d^{tb}$ and $q^{tb}$. First, two complete data segments before and after the missing segment are respectively taken as training samples according to the positions of continuous missing data segments, and tested for stationarity by means of Augmented Dickey-Fuller (ADF) test. The series, if non-stationary, shall be transformed into a stationary series through $(d^{tb})^{th}$ differential operation. Second, the correlation is identified by an autocorrelation function (ACF) and a partial autocorrelation function (PACF). If ACF attenuates exponentially to zero, an autoregressive process exists. If PACF attenuates exponentially to zero, a moving average process exists. The Akaike Information Criterion (AIC) and the Bayesian Information Criterion (BIC) are taken as evaluation indexes of the model, respectively as shown in formula (16) and formula (17):

$$\text{AIC}=2k^{tb}-2\ln(L^{tb}) \quad (16)$$

$$\text{BIC}=k^{tb}\ln(n^{tb})-2\ln(L^{tb}) \quad (17)$$

wherein $k^{th}$ is the number of parameters of the model, $n^{th}$ is the number of samples, $L^{tb}$ is a likelihood Function, and $\ln(\bullet)$ represents a natural logarithm function. According to formula (16) and formula (17), a ($p^{tb}$, $q^{tb}$) combination minimizing AIC or BIC is searched within the range of [0, 5], i.e., the optimum parameter of the model where $p^{tb}$ and $q^{tb}$ respectively represent the two parameters of the autoregressive moving average model adopted in the invention, $p^{tb}$ is the number of autoregressive terms, and $q^{tb}$ is the number of moving average terms. The complete data segments before and after the missing segment are respectively taken as training samples, the data of the missing segment are forecast based on the model, and the average value of the two forecast results is taken as the fill value. In this way, the sample information can be fully utilized so as to improve the filling accuracy.

To sum up, the filling method comprises the following specific steps:

Step 1: judging the information features of time series data to be filled, comprising the miss rate of data, the missing situations of missing points, the periodicity of time series and the standard deviation of time series. If all the missing points in the time series are discrete missing, executing step 2; if all the missing points in the time series are continuous missing, executing steps 4-5; and if discrete missing points and continuous missing points both exist in the time series, executing step 2 first, and then executing steps 4-5 repeatedly for each continuous missing data segment.

Step 2: if the standard deviation of the series is less than $\varepsilon$, filling discrete points by means of moving average. Otherwise, executing step 3.

Step 3: carrying out filling by means of cubic spline interpolation.

Step 4: filling data based on the ARIMA model. Selecting complete series before and after the missing data segment as samples to forecast the data of the missing segment respectively, so as to calculate the average value of the two forecast results as the fill value.

Step 5: establishing an ARIMA model to forecast the missing data segment, and taking the average value of the two forecast results as the fill value.

Adopting the mean absolute error (MAE), the mean absolute percentage error (MAPE) and the root mean square error (RMSE) to measure the filling effect, wherein the three indexes are respectively shown in formula (18) to formula (20):

$$MAE = \frac{1}{T^{tb}} \sum_{t^{tb}=1}^{T^{tb}} |y^{tb}(t^{tb}) - y_d^{tb}(t^{tb})| \tag{18}$$

$$MAPE = \frac{\sum_{t^{tb}=1}^{T^{tb}} \frac{|y^{tb}(t^{tb}) - y_d^{tb}(t^{tb})|}{y_d^{tb}(t^{tb})}}{T^{tb}} \times 100\% \tag{19}$$

$$RMSE = \sqrt{\frac{1}{T^{tb}} \sum_{t^{tb}=1}^{T^{tb}} (y^{tb}(t^{tb}) - y_d^{tb}(t^{tb}))^2} \tag{20}$$

wherein $T^{tb}$ is the calculation length, $y^{tb}(t^{tb})$ is a forecast value, and $y_d^{tb}(t^{tb})$ is a measured value.

With the data of BFG use flow for cold rolling as an example, selecting the threshold $\varepsilon=20$ of the standard deviation according to the process experience. Adopting adjacent, spline interpolation (SI) and moving average (MA) respectively as comparison methods. FIG. 14 is a comparison diagram of the filling effect of the method of the present invention and that of other methods, and the statistics of the filling accuracy are shown in Table 2. It can be known from the analysis of statistic results that under different data missing scenarios, compared with other methods, the method can obtain the minimum error and improve the filling accuracy. Through complementation between advantages and disadvantages of different filling methods, the method is more suitable for complex data missing environments, and presents a good filling effect for different scenarios, which reflects the effectiveness and robustness of the method.

TABLE 2

Comparison of Accuracy between the Method of the Present Invention and Other Filling Methods

| Type of Missing | Percentage of Missing | Standard Deviation | Filling Method | MAE | MAPE(%) | RAISE |
|---|---|---|---|---|---|---|
| Continuous | 5% | <20 | Adjacent | 0.0746 | 0.0740 | 0.1717 |
| | | | SI | 0.0532 | 0.0526 | 0.0781 |
| | | | MA | 0.0688 | 0.0671 | 0.1291 |
| | | | The method of the present invention | 0.0422 | 0.0414 | 0.0522 |
| | | >20 | Adjacent | 0.9942 | 2.0229 | 29.2096 |
| | | | SI | 1.1334 | 2.3879 | 40.4975 |
| | | | MA | 1.4474 | 3.0169 | 63.5708 |
| | | | The method present invention | 0.9823 | 2.0114 | 29.1760 |
| | 15% | <20 | Adjacent | 0.4858 | 0.4887 | 1.9784 |
| | | | SI | 0.3279 | 0.3283 | 0.8693 |
| | | | MA | 0.4506 | 0.4529 | 1.6783 |
| | | | The method of the present invention | 0.2588 | 0.2586 | 0.5860 |
| | | >20 | Adjacent | 3.1986 | 4.6025 | 93.4125 |
| | | | SI | 3.2516 | 5.6826 | 112.4580 |
| | | | MA | 3.8434 | 6.4286 | 134.4054 |

TABLE 2-continued

Comparison of Accuracy between the Method of the
Present Invention and Other Filling Methods

| Type of Missing | Percentage of Missing | Standard Deviation | Filling Method | MAE | MAPE(%) | RAISE |
|---|---|---|---|---|---|---|
| Discrete | 5% | | The method of the present invention | 3.0635 | 4.4689 | 84.8957 |
| | | <20 | Adjacent | 0.0441 | 0.2315 | 0.0366 |
| | | | SI | 0.0717 | 0.3879 | 0.1166 |
| | | | MA | 0.0465 | 0.2526 | 0.0505 |
| | | | The method of the present invention | 0.0351 | 0.1898 | 0.0288 |
| | | >20 | Adjacent | 0.1296 | 0.1415 | 0.4110 |
| | | | SI | 0.4084 | 0.5228 | 0.7718 |
| | | | MA | 0.5953 | 0.6449 | 7.1282 |
| | | | The method of the present invention | 0.1197 | 0.1295 | 0.4455 |
| | 15% | <20 | Adjacent | 0.0818 | 0.4482 | 0.0630 |
| | | | SI | 0.0920 | 0.4999 | 0.0775 |
| | | | MA | 0.1729 | 0.9418 | 0.2204 |
| | | | The method of the present invention | 0.0704 | 0.4295 | 0.0597 |
| | | >20 | Adjacent | 0.6404 | 0.7193 | 3.6310 |
| | | | SI | 1.1977 | 1.3247 | 14.4117 |
| | | | MA | 1.7011 | 1.8690 | 20.1054 |
| | | | The method of the present invention | 0.4789 | 0.5298 | 2.0686 |

2) Energy Trend Forecast

Energy Generation-Consumption Forecasting for Class Period Feature Working Conditions In the production process of the steel industry, because some processes (such as iron making and coking) have relatively mature production flows and fixed processes, energy generation/consumption has class period features, such as BFG generation flow and BFG consumption flow of a hot blast stove. In view of energy forecasting problems under such working conditions, the present invention proposes a combination forecasting model based on the echo state network (ESN) and the least squares support vector machine (LSSVM). The model can be respectively used for dynamic modeling and forecasting for data quality at different moments, and with the training accuracy as the evaluation index, the model with higher accuracy is taken as the final forecast result.

ESN is a novel recursive neural network structure, and has dynamic characteristics of nonlinear systems because of a large dynamical reservoir (DR) inside. The reservoir comprises a large number of randomly generated and sparsely connected neurons, contains the operating state of the system and has the short-term memory function, thus presenting better performance in time series forecasting. Network updating is shown in formula (21) and formula (22):

$$x^{ss}(k^{ss}+1)=f^{ss}(W^{in}u^{ss}(k^{ss}+1)+Wx^{ss}(k^{ss})+W^{back}y^{ss}(k^{ss})) \quad (21)$$

$$y^{ss}(k^{ss}+1)=f^{out}(W^{out}(u^{ss}(k^{ss}+1),x^{ss}(k^{ss}+1),y^{ss}(k^{ss}))) \quad (22)$$

wherein $f^{ss}(\bullet)$ is a DR internal activation function, which is generally a Sigmoid function tanh( ), $x^{ss}(k^{ss})$ and $u^{ss}(k^{ss})$ are respectively the state variable of DR and the input vector of the model at the moment $k^{ss}$, and $y^{ss}(k^{ss})$ is the output of the model. $W^{in}$ is an input weight matrix. W is an internal neuron connection matrix of DR. To enable DR to have the dynamic memory ability, a sparse connectivity of 1%-5% is generally maintained, and the spectral radius is less than 1. $W^{back}$ is a feedback matrix of output neurons and DR. $f^{out}(\bullet)$ is an input and output unit activation function, which is generally a linear function. W' is an output weight matrix.

Different from ESN, an LSSVM regressive model considers a set $\{x_i^{ss}, y_i^{ss}\}$ containing $1^{ss}$ samples, wherein $t^{ss}=1, \ldots, 1^{ss}$, the input sample $x_i^{ss} \in R^m$, and the output sample $y_i^{ss} \in R$. The regressive model can be expressed as formula (23):

$$y^{ss}=w^{ss}\varphi^{ss}(x^{ss})+b^{ss} \quad (23)$$

wherein $\varphi^{ss}(\bullet)$ is a non-linear mapping function, and $w^{ss}$ and $b^{ss}$ are respectively a weight and a bias. The solution of the LSSVM model can be summarized as the optimization problem with constraints, as shown in formula (24):

$$\min J\{w^{SS}, b^{SS}, e^{SS}\} = \frac{1}{2}(w^{SS})^T(w^{SS}) + \frac{\gamma^{SS}}{2}\sum_{i^{SS}=1}^{N^{SS}}(e_{i^{SS}}^{SS})^2 \text{ s.t. } y_{i^{SS}}^{SS}(w^{SS})^T\varphi(x_{i^{SS}}^{SS})+b^{SS}+e_{i^{SS}}^{SS} \quad (24)$$

wherein $\gamma^{ss}$ is a penalty coefficient, $N^{ss}$ is the total number of samples, and $e_{i^{ss}}^{ss}$ is the fitting error of the $(i^{ss})^{th}$ sample. The Lagrange multiplier is introduced to transform constrained optimization into unconstrained optimization so as to solve the optimization problem by using Karush-Kuhn-Tucker Conditions (KKT Conditions), thus obtaining an equation set, as shown in formula (25):

$$\begin{bmatrix} 0 & 1^T \\ 1 & K^{SS} + \frac{2}{\gamma^{SS}}I \end{bmatrix} \begin{bmatrix} b^{SS} \\ a^{SS} \end{bmatrix} = \begin{bmatrix} 0 \\ y^{SS} \end{bmatrix} \quad (25)$$

wherein $K^{ss}(x_p^{ss}, x_q^{ss})=\varphi^{ss}(x_p^{ss})^T\varphi^{ss}(x_q^{ss})$ is a kernel function, which is generally a Gaussian kernel function. I=diag (1, . . . , 1) is a $N^{ss}$-dimensional unit matrix, and 1=[1, 1, ..., 1]$^T$. After $\alpha^{ss}$ and $b^{ss}$ are solved, the expression of the forecasting model can be obtained as shown in formula (26):

$$y^{SS} = \sum_{i^{SS}=1}^{N^{SS}} \alpha_{i^{SS}}^{SS} K^{SS}(x^{SS}, x_{i^{SS}}^{SS}) + b^{SS} \tag{26}$$

The Particle Swarm Optimization (PSO) algorithm is an evolutionary computing method based on bionics, which is highly favored due to advantages of high computing speed and the ability to jump from local optimal solutions and commonly used to optimize algorithm parameters. Each particle has two features of velocity and position, of which the iterative formulae are shown in formula (27) and formula (28) respectively:

$$v_{i^{ss},d^{ss}}^{ss}(t^{ss}+1) = \omega^{ss} v_{i^{ss},d^{ss}}^{ss}(t^{ss}) + c_1^{ss} \cdot \text{rand}(1) \cdot (P_{i^{ss},d^{ss}}^{ss} - x_{i^{ss},d^{ss}}^{ss}(t^{ss})) + c_2^{ss} \cdot \text{rand}(2) \cdot (P_{g^{ss},d^{ss}}^{ss} - x_{i^{ss},d^{ss}}^{ss}(t^{ss})) \tag{27}$$

$$x_{i^{ss},d^{ss}}^{ss}(t^{ss}+1) = x_{i^{ss},d^{ss}}^{ss}(t^{ss}) + v_{i^{ss},d^{ss}}^{ss}(t^{ss}+1) \tag{28}$$

wherein $x_{i^{ss},d^{ss}}^{ss}$, $v_{i^{ss},d^{ss}}^{ss}$, $P_{i^{ss},d^{ss}}^{ss}$ and $P_{g^{ss},d^{ss}}^{ss}$ respectively represent the current position, the current velocity and the historically optimal position of the $(i^{ss})^{th}$ particle in the $d^{ss}$-dimensional and the historically optimal position of all particles in the whole particle swarm in space. An inertia weight $\omega^{ss}$ is used to control the influence of the velocity generated in the previous iteration on the velocity of the current iteration; $c_1^{ss}$ and $c_2^{ss}$ are learning factors, generally $c_1^{ss} = c_2^{ss} = 2$, and rand(1) and rand(2) are random numbers distributed within (0,1).

The energy generation-consumption forecasting method for class period feature working conditions comprises the following specific steps:

Step 1: dividing historical sample data into a training set and a validation set, wherein the training set is used for training the model, and the validation set is used for validating the model accuracy;

Step 2: for the ESN method, optimizing the embedded dimensions of samples and the number of nodes in the reservoir by the PSO algorithm;

Step 3: for the LSSVM method, optimizing the embedded dimensions of samples and the intrinsic parameters (penalty coefficient and kernel parameter) of the algorithm by the PSO algorithm;

Step 4: evaluating the two methods based on the training accuracy, and taking the computed result of the method with higher accuracy as the forecast result of the model.

Figure 15:
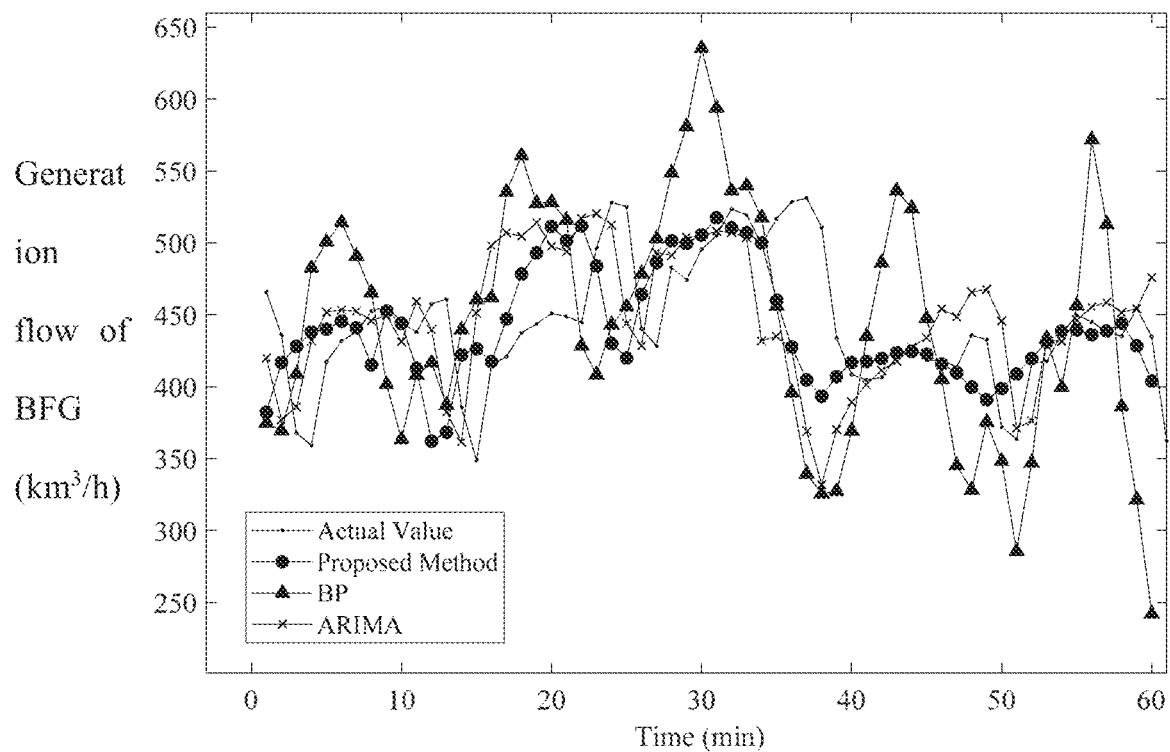
FIG. 15 is a comparison diagram of forecast effects of complete data of class period feature working conditions.

With the forecasting of the BFG generation flow of No. 1 blast furnace of a steel enterprise as an example, the accuracy of the forecasting method of the present invention is compared with that of the existing forecasting methods, and the forecast results are evaluated by MAPE and RMSE. FIG. 15 shows forecast results corresponding to the BP neural network, the ARIMA model and the model of the present invention, and the forecast time is 60 min (1 min/point). Table 3 shows the accuracy statistic result of each method. It can be seen that compared with existing methods, the method of the present invention has higher accuracy.

TABLE 3

Comparison of Accuracy between Existing Methods and the Model of the Present Invention

| Method | MAPE (%) | RMSE (km³/h) |
| --- | --- | --- |
| BP | 6 | 36 |
| ARIMA | 5.6 | 35 |
| The method of the present invention | 4.1 | 22 |

The above model considers the case where the historical data are complete. In the actual production process, it is difficult to avoid missing of data points as mentioned above. Although the filling method can ensure the integrity of samples, the reliability cannot be evaluated because the missing data points cannot be acquired. Aiming at this situation, the present invention proposes a method for direct modeling without filling missing points. The idea of ensemble learning is adopted to train the models based on the relevance vector machine (RVM) and Gaussian processes (GP) to give forecast results. In this way, the time of selecting the optimal filling method can be saved, and the generalization and robustness of the forecasting model under different working conditions can be improved.

Figure 16A:
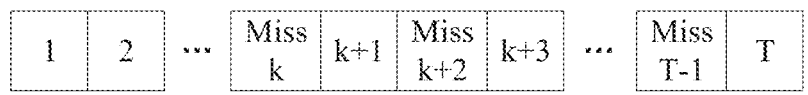
FIG. 16(a) is a schematic diagram of a time series containing missing points.
Figure 16B:
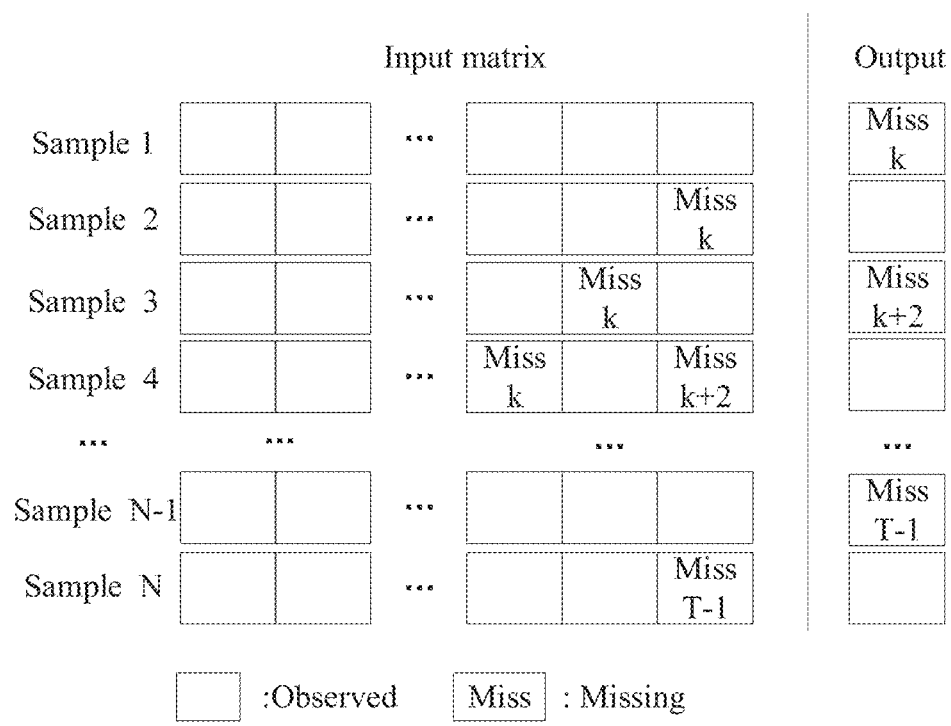
FIG. 16(b) is a schematic diagram of a built input/output training sample set.

Embodiments of the present invention are further described below. Due to low sensitivity of devices or changes in working conditions, time series data acquired in industrial fields generally have the characteristics of missing points and high noise. Therefore, such incomplete data cannot be directly used in time series forecasting. FIG. 16(a) shows a time series containing missing points, wherein white boxes represent missing data points and gray filled boxes represent observed data points. The existing methods often adopt moving average, adjacent and spline interpolation for filling and then use the filled data for forecasting. On one hand, such solution is heavily dependent on the filling method, different filling methods have a great influence on the result, and several attempts are required for selecting a method, which is relatively complicated. On the other hand, such method does not consider noise, so it is difficult to ensure the forecasting accuracy. Aiming at the above situation, the present invention integrates two machine learning algorithms, and builds a time series forecasting method based on an incomplete data set, which can effectively forecast class period time series containing noise and missing points, and the steps are as follows:

Step 1: initial filling and data set building based on phase space reconstruction. Extracting time series data of a period of time from the real-time relational database of an industrial field. Detecting and recording positions of missing points in the time series, and filling all missing points with zero values. The function of phase space reconstruction is to build a training sample set. Supposing a discrete time series $\{x_1^{sl}, x_2^{sl}, \ldots, x_{N^{sl}}^{sl}\}$, wherein $x_{i^{sl}}^{sl}$ represents the value acquired at the $(i^{sl})^{th}$ sampling moment, and $i^{sl}=1, 2, \ldots, N^{sl}$. The $(j^{sl})^{th}$ phase vector $x_{j^{sl}}^{sl}$ is shown in formula (29):

$$x_{j^{sl}}^{sl} = (s_{j^{sl}}^{sl}, s_{j^{sl}+1}^{sl}, \ldots, s_{j^{sl}+p^{sl}-1}^{sl})^T \tag{29}$$

wherein $p^{sl}$ is an embedded dimension of the phase vector, and the matrix form of $N^{sl}$ input samples is $X^{sl}=[x_1^{sl}, x_2^{sl}, \ldots, x_{N^{sl}}^{sl}]^T$. FIG. 15(b) represents input/output sample set built by phase space reconstruction, which corresponds to the time series containing missing points shown in FIG. 16(a). It can be seen that missing points in input and output are coupled, and missing points "missk" in FIG. 16(b) have the same value in both input and output.

Step 2: building of RVM model based on incomplete data set. Building an initial RVM model, i.e., building a functional relationship between input and output variables. Supposing the mapping relationship between the $(i^{sl})^{th}$ function value $y_{j^{sl}}^{sl} \in R$ and an input vector $x_j^{sl}$ as shown in formula (30):

$$x_{i^{sl}}^{sl} = \sum_{j^{sl}=1}^{N^{sl}} w_{j^{sl}}^{sl} K(x_{i^{sl}}^{sl}, x_{j^{sl}}^{sl}) + w_0^{sl} + \varepsilon_{i^{sl}}^{sl} = (\phi_{i^{sl}}^{sl})^T w^{sl} + \varepsilon_{i^{sl}}^{sl} \tag{30}$$

wherein $\phi_{i^{sl}}^{sl}=[1, K(x_{i^{sl}}^{sl}, x_1^{sl}), K(x_{i^{sl}}^{sl}, x_2^{sl}), \ldots, K(x_{i^{sl}}^{sl}, x_{N^{sl}}^{sl})]^T$, and $i^{sl}=1, 2, \ldots, N^{sl}$ $w^{sl}=[w_0^{sl}, w_1^{sl}, \ldots, w_{N^{sl}}^{sl}]^T$ represents a weight vector, and is a kernel function which is a Gaussian kernel function in the present invention. $\varepsilon_{i^{sl}}^{sl}$ represents a Gaussian distribution noise term with the mean value of 0 and the variance of $\sigma^2 (\beta \equiv \sigma^2)$. The weight vector $w^{sl}$ is considered as a continuous random variable. Supposing that each element obeys normal distribution with the mean value of 0 and different variances, as shown in formula (31):

$$P(w^{sl} \mid \alpha) = \prod_{i^{sl}=0}^{N^{sl}} N(w_{i^{sl}}^{sl} \mid 0, \alpha_i^{-1}) \tag{31}$$

wherein $\alpha=[\alpha_0, \alpha_1 \ldots, \alpha_N]^T$, and $A=\text{diag}(\alpha)$. Parameters $\alpha$ and $\beta$ are considered as random variables which obey Gamma distribution. In the present invention, a noise variance vector is written as $\beta=[\beta_{[m]}, \beta_{[m]}, \ldots, \beta_{[m]}, \beta_{[obs]}, \ldots, \beta_{[obs]}, \beta_{[obs]}]^T$, and $\beta_{[obs]}=\sigma^{-2}$. In addition, $\beta$ also can be written as $\beta=[\beta_{[m]}^T, \beta_{[obs]}^T]^T$ in the form of diagonal matrices $B_{[m]}=\text{diag}(\beta_{[m]})$, $B_{[obs]}=\text{diag}(\beta_{[obz]})$ and $B=\text{diag}(\beta)$. A training output set is composed of missing points observable points, wherein $x^{sl}=[(s_{[m]}^{sl})^T, (x[obs]^{sl})^T]^T$, $s_{[m]}^{sl}$ and $s_{[obs]}^{sl}$ respectively represent the vectors of missing points and observable points in the output set, the number of output missing points and that of output observable points are respectively $N^{sl}_{ymiss}$ and $N^{sl}_{yobs}$, and $N^{sl}=N^{sl}_{ymiss}+N^{sl}_{yobs}$. In the present invention, the element $\beta_{[m]}$ in $\beta_{[m]}$ is defined as $10^8$ to ensure that the noise variance of the corresponding missing output point is not affected. The likelihood function is shown in formula (32):

$$p(x_{[m]}^{sl}, x_{[obs]}^{sl} \mid w, \beta) = N(x^{sl} \mid \Phi^{sl} w^{sl}, B^{-1}) = \tag{32}$$

$$1 / \left[(2\pi)^{N^{sl}/2} |(B^{sl})^{-1}|^{1/2}\right] \times \exp\left\{-\frac{1}{2}[x^{sl} - \Phi w^{sl}]^T B[x^{sl} - \Phi w^{sl}]\right\}$$

wherein $\Phi^d=[\phi_1^{sl}, \phi_2^{sl}, \ldots, \phi_{N^{sl}}^{sl}]^T$ is a kernel function matrix. Aiming at the optimization problem of a missing input point $x_{[m]}^{sl}$, and considering the characteristics of the sample set built by phase ace reconstruction, each missing input point has a corresponding equivalent missing point in the missing output set. Therefore, the present invention replaces the posterior probability of each element in $x_{[m]}^{sl}$ with the posterior probability of the corresponding missing output point, fills the posterior average of $x_{[m]}^{sl}$ in the corresponding position of the missing input point, and further updates the kernel matrix $\Phi^{sl}$ as shown in formula (33):

$$\mu_{x_{[m]},i^{sl}}^{sl} = \int x_{[m],corr\_i}^{sl} p(x_{[m],corr\_i}^{sl} \mid x_{[obs]}^{sl}, \alpha, \beta_{[obs]}) dx_{[m],corr\_i}^{sl} \tag{33}$$

wherein $i_{x_{[m]}}^{sl}=1, 2, \ldots, N^{sl}_{x_{[m]}}$, the set $x_{[m]}^{sl}$ contains $N^{sl}_{x_{[m]}}$ missing input points, $x_{[m],i}^{sl}$ represents the $(i^{sl})^{th}$ element in $x_{[m]}^{sl}$, and $\mu_{x_{[m]},i^{sl}}$ represents the mean posterior probability of $x_{[m],i^{sl}}^{sl}$. $x_{[m],corr\_i}^{sl}$ represents the corresponding variable of the $(i^{sl})^{th}$ missing input point in the missing output set $x_{[m]}^{sl}$. By eliminating the integrals of $w^{sl}$ and $x_{[m]}^{sl}$, the present invention gives a log edge likelihood function as shown in formula (34):

$$\tilde{L} = \log \int p(x_{[m]}^{sl}, x_{[obs]}^{sl} \mid w^{sl}, \beta_{[obs]}) p(w^{sl} \mid \alpha) dx_{[m]}^{sl} dw^{sl} = \tag{34}$$

$$-\frac{1}{2}\left(N^{sl}\log 2\pi + \log|\tilde{C}| + (x^{sl})_{[obs]}^T \tilde{C}^{-1} x_{[obs]}^{sl}\right)$$

wherein a covariance matrix $\tilde{C}=\Phi x[obs]A^{-1}\Phi_{x_{[obs]}}^T + \beta_{[obs]}^{-1} I$, and I is a unit matrix. The extreme values $\alpha^*$ and $\beta^*_{[obs]}$ of $\alpha$ and $\beta_{[obs]}$ are found by maximizing partial lead $\tilde{L}$, and the iterative formulae are obtained as shown in formula (35) and formula (36):

$$\alpha_{i^{sl}} = \frac{\tilde{\gamma}_{i^{sl}}}{\tilde{\mu}_{i^{sl}}^2} \tag{35}$$

$$\beta_{[obs]}^{-1} = \frac{\|x_{[obs]}^{sl} - \Phi_{x_{[obs]}} \tilde{\mu}\|^2}{N^{sl}_{yobs} - \beta_{[obs]} Tr\left(\sum \Phi_{x_{[obs]}}^T \Phi_{x_{[obs]}}\right)} \tag{36}$$

wherein $i^{sl}=1, 2, \ldots, N^{sl}$, $\tilde{\gamma}_i = 1 - \alpha_i \tilde{\Sigma}_{ii}$, $\tilde{\Sigma} = (A+\beta_{[obs]}\Phi_{x_{[obs]}}^T \Phi_{x_{[obs]}})^{-1}$ and $\tilde{\mu} = \beta_{[obs]} \tilde{\Sigma} \Phi_{x_{[obs]}}^T x_{[obs]}^{sl}$. The method comprises the following steps:

① Initializing: $\alpha=[1/(N^{sl})^2, 1/(N^{sl})^2, \ldots, 1/(N^{sl})^2]^T$, and $\beta_{[obs]}$ is initialized as the variance of 10 times $x_{[obs]}^{sl}$. The related vector set is initialized as a set of all input samples;

② Updating mean values and covariance matrices of joint posterior probabilities of $w^{sl}$ and $x^{sl}[m]$;

③ Updating $\alpha$ and $\beta_{[obs]}$;

④ If $\alpha_{j^{sl}} > 10^8$, removing the $(j^{sl})^{th}$ sample from the related vector set;

⑤ Calculating the mean posterior probability of each element in $x_{[m]}^{sl}$ filling in the corresponding position of the missing input point, and further updating the kernel matrix $\Phi$;

⑥ Calculating the value of the log edge likelihood function;

⑦ If the change of an element in a relative to the last iteration or the change of the value of the edge likelihood function is less than the given threshold, stopping the iterative process, thus obtaining a final forecasting model; otherwise, executing step ②.

Step 3: obtaining the forecast value of a future period of time based on RVM single-step iterative forecasting. When a new input $x^{sl}_*$ (the input vector contains no missing point) is given, the value of $\beta_{[obs]}$ can be replaced with $\beta_{[obs]}^*$. The forecast distribution of the corresponding output $x^{sl}_*$ is approximately normal distribution, as shown in formula (37):

$$p(t^{sl}_* \mid t^{sl}_{[obs]}) \approx \int p(t^{sl}_* \mid x^{sl}_*, \beta^*_{[obs]}) p(w \mid t^{sl}_{[obs]}, \alpha, \beta^*_{[obs]})$$
$$dw = N(t^{sl}_* \mid \mu_*, \sigma_*^2) \tag{37}$$

wherein $\mu_*=\phi_*^T\mu_{[w|obs]}$, $\sigma_*^2=(\beta^*_{[obs]})^{-1}+\phi_*^T\tilde{\Sigma}\phi_*$ and $\phi_*=[1, K(x^{sl}_*, x^{sl}_1), K(x^{sl}_*, x^{sl}_2), \ldots, K(x^{sl}_*, x^{sl}_{N^{sl}})]^T$. $\mu_{[w|obs]}$ is the mean posterior probability of the weight vector $w^{sl}$. Then, the forecast mean value of a future period of time is a point, and the next round of forecasting will take the forecast result of the previous round as input to carry out cyclic rolling forecast.

Step 4: building of LSSVM data set based on incomplete data set. After the parameters α and b are solved, using $x^{sl}_*=\alpha K(x^{sl}, x^{sl}_*)+b$ to calculate an estimated value of the forecast quantity. Therefore, inputting data containing missing points filled by moving average into the LSSVM model for training, then forecasting the data containing missing points, replacing the original values of missing points with the forecast result, and repeating the above process until the change of the values of missing points is less than the set threshold, thus completing the data updating process.

Step 5: obtaining the forecast value of a future period of time based on GP forecasting. After updating the missing points by LSSVM, inputting the updated data into the GP model, wherein GP is a probability model with kernel. Supposing that the weight $w^{sl}$ and the noise $\varepsilon^{sl}$ in formula (38) obey zero-mean prior distribution:

$$p(w^{sl})=N(w^{sl}|0,\alpha^{-1}I)$$

$$p(\varepsilon^{sl})=N(\varepsilon^{sl}|0,\beta^{-1}) \quad (38)$$

wherein α and β are hyperparameters of the weight and the noise distribution, and the output likelihood function can be expressed as formula (39):

$$p(x^{sl}|\Phi,w^{sl},\beta)=N(x^{sl}|\Phi w^{sl},\beta^{-1}I) \quad (39)$$

According to Bayes formula, deducing the posterior distribution of the weight as shown in formula (40):

$$p(w^{sl}|x^{sl},\Phi,\alpha,\beta)=\frac{p(x^{sl}|\Phi,w^{sl})p(w^{sl})}{p(x^{sl}|\Phi)}=N(w^{sl}|m_{N^{sl}},\Sigma) \quad (40)$$

wherein $m_N=\beta\Sigma\Phi^Tx^{sl}$ and $\Sigma=(\alpha I+\beta\Phi^T\Phi)^{-1}$. Then selecting the Gaussian kernel function and maximizing the likelihood function, thus obtaining optimal hyperparameters.

Step 6: algorithm selection. Calculating the MAPE of the validation sets obtained by the RVM algorithm and the GP algorithm respectively, selecting the optimal algorithm, and saving and outputting the hyperparameter values and the information of the kernel function optimized by the corresponding algorithm.

Step 7: forecasting. After real data are acquired, using the optimal algorithm and the parameters thereof for forecasting.

Figure 17A:
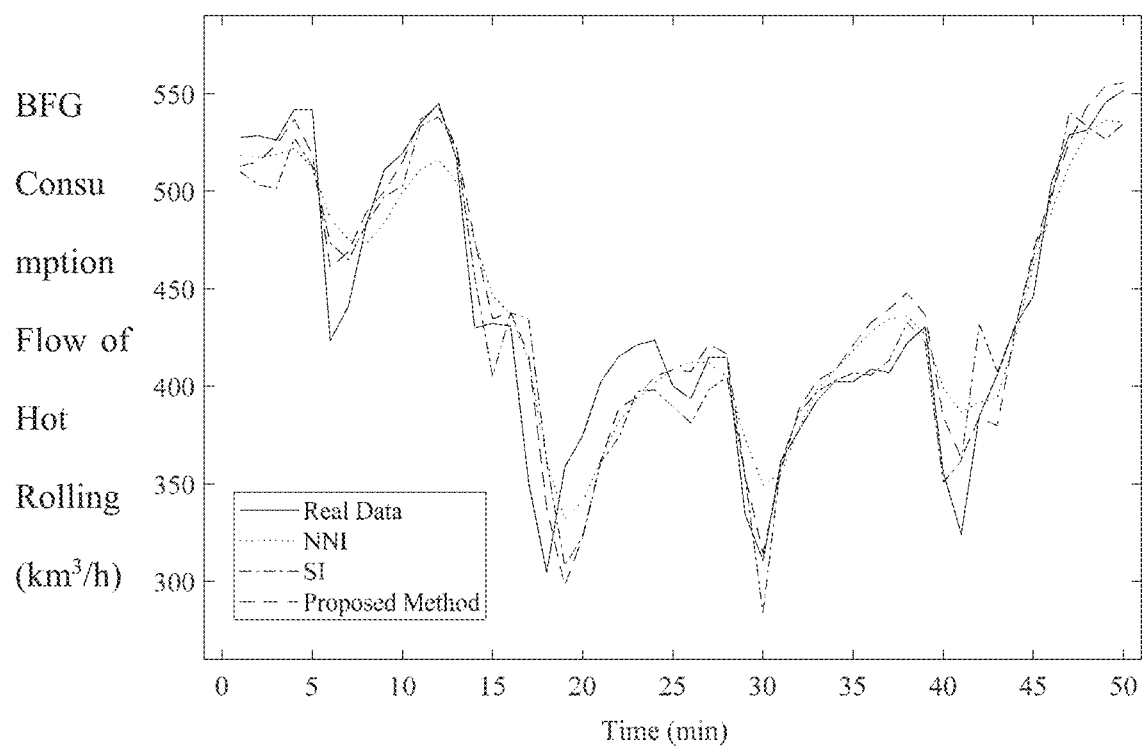
FIG. 17(a) is a comparison diagram of forecast results under working conditions with the miss rate of 5%.
Figure 17B:
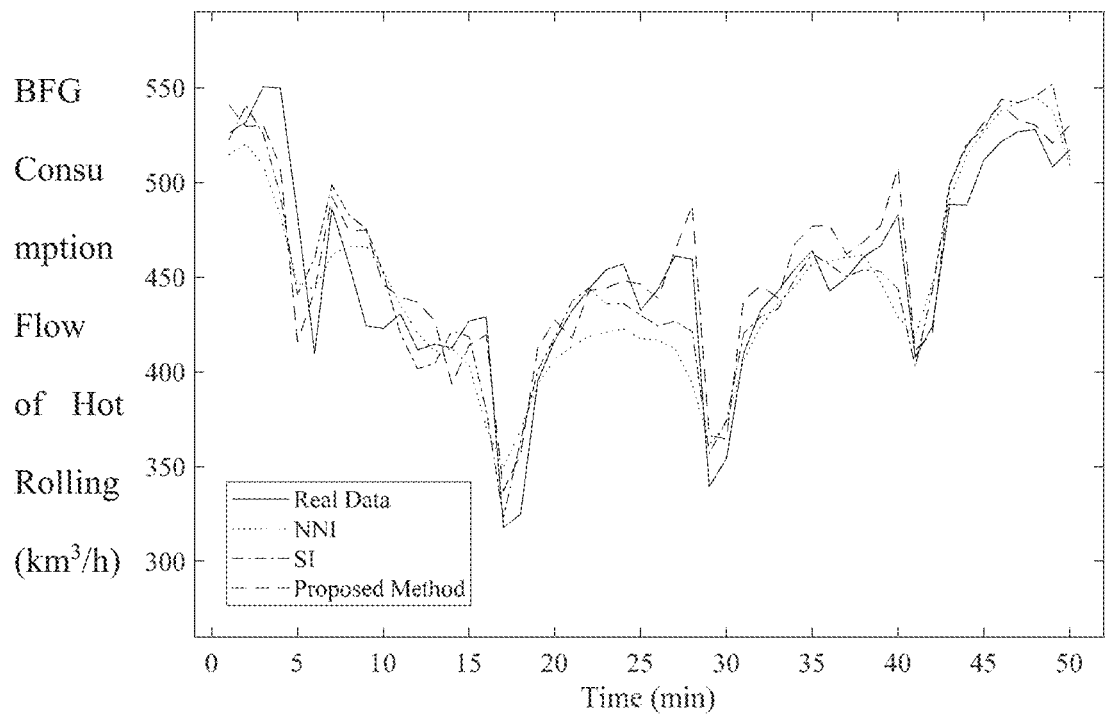
FIG. 17(b) is a comparison diagram of forecast results under working conditions with the miss rate of 10%.
Figure 17C:
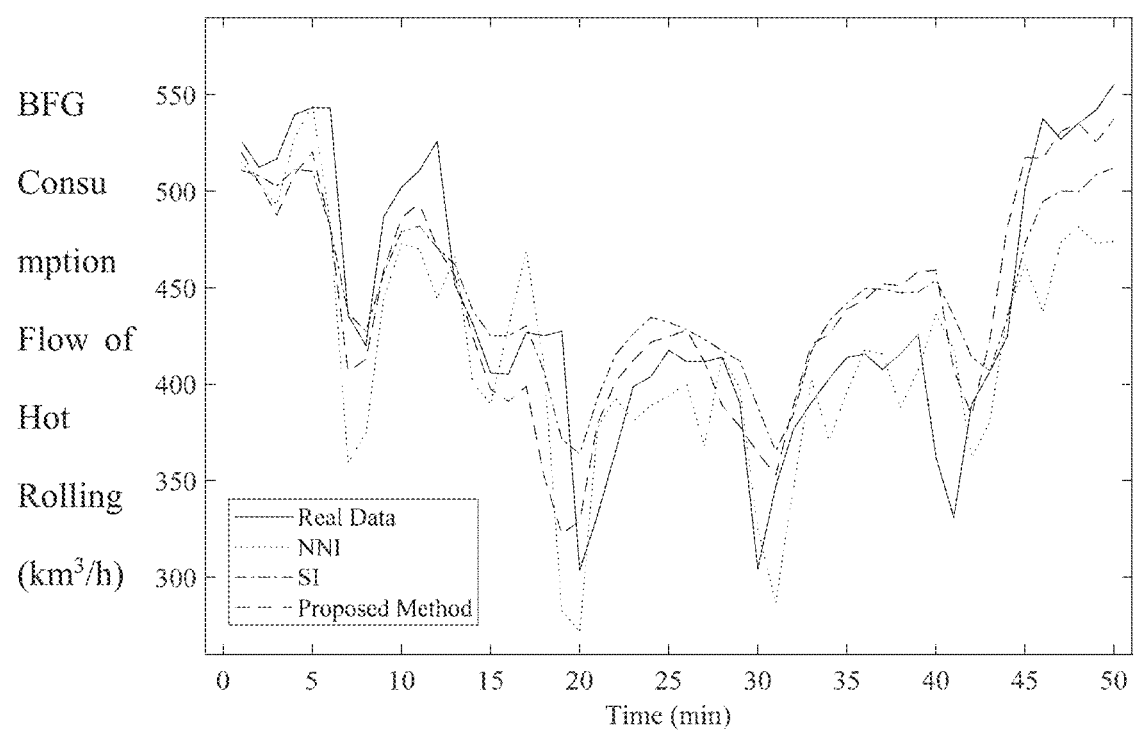
FIG. 17(c) is a comparison diagram of forecast results under working conditions with the miss rate of 30%.

FIG. 17 shows comparison diagrams of forecast results based on nearest neighbor interpolation (NNI), spline interpolation (SI) and the present invention when the data of the training set are missing by 5% (FIG. 17(a)), 10% (FIG. 17(b)) and 30% (FIG. 17(c)), and the accuracy statistics are shown in Table 4. The core algorithm of the comparison method uses RVM to forecast the time series. RMSE and MAPE are taken as the evaluation indexes of the forecast results. It can be known from the statistic result in the table that the method of the present invention has higher forecasting accuracy and can directly model and forecast the data containing missing input without separate filling, which improves the computing accuracy and efficiency.

TABLE 4

Comparison of Forecast Results of Three Methods

| Percentage of Missing Data | Forecasting Method | MAPE (%) | RMSE |
|---|---|---|---|
| 5% | NNI | 5.85 | 36.99 |
| | SI | 5.28 | 32.12 |
| | The present invention | 4.47 | 28.46 |
| 10% | NNI | 6.86 | 37.92 |
| | SI | 6.59 | 33.60 |
| | The present invention | 5.59 | 32.91 |
| 30% | NNI | 8.37 | 46.34 |
| | SI | 7.37 | 38.00 |
| | The present invention | 6.70 | 36.41 |

Energy Generation-Consumption Forecasting for Aperiodic Feature Working Conditions Another common working condition of production is energy consumption entirely based on the production process, but has no obvious periodic feature (such as cold rolling and hot rolling). In view of energy forecasting problems under such aperiodic feature working conditions, the present invention builds a bidirectional multi-layer long short-term memory forecasting model based on adaptive variational modal decomposition for noise reduction. First, complete ensemble empirical mode decomposition with adaptive noise (CEEMDAN) is adopted to decompose energy series, so as to calculate the initial parameters of variational mode decomposition (VMD), which can reduce the noise of the original data, smooth the data and reduce the aperiodicity and uncertainty of the data. Then, the Bayesian optimization method is used to obtain the optimal VMD decomposition parameter M, and the decomposition parameters of the VMD method are determined according to the decomposition results, which can search better parameters within a fixed number of iterations and shorten the time of parameter optimization. The VMD method is used to reduce the noise of the series, then the data are divided into a training set and a validation set, and input/output samples are built. Furthermore, bidirectional multi-layer long short-term memory (LSTM) is built for training, which is used to capture deep features in the series and has better generalization effect than single LSTM. Meanwhile, the measure of early stopping is taken for parameter optimization of the forecasting model, the direction of grid search is from a simple model to a complex model, and search is stopped when the error range is less than a certain degree, so as to shorten the time of parameter optimization. With the structure of decomposition for noise reduction and complex network, the present invention can avoid, with a higher probability, the hysteresis phenomenon of traditional models in forecasting of aperiodic data, and has better generalization ability.

The method comprises the following specific implementation steps:

Step 1: preparing data.

Extracting time series data of BFG consumption flow for cold rolling of a period of time from the real-time relational database of an industrial field.

Step 2: acquiring VMD parameters optimized by the Bayesian optimization method and decomposing and reorganizing the data.

Different from EMD and derived methods thereof, the VMD method is improved based on Hibert transform and Wiener filtering. The variational mode decomposition method is a quasi-orthogonal completely non-recursive decomposition method, which applies a variational problem solving process to the field of signal decomposition, transforms recursive decomposition of the EMD method into non-recursive variational decomposition, and highlights the local features of signals by means of iteratively solving the center frequency and bandwidth of each mode function. VMD has better denoising effect, avoids the phenomenon of spectrum aliasing, and can distinguish series with similar frequencies accurately.

For the original series $f^{ns}(t)$, the problem of constraint variation is shown in formula (41):

$$\min_{\{u_{k^{ns}}^{ns}, \omega_{k^{ns}}^{ns}\}} \left\{ \sum_{k^{ns}=1}^{N^{ns}} \left\| \partial_t \left[ \left( \delta(t) + \frac{j^{ns}}{\pi t} \right) u_{k^{ns}}^{ns}(t) \right] e^{-j\omega_k t} \right\|_2^2 \right\} \text{ s.t. } \sum_{k^{ns}} u_{k^{ns}}^{ns}(t) = f^{ns}(t) \quad (41)$$

wherein $K^{ns}$ is the number of modes, $u_{k^{ns}}^{ns}(t)$ is the $(k^{ns})^{th}$ mode, $\omega_{k^{ns}}^{ns}$ is the center frequency, and g(t) represents Dirac distribution. To solve the above problem, the quadratic penalty term and the Lagrange multiplier $\lambda^{ns}$ are adopted to transform the above problem into an unconstrained problem, as shown in formula (42):

$$L(\{u_{k^{ns}}^{ns}\}, \{\omega_{k^{ns}}^{ns}\}, \lambda^{ns}) = \alpha^{ns} \sum_{k^{ns}} \left\| \partial_t \left[ \left( \delta(t) + \frac{j^{ns}}{\pi t} \right) * u_{k^{ns}}^{ns}(t) \right] e^{-j\omega_k t} \right\|_2^2 + \left\| f^{ns}(t) - \sum_{k^{ns}} u_{k^{ns}}^{ns}(t) \right\|_2^2 + \left\langle \lambda^{ns}(t), f^{ns}(t) - \sum_{k^{ns}} u_{k^{ns}}^{ns}(t) \right\rangle \quad (42)$$

In order to solve the mode $u_{k^{ns}}^{ns}$ and the center frequency $\omega_{k^{ns}}^{ns}$, the problem in the above formula is transformed into a minimization problem and solved by an alternating direction method of multipliers (ADMM), and then the optimal solutions can be expressed as formula (43) and formula (44):

$$\hat{u}_{k^{ns}}^{ns}(\omega^{ns}) = \frac{\hat{f}^{ns}(\omega^{ns}) - \sum_{i^{ns} \neq k^{ns}} \hat{u}_{i^{ns}}(\omega^{ns}) + \left( \hat{\lambda}^{ns}(\omega^{ns})/2 \right)}{1 + 2\alpha^{ns}(\omega^{ns} - \omega_{k^{ns}}^{ns})^2} \quad (43)$$

$$\omega_{k^{ns}}^{ns} = \frac{\int_0^\infty \omega^{ns} |\hat{u}_{k^{ns}}^{ns}(\omega^{ns})|^2 d\omega^{ns}}{\int_0^\infty |\hat{u}^{ns}(\omega^{ns})|^2 d\omega^{ns}} \quad (44)$$

wherein $\hat{f}^{ns}(\omega ns)$, $u_{k^{ns}}^{ns}(\omega ns)$, $\hat{\lambda}^{ns}(\omega^{ns})$ and $\hat{u}_{k^{ns}}^{ns}(\omega^{ns})$ represent Fourier transform forms of corresponding variables respectively. After $u_{k^{ns}}^{ns}$ and $\omega_{k^{ns}}^{ns}$ are updated, the Lagrange multiplier is also updated according to formula (45):

$$\hat{\lambda}_{t+1}^{ns}(\omega^{ns}) = \hat{\lambda}_t^{ns}(\omega^{ns}) + \tau \left( \hat{f}^{ns}(\omega^{ns}) - \sum_{k^{ns}} \hat{u}_{k^{ns}}^{ns}(\omega^{ns}) \right) \quad (45)$$

Then the above updating process is repeated until the convergence condition of formula (46) is satisfied:

$$\sum_{k^{ns}} \frac{\|\hat{u}_{k^{ns}}(t+1) - \hat{u}_{k^{ns}}(t)\|_2^2}{\|\hat{u}_{k^{ns}}(t)\|_2} < \varepsilon^{ns} \quad (46)$$

wherein $\varepsilon^{ns}$ is a threshold satisfying the convergence condition. The Bayesian parameter optimization process generally comprises two parts: First, the previous function must be selected to represent the hypothesis about the optimized function. With greater flexibility and tractability, Gauss processes are generally selected as a probability model for Bayesian parameter optimization. Second, Bayesian optimization needs an acquisition parameter for building an acquisition function from model posteriori to determine the next parameter combination to be estimated.

Supposing that a set of hyperparameters is $X^{ns}=x^{ns}_1$, $x^{ns}_2, \ldots, x^{ns}_{n^{ns}}$, which has a functional relationship with the target to be optimized. For $f^{ns}(X^{ns})$, supposing that GP is a Gaussian process model of input data $X^{ns}$ and an objective function $f^{ns}$, and $S^{ns}$ is an acquisition function. First, time series data are decomposed by CEEMDAN to obtain the number $K^{ns}_{k^{ns}}$ of VMD reserved series. For the VMD method, the decomposition number $K^{ns}={}^{ns}_{d^{ns}}+K^{ns}_{k^{ns}}$, wherein the number $K^{ns}_{d^{ns}}$ of discarded series and the balance factor $\alpha^{ns}$ are optimized by the Bayesian optimization method. The objective function of the Bayesian optimization method of the present invention is expressed in formula (47):

$$f_{obj}^{ns}(K_{d^{ns}}^{ns}, \alpha^{ns}) = e_{origin}^{ns} + e_{model}^{ns} \quad (47)$$

wherein $e_{origin}^{ns}$, represents the error between the series composed of first $K_{k^{ns}}^{ns}$ components after decomposition by the VMD method and the original series, and $e_{model}^{ns}$ is the error of VMD reorganized series in model training. If only $e_{model}^{ns}$ is used as the objective function, and $K_{d^{ns}}^{ns}$ will be guided to be optimized to a larger direction, which makes the series smoother and easier to forecast, but causes the error from real series to be greater and greater. After the optimization parameters $K^{ns}$ and $\alpha^{ns}$ of VMD are obtained, the original series is decomposed, the first $K_{k^{ns}}^{ns}$ series are added and combined into a new time series, and input/output samples are built by using the time series and then divided into a training set and a validation set.

Step 3: training a bidirectional multi-layer LSTM model. The parameters of the bidirectional multi-layer LSTM model are mainly as follows: the input dimension, the number of LSTM layers, the number of hidden nodes of each LSTM layer, the learning rate and the number of samples of a training batch. The parameter optimization method is grid search with early stopping, wherein the input dimension is optimized first, then the number of LSTM layers and the number of hidden nodes of each LSTM layer are optimized, and finally, the learning rate and the number of samples of a training batch are optimized. The specific steps are as follows:

① Determining the optimization range and granularity of the parameters, the optimization direction is decreasing model complexity, i.e., the number of LSTM layers is decreased, the number of hidden nodes of each LSTM layer is decreased, and the objective function is the root-mean-square error;

② Recording errors between searches during grid search, and stopping search when the error is less than the threshold δ;

③ When optimizing the number of LSTM layers and the number of hidden nodes of each LSTM layer, setting the learning rate and the number of samples of a training batch to the maximum values to shorten the search time, and then using the optimized parameters to train the bidirectional multi-layer LSTM model, thus obtaining a forecasting model.

Step 4: carrying out forecasting based on the latest data acquired from the database.

As the VMD method requires a certain amount of data to ensure the stability of decomposition results, the present invention takes the latest 1,000 sample points, performs VMD decomposition and reorganization to reduce noise first, and then takes the first input dimension sample points as the input to forecast points at the next moment.

Figure 18:
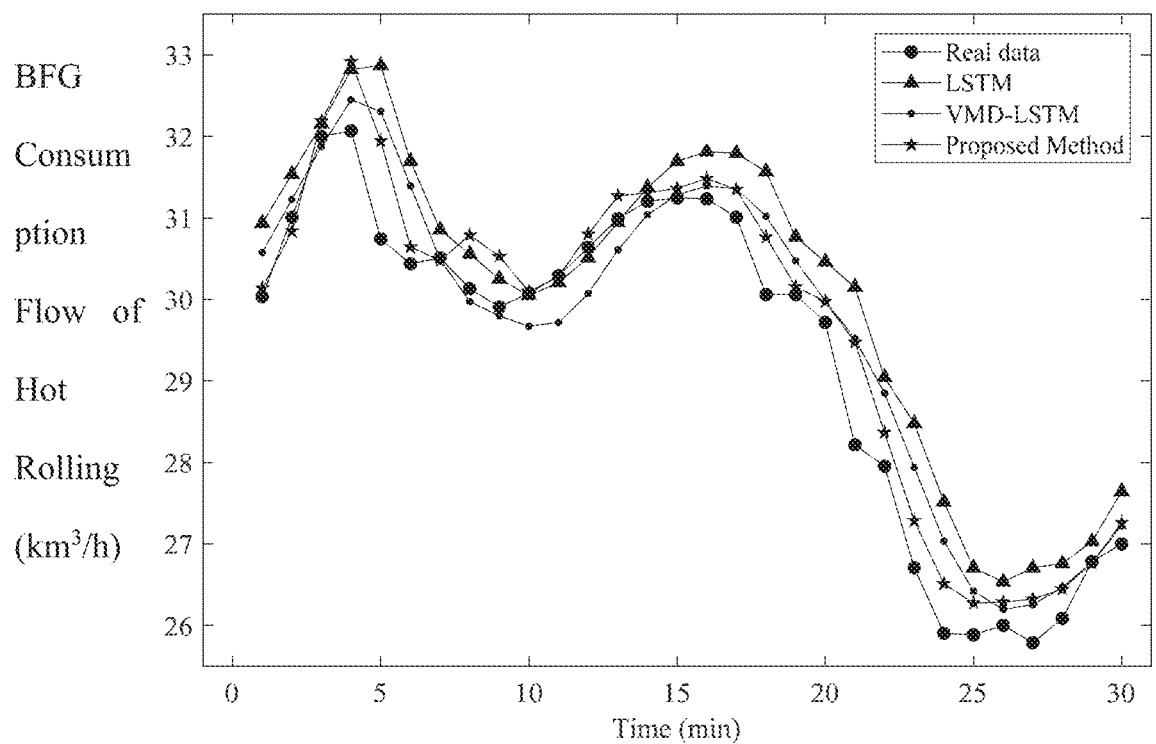
FIG. 18 is a comparison diagram of forecast effects of complete data of aperiodic feature working conditions.

With the data forecasting of BFG consumption flow for cold rolling as an example, FIG. 18 is a comparison diagram of forecast effects of the LSTM method, the LSTM method with decomposition for noise reduction and the present invention, and the accuracy statistics of forecast results are shown in Table 5. It can be seen from the statistic result that the method of the present invention is superior to other methods in the two evaluation indexes: MAPE and RMSE, indicating the effectiveness of the method.

TABLE 5

Comparison of Forecast Results

| Method | RMSE | MAPE |
|---|---|---|
| LSTM | 0.8990 | 2.624% |
| VMD_LSTM | 0.8931 | 2.300% |
| The present invention | 0.4684 | 1.356% |

For the aperiodic feature time series containing missing points, the present invention first fills the missing data by cubic spline interpolation, as shown in formula (15) and formula (16), and then adopts a forecasting method for complete aperiodic feature data to forecast such data.

Figure 19:
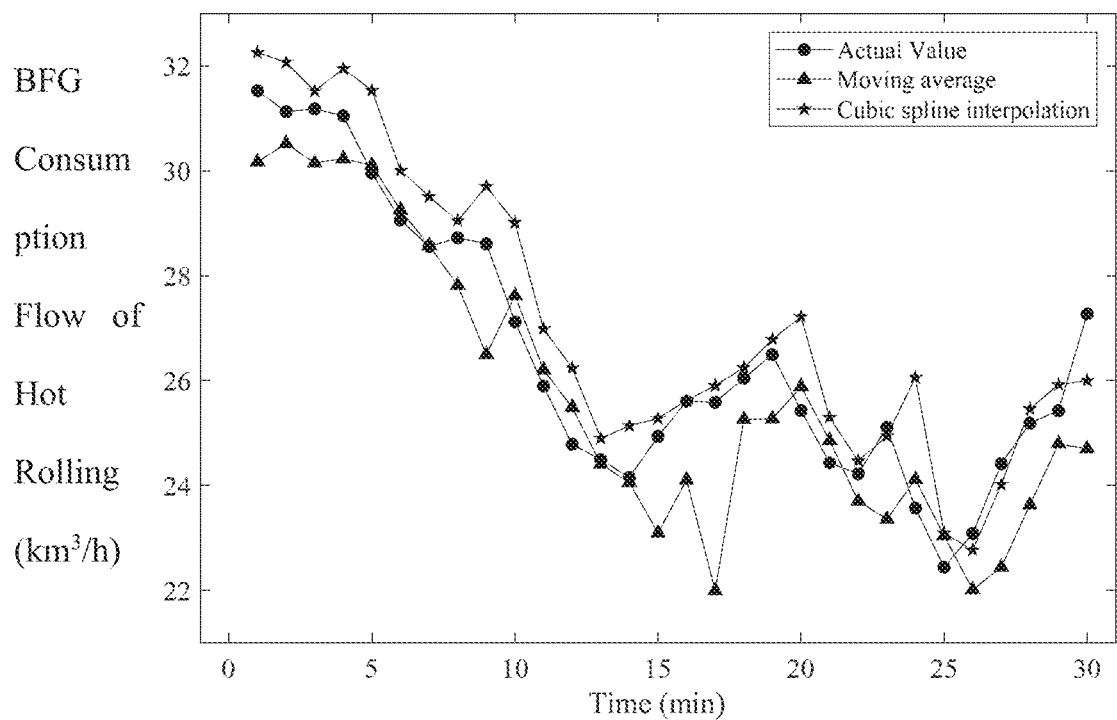
FIG. 19 is a comparison diagram of forecast results under working conditions with the miss rate of 15%.

With the data of BFG consumption flow for hot rolling as an example, FIG. 19 is a comparison diagram of forecast results of a series with the miss rate of 15% in moving average pre-processing and cubic spline interpolation pre-processing. The statistics of forecasting accuracy are shown in Table 6. It can be seen from the table that compared with other methods, the method of the present invention has higher accuracy and can provide effective guidance for practical industrial application.

TABLE 6

Accuracy Statistics of Forecast Results

| Method | RMSE | MAPE |
|---|---|---|
| Forecasting method based on moving average | 2.8140 | 6.745% |
| The method of the present invention | 0.9875 | 2.361% |

Forecasting of Gas Reserves for Factor Model

Since the capacity of a gas holder is taken as an important sign of balance of a gas system, the forecasting accuracy thereof plays an extremely important role. To solve the short-term forecasting problem, the present invention proposes a forecasting method considering the capacity fluctuation factor. First, the experimental data acquired in an industrial field are divided into a training set and a validation set, and a relevance vector machine model, a Gaussian process model and a least squares support vector machine model are established respectively; and an optimal model is selected through the error evaluation index for forecasting. The present invention adopts the idea of ensemble algorithm to build a factor model forecasting method integrating the RVM algorithm, the GP algorithm and the LSSVM algorithm, combines multiple machine learning algorithms, and compares validation errors of the models to finally obtain a stable model with good performance in all aspects, which greatly improves the forecasting accuracy and the algorithm stability.

The present invention comprises the following specific implementation steps:

Step 1: pre-processing data.

Extracting the input flow of 4 blast furnace gas pipe networks of a period of time and the consumption flow of 24 gas consumption links from the real-time relational database of an industrial field as input factors of the model, and adding the sum of the capacities at the previous moment to the input factors; and supposing that the sum of capacities at the current moment is the output value. Meanwhile, normalizing all the input data and the output data. Selecting the first 70% of samples as training samples and the remaining 30% as validation samples.

Step 2: building a relevance vector machine regressive model;

Step 3: building a Gaussian process regressive model;

Step 4: building an LSSVM model;

Step 5: selecting an optimal model, and forecasting the estimated value of a forecast point of a future period of time.

After the output estimated values of the validation sets of the RVM model, the GP model and the LSSVM model are respectively obtained by using the validation sets, the present invention compares the model performance by using the error evaluation index MAPE, so as to obtain the optimal model. The smaller the MAPE value is, the more accurate the forecast effect of the model is.

Figure 20:
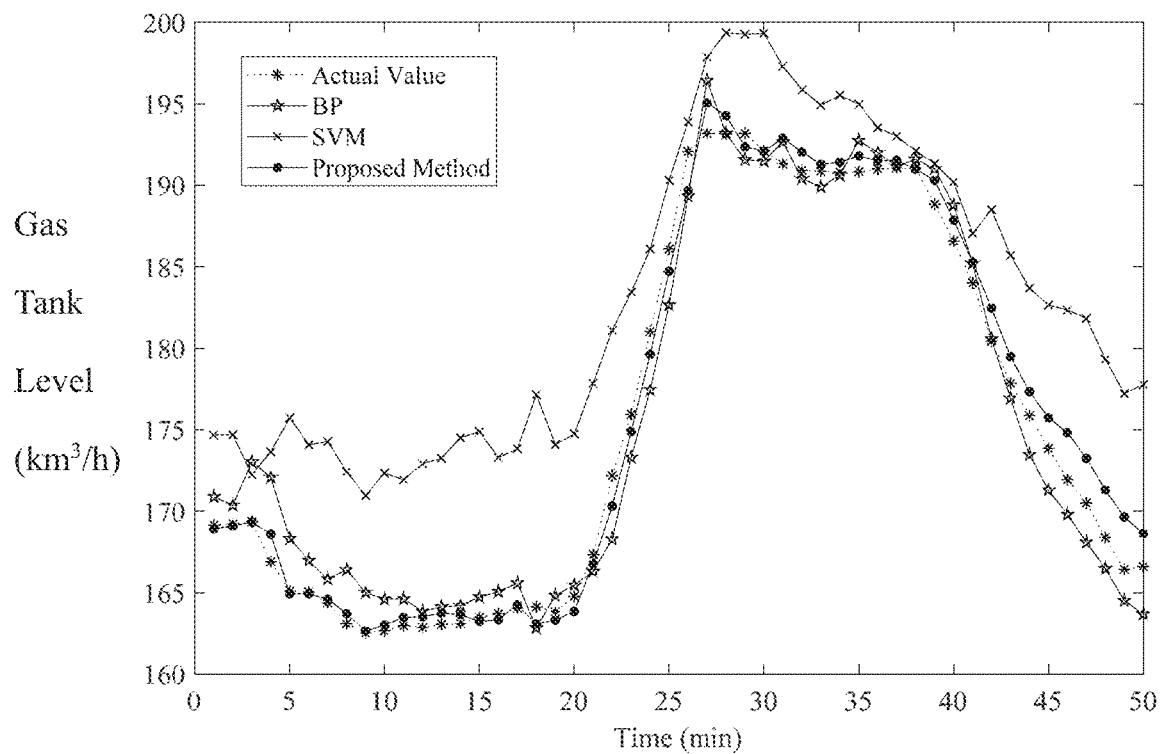
FIG. 20 is a comparison diagram of forecast results of gas reserves of a factor model.

FIG. 20 is a comparison diagram of forecast effects of blast furnace gas capacity of the error back propagation neural network (BP) method, the support vector machine (SVM) method and the present invention, and the comparison of the forecasting accuracy is shown in Table 7. It can be known from the statistic result that the method of the present invention has higher accuracy and can provide more reliable support for subsequent optimal scheduling.

TABLE 7

Comparison of Forecast Results of Three Methods

| Forecasting Method | MAPE | RMSE |
|---|---|---|
| BP | 0.0079 | 2.0225 |
| SVM | 0.0439 | 8.1252 |
| The present invention | 0.0060 | 1.2988 |

3) Scheduling of multiple by-product gas systems The balance of supply and demand of each system is analyzed based on the trend forecast result of the generation-consumption-storage unit of each gas system. When energy safety events occur, it is necessary to give a reasonable scheduling interval according to the safety constraints of the gas capacity, so as to ensure the safe operation of the by-product gas system. First, according to the capacity operation states of the blast furnace gas (BFG) system, the coke oven gas (COG) system and the linz-donawitz converter gas (LDG) system, the balance of each system is judged with system safety indexes as constraints to give scheduling suggestions (whether adjustment is needed and the corresponding adjustable range) of each single-medium system. Second, with the adjustable range of each single-gas medium and the load capacity of each adjustable user (such as power plant and boiler) as constraints, the comprehensive adjustable range of multiple gas media is calculated. Finally, the adjustable range for optimal scheduling is obtained by integrating the adjustable range of each pipe network and the adjustable range of multiple media. The calculation method for the adjustable range of each stage is as follows:

① Solving the adjustable range of a single medium

Figure 21:
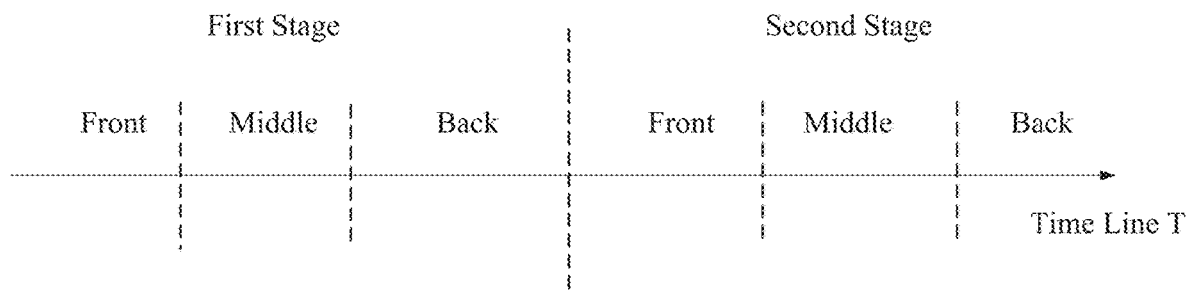
FIG. 21 is a structural diagram of solving an adjustable range of a single gas medium.

The calculation process of the adjustable range of a single medium is shown in FIG. 21. According to the balance state of the system, a two-stage judgment method is proposed. The first stage is a short-term period, and the second stage is a long-term period. Each stage is divided into three parts, the state (ultrahigh high limit, ultrahigh limit, etc.) of each part is judged, and the overall state of each stage is judged according to the state of each part, so as to judge the adjustment of the pipe network. The system adjustable range is obtained by circularly judging the state of the pipe network under each adjustment value. When the capacity state under this adjustment value is judged to require no adjustment, the adjustment value at this moment can be adopted. The adjustment value within the adjustment range is judged circularly, finally obtaining the adjustable range. Supposing that the use flow of blast furnace gas, coke oven gas and linz-donawitz converter gas is $x^s$, $y^s$ and $z^s$ respectively, the adjustable ranges can be defined as $[x_1{}^s, x_2{}^s]$, $[y_1{}^s, y_2{}^s]$ and $[z_1{}^s, z_2{}^s]$ respectively.

② Solving the adjustable range of multiple media

According to the principle that the total calorific value of gas used by a multi-media adjusting user is constant, the use range of each medium within the adjustable range under the multi-media adjusting user is calculated as shown in formula (48):

$$\text{Total\_cal} = \text{bfg\_cal} \times x + \text{cog\_cal} \times y + \text{ldg\_cal} \times z \tag{48}$$

wherein Total_cal is the gross calorific value of the multi-media adjusting user, and bfg_cal, cog_cal and ldg_cal are respectively the calorific value of each gas medium. Formula (49) can be obtained by the elimination method:

$$x^s = \frac{\text{Total\_cal} - (\text{cog\_cal} \times y + \text{ldg\_cal} \times z)}{\text{bfg\_cal}} \tag{49}$$

The value ranges $[x_1{}^{s'}, x_2{}^{s'}]$, $[y_1{}^{s'}, y_2{}^{s'}]$ and $[z_1{}^{s'}, z_2{}^{s'}]$ of $x^s$, $y^s$ and $z^s$ in the case of $y^s \in [y_1{}^s, y_2{}^s]$, $z^s \in [z_1{}^s, z_2{}^s]$ and $x^s \in [x_1{}^s, x_2{}^s]$ are solved, that is the adjustable range of each gas medium after multi-media adjustment is considered. Then, the final adjustable ranges $[x_1{}^{s''}, x_2{}^{s''}]$, $[y_1{}^{s''}, y_2{}^{s''}]$ and $[z_1{}^{s''}, z_2{}^{s''}]$ for optimal scheduling are obtained through interval differencing, as shown in formulae (50)-(52) respectively:

$$[x_1{}^{s''}, x_2{}^{s''}] = [x_1{}^s, x_2{}^s] - [x_1{}^{s'}, x_2{}^{s'}] \tag{50}$$

$$[y_1{}^{s''}, y_2{}^{s''}] = [y_1{}^s, y_2{}^s] - [y_1{}^{s'}, y_2{}^{s'}] \tag{51}$$

$$[z_1{}^{s''}, z_2{}^{s''}] = [z_1{}^s, z_2{}^s] - [z_1{}^{s'}, z_2{}^{s'}] \tag{52}$$

Figure 22A:
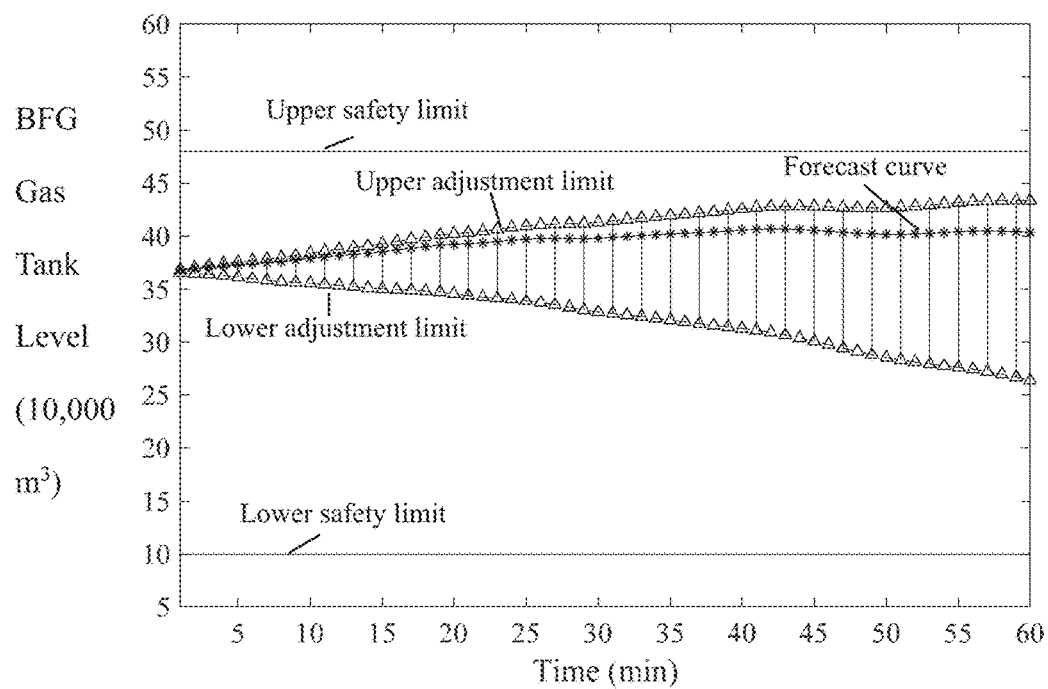
FIG. 22(a) shows an adjustable range of the capacity of a BFG system.
Figure 22B:
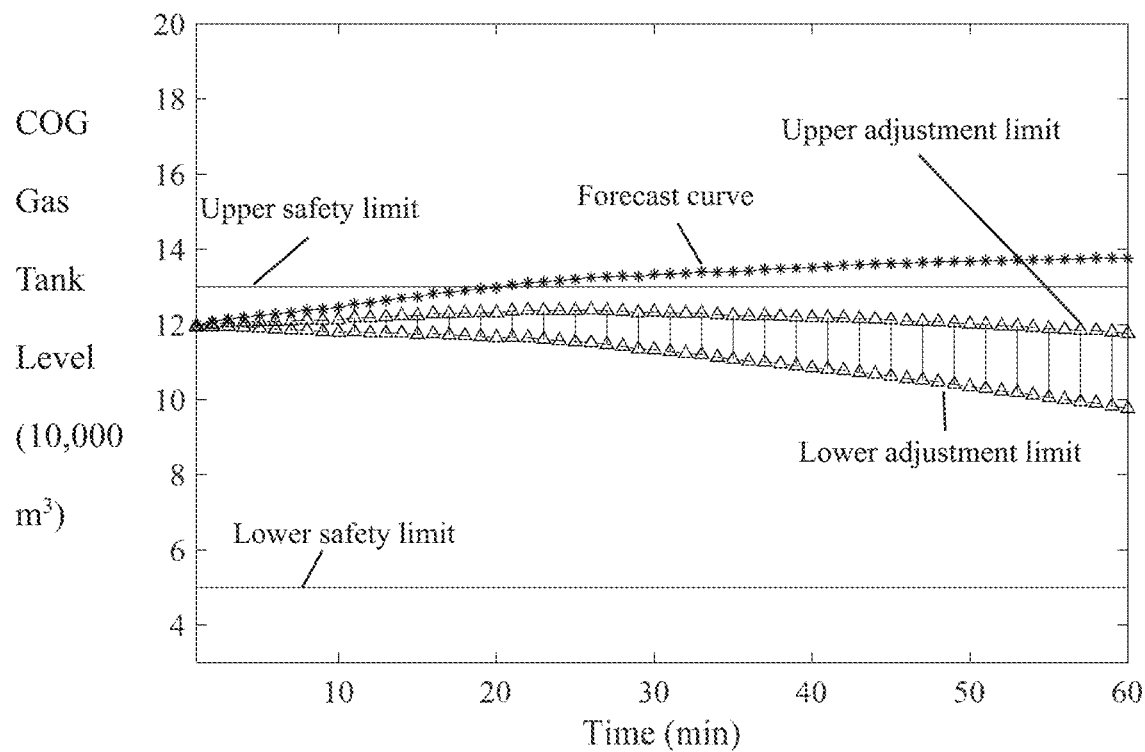
FIG. 22(b) shows an adjustable range of the capacity of a COG system.
Figure 22C:
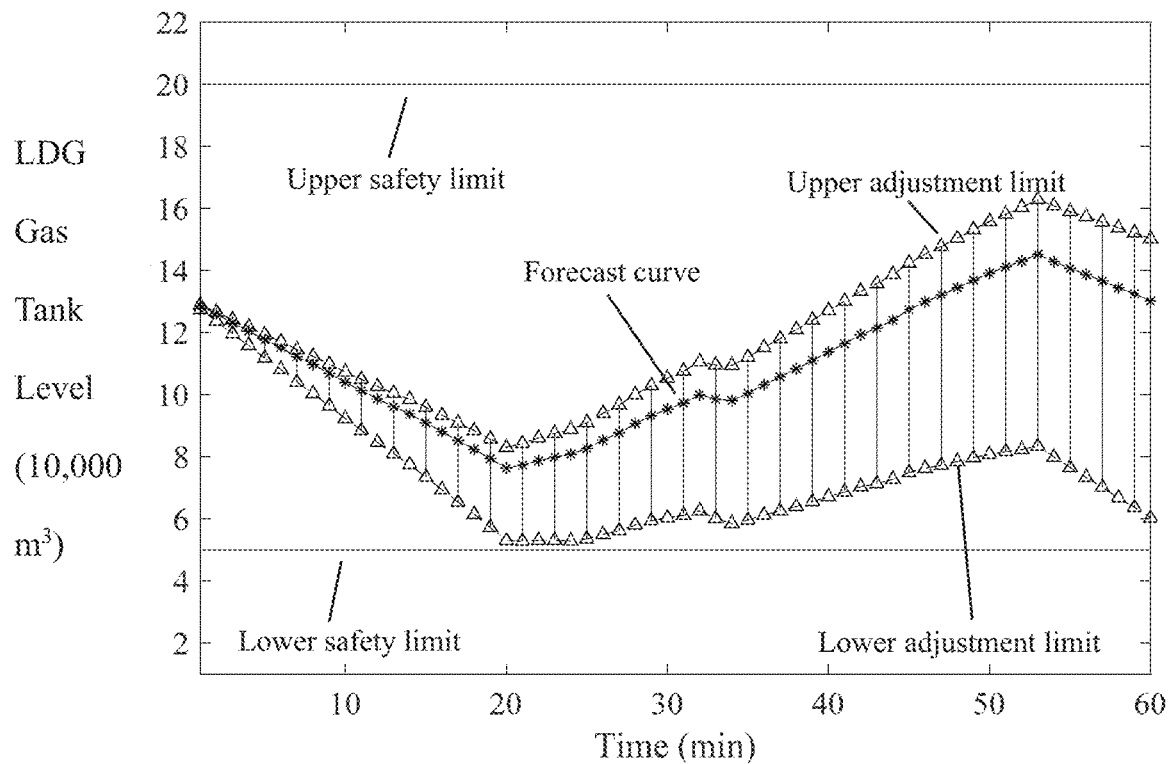
FIG. 22(c) shows an adjustable range of the capacity of an LDG system.

FIG. 22(a), FIG. 22(b) and FIG. 22(c) respectively show the adjustable range of each gas system calculated by the method of the present invention in certain scheduling, respectively "−30,000-140,000 m³/h", "20,000-40,000 m³/h" and "−20,000-70,000 m³/h". It can be seen from the figure that the method of the present invention can give a reasonable adjustment range of each gas system on the premise of meeting the safety limit of the capacity, so as to provide reliable constraint conditions for subsequent optimal scheduling of comprehensive energy.

4) Collaborative Optimization and Scheduling of Comprehensive Energy

Figure 23:
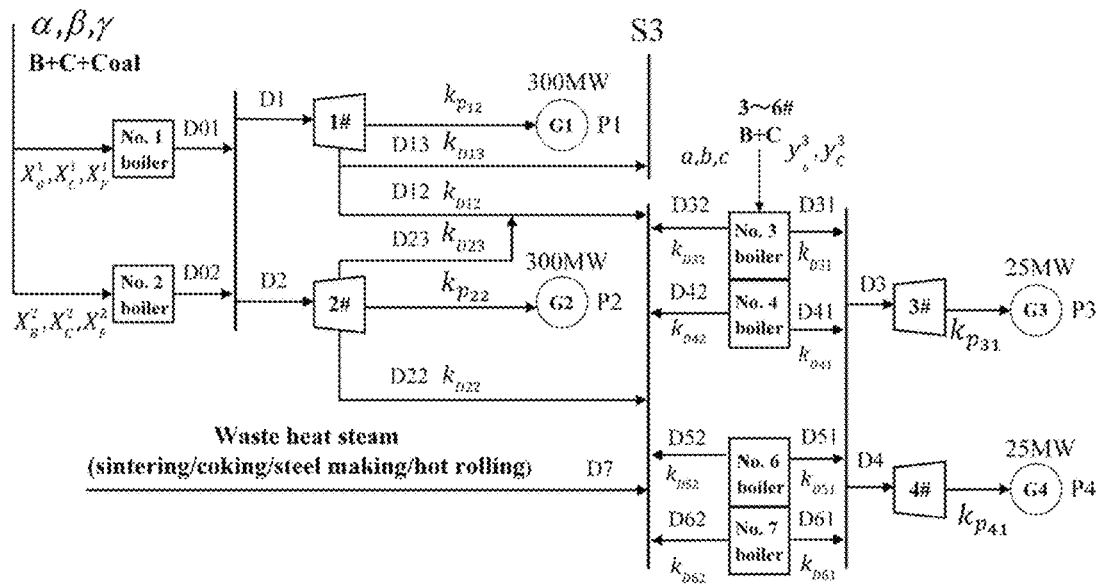
FIG. 23 is a structural diagram of a heat and power system.

The combined heat and power (CHP) system of the steel enterprise is shown in FIG. 23. High pressure steam is only supplied to two 25 MW generating sets ($ST_3$, $G_3$ and $ST_4$, $G_4$), and the rest use medium pressure steam, comprising two 300 MW generating sets ($ST_1$, $G_1$ and $ST_2$, $G_2$), two $135^T$ gas boilers ($BLR_3$ and $BLR_4$), and two $35^T$ boilers ($BLR_5$ and $BLR_6$). Because the comprehensive energy efficiency of each device is different, it is necessary to achieve the optimal distribution of energy consumption of each set and each boiler to improve energy efficiency and reducing costs.

Considering that the adjustable range of byproduct gas (BFG and COG) and the total steam demand within a forecasting period $t_0$-$t_1$ have been determined based on the aforementioned forecasting model, the energy consumption of combined heat and power sets and boilers can be optimally distributed to minimize the energy cost (the sum of cost of self-produced energy (such as BFG, COG and steam) and cost of self-generating electricity (coal price)) and maximize the comprehensive energy efficiency, and the corresponding objective functions are respectively shown in formula (53) and formula (54):

$$\min J_{co} = \sum_{i^{mf}}^{3} q^u_{i^{mf}} X_{i^{mf}} - q^g_{power} P^g_{total} - q^g_{steam} F^g \tag{53}$$

$$\max J_{effc} = (KH_{steam} F^g + KH_{ele} P_{total}{}^g)/\Sigma_{i^{mf}=1}^{3} KH_{i^{mf}} X_{i^{mf}} \tag{54}$$

wherein $J_{co}$ represents energy cost, g represents generating capacity, and u represents consumption. Since the energy cost of an energy center is calculated independently from that of other plants (iron works, steel works, etc.), the cost of the energy center is taken as the target for optimization in this example $$\sum_{i^{mf}}^{3} q^u_{i^{mf}} X_{i^{mf}}$$

is the sum of consumption costs of byproduct gas and purchased coal, and $q_{i^{mf}}{}^u$, is the unit price of the $(i^{mf})^{th}$ medium ($i^{mf}$=1, 2, 3, respectively representing BFG (yuan/m³), COG (yuan/m³) and coal (yuan/t)). $q_{power}{}^g$ and $q_{steam}{}^g$ respectively represent the unit price of power generation (yuan/kwh) and the unit price of steam generation (yuan/t, the price of high pressure steam is the same as that of medium pressure steam) of a heat and power system, and $P_{total}{}^g$ and $F^g$ are respectively the total amount of self-generating electricity (kwh) and the total amount of steam generation (t). $J_{eff}$ is the comprehensive energy efficiency of a heat and power set. $KH_{steam}$ and $KH_{ele}$ respectively represent conversion coefficients (kg/m³ and kg/kwh) of total steam consumption and total power generation into standard coal. $KH_{i^{mf}}$ represents the conversion coefficient (kg/m³ and kg/t) of each energy medium (BFG, COG and coal). The corresponding constraint conditions are shown in formula (55):

$$\begin{cases} X_1 = 1/(1-\delta_B) \sum_{i_1=1}^{6} F^{BLR}_{BFG,i_1} & (c1) \\ X_2 = 1/(1-\delta_C) \sum_{i_1=1}^{6} F^{BLR}_{COG,i_1} & (c2) \\ X_3 = 1/(1-\delta_M) \sum_{i_2=1}^{2} F^{BLR}_{M,i_2} & (c3) \\ D^{BLR}_{S,i_2} = f_{i_2}(F^{BLR}_{BFG,i_2}, F^{BLR}_{COG,i_2}, F^{BLR}_{M,i_2}), (i_2 = 1, 2) & (c4) \\ D^{BLR}_{S,j_1} = f_{j_1}(F^{BLR}_{BFG,j_1}, F^{BLR}_{COG,j_1}), (j_1 = 3, 4, 5, 6) & (c5) \\ \sum_{i_2=1}^{2} D^{BLR}_{S,i_2} = \sum_{j_2=1}^{2} D^{ST}_{T,j_2} & (c6) \\ \sum_{i_3=1}^{4} D^{BLR}_{HS,i_3} = \sum_{j_3=3}^{4} D^{ST}_{T,j_3} & (c7) \\ D^{ST}_{T,j_2} = D^{ST}_{P,j_2} + D^{ST}_{S,j_2}, (j_2 = 1, 2) & (c8) \\ P^{g}_{total} = \sum_{i_3=1}^{4} P^{ST}_{i_3} & (c9) \\ F^{u}_{M} = (1-\delta_S)\left(\sum_{i_2=1}^{2} D^{ST}_{S,i_2} + \sum_{j_1=3}^{6} D^{BLR}_{S,j_1} + F^r\right) & (c10) \\ \sum_{i_3=1}^{4} D^{ST}_{T,i_3} = (1-\delta_S) \sum_{j_1=3}^{6} D^{BLR}_{HS,j_1} & (c11) \\ F^{g} = 1/(1-\delta_S)\left(F^{u}_{M} + \sum_{i_3=3}^{4} D^{ST}_{T,i_3}\right) & (c12) \\ Pa^L < Pa_0 + K_{pa}F^g < Pa^H & (c13) \end{cases} \quad (55)$$

The constraint conditions in formula (55) can be described as follows:

c1-c3: $X_1$ and $X_2$ are respectively the total flow of BFG and the total flow of COG input by each boiler, and $X_3$ is the total consumption of coal. $\delta_B$, $\delta_C$ and $\delta_M$ are respectively the corresponding loss rates;

c4-c6: the relationship between the input and the output of each device, and $f(\bullet)$ is the corresponding fitting relationship;

c7-c8: balance of generation and consumption of high pressure steam and medium pressure steam;

c9: constraints on self-generating capacity;

c10-c12: balance constrains on steam pipe network, $F^r$ is the total recovery amount of waste heat, and $\delta_s$ is the loss rate of steam;

c13: constraints on pressure of steam pipe network. $Pa^L$ and $Pa^H$ are respectively the upper limit and the lower limit of the pressure of a steam pipe network in the south area, and $Pa_0$ represents the initial state of the pressure; and $K_{pa}$ is the conversion coefficient of flow to pressure;

Then the swarm intelligence optimization method is adopted for solution, thus obtaining a scheduling scheme with optimal economy.

Figure 24A:
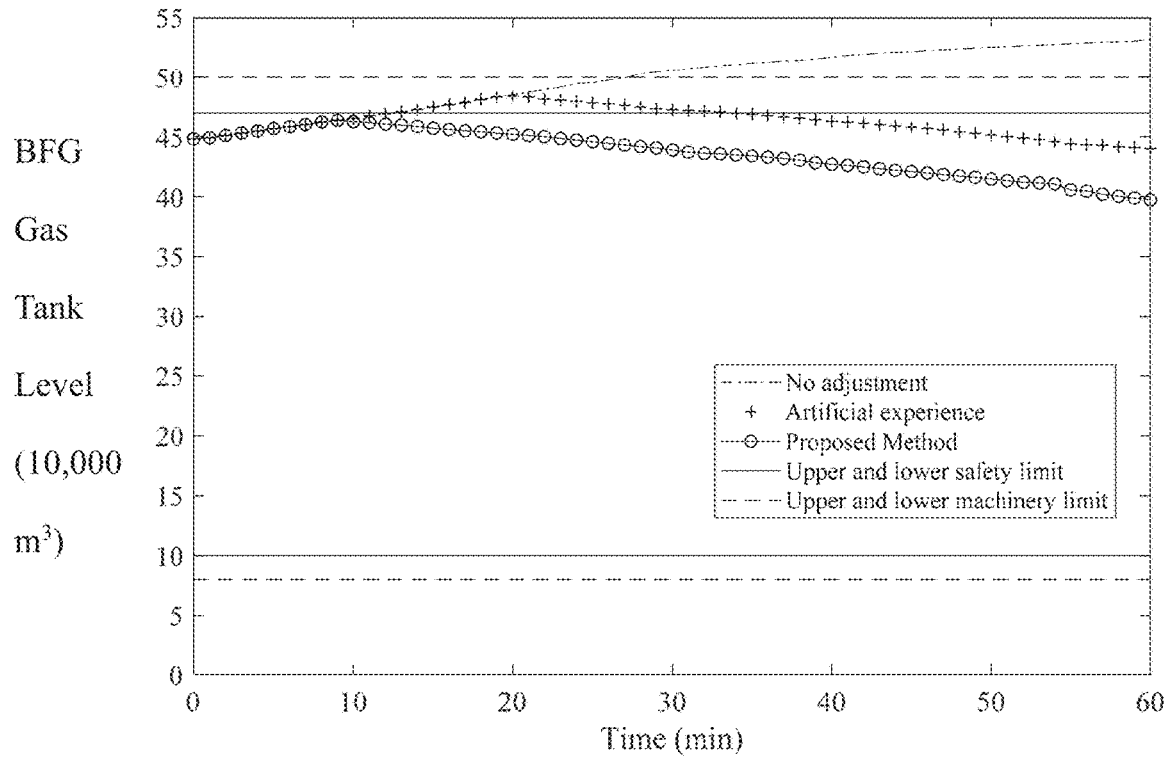
FIG. 24(a) is a trend chart of the capacity of a BFG system after scheduling.
Figure 24B:
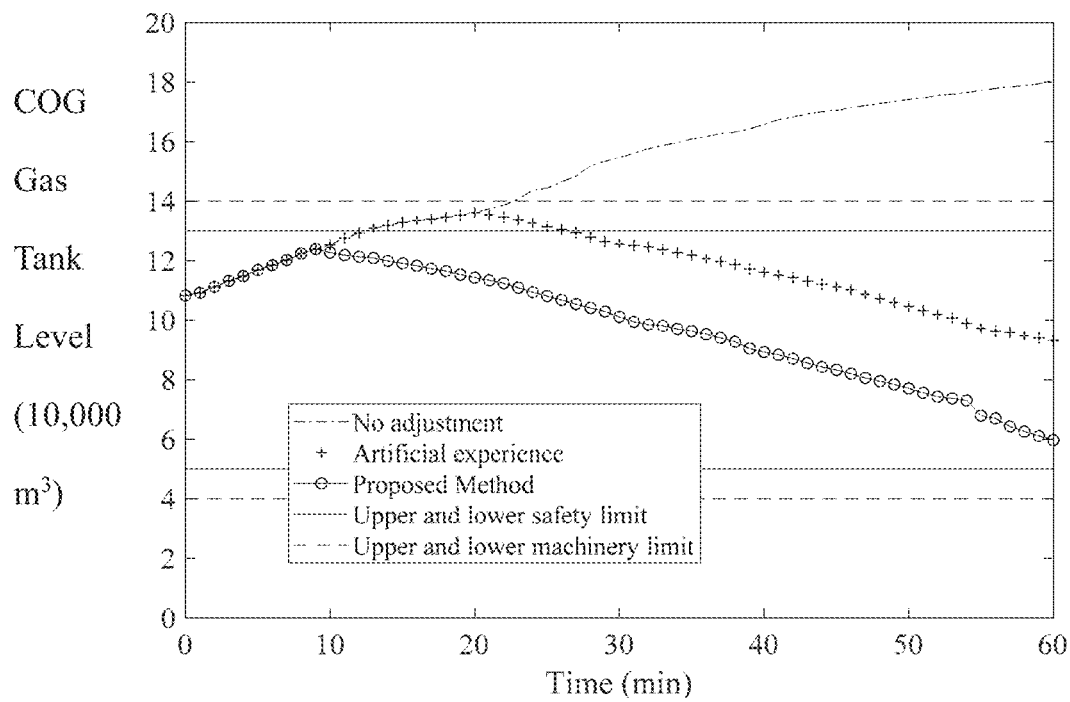
FIG. 24(b) is a trend chart of the capacity of a COG system after scheduling.
Figure 24C:
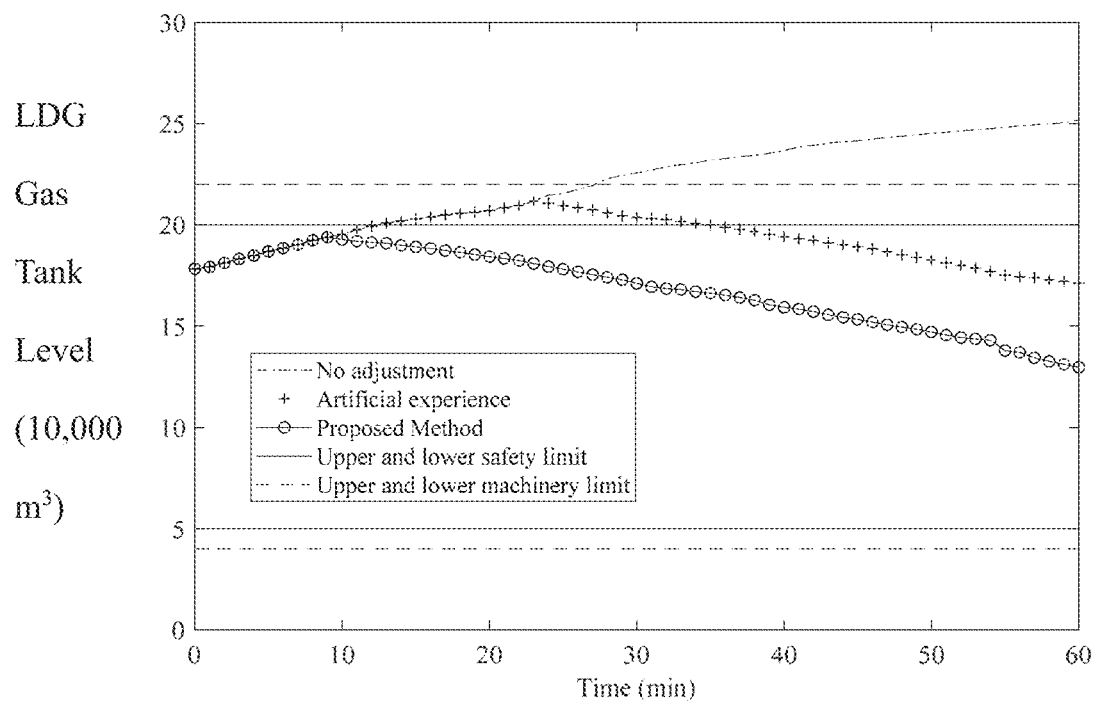
FIG. 24(c) is a trend chart of the capacity of an LDG system after scheduling.

With certain scheduling as an example, the scheduling effects of BFG, COG and LDG systems are shown in FIG. 24(a), FIG. 24(b) and FIG. 24(c) respectively, and the statistics are shown in Table 8. On the premise of satisfying the balance of supply and demand of a steam system and the safe operation of a gas system, a scheduling scheme is given and simulated, and compared with the scheduling based on artificial experience. Results show that the present invention has more reasonable calculation of adjustment amount and lower economic cost of single scheduling. It can be seen that the method of the present invention has good effect on scheduling of the integrated energy system of steel enterprises and can provide a reliable basis for energy conservation, emission reduction, cost reduction and efficiency increase for steel enterprises.

TABLE 8

Index Statistics after Scheduling Compared with Artificial Experience

| Scheduling Method | Cost reduced within 1 h (yuan) | Whether exceeding safety limit | Whether exceeding mechanical limit | Whether to emit |
|---|---|---|---|---|
| Artificial experience | 0 | Yes | No | Yes |
| The present invention | 2835.4 | No | No | No |

(2) Background Service: Computing Trigger Mechanism with Edge-Cloud Cooperation

The background service is divided into two parts: the cloud service is deployed on the cloud server and receives parameter updating instructions triggered by edge side computing service and human-machine interaction. The background service on the edge side reads and serializes required real-time samples of each energy system and auxiliary information such as production plan messages and production signals from the relational database, takes the processed data samples and relevant information such as plans as input of the "*.iail" model, and forecasts the trend of concerned users in a future period of time to invoke an optimal scheduling model to compute scheduling suggestions and display same on the human-machine interface of the human-computer interface. In general, the background service updates the computed results every 3 minutes to ensure timeliness of data and adaptability of the system.

(3) Human-computer interface: display of computed result and human-machine interaction The human-computer interface reads the results saved in the database and displays same on the human-machine screen with the refresh frequency of 1 minute. In the case of unplanned temporary changes (such as temporary wind break of blast furnace) in working conditions of production, operators can trigger feedback information to the cloud service through the human-machine interface, and the cloud service will trigger the edge side model to realize self-updating of parameters. Meanwhile, interaction with artificial knowledge data such as forecasting accuracy, scheduling results and scheduling rules through a standardized template can also be realized through an interface of the human-computer interface, and the background service will realize self-updating of the rule base according to artificial knowledge. The practicability and the computing accuracy of the platform are further improved by means of blended learning of human-machine integration.

The invention claimed is:

1. A distributed industrial energy operation optimization platform automatically constructing intelligent models and algorithms, comprising:
   a modeling terminal, a background service and a human-computer interface, wherein
   starting from business scenarios, the modeling terminal is the core part of the whole platform, and integrates mathematical models in the form of modules; in consideration of obvious difference in features of heterogeneous energy flow in the industrial production process, a general intelligent module for multiple production scenarios, multiple response scales, multiple display modes and multiple working conditions switching is provided; complex models can be built and trained by logic splicing based on services by means of drag and drop; meanwhile, an adaptive algorithm is embedded in each module to dynamically optimize parameters, thus ensuring the adaptive and generalization abilities of models; then, the built models are saved as separate "*.iail" files for repeated invocation; and the modeling terminal is divided into a data pre-processing module, an energy generation-consumption-storage trend forecasting module, an optimal scheduling decision module, a parameter optimization configuration module and a result display module, and each module comprises a plurality of models for different working condition scenarios;

the modeling terminal supports the following two interactive modes:

(1) on-line model computing: this interactive mode realizes the integration of model training and computing processes; in this interactive mode, a user gets access to the original data through an interface, then automatically completes model training and parameter optimization according to a built logic, and displays the results through the figure/table module; and the model is not saved, and will be retrained in the next computing;

(2) off-line model computing: in this interactive mode, model training and computing are two independent processes; and in the real-time computing process, an off-line model obtained by training of historical data is invoked, the parameters of the model are fixed, and the computing process is not updated;

the background service is respectively deployed on a cloud service and a edge side service; the edge side service performs real-time computing by reading and serializing information including industrial operation data and production plans/signals, then building training samples according to the standardized format and invoking the saved "*.iail" model file interface, and saves the results in a relational database of the cloud service; and the cloud service receives the foreground trigger information and the working conditions switching signals obtained by analysis of the edge side, so as to trigger the edge side model for self-updating to realize the adaptive adjustment of parameters of the model;

the human-computer interface realizes an interface display of the computed result of the model; the interface is refreshed every minute to update the computed result in time; and in the case of temporary adjustment of working conditions, the temporary adjustment of working conditions is fed back to the cloud through human-machine interaction, and the cloud service will trigger the adaptive optimization of the parameters of the edge side model, so as to better meet the actual demand;

a platform-based modeling terminal builds a filtering model, a filling model, a forecasting model and a scheduling model by visual drag and drop, and saves the filtering model, the filling model, the forecasting model and the scheduling model as intelligent model files;

wherein the edge side service reads actual industrial data, builds training samples according to the standardized format, invokes a model file interface, performs real-time computing based on information including real-time data and production plans/signals, and saves the results in the relational database;

wherein an outlier detection method is as follows:

production data have aperiodic characteristics or periodic characteristics;

for production data with aperiodic characteristics, an adaptive fuzzy C-means (AFCM) clustering method is for outlier detection, which can effectively identify outliers and improve the clustering quality by introducing adaptive vectors and adaptive indexes to adjust and control clustering, and steps of the outlier detection method are as follows:

step 1: performing AFCM clustering on a time series to be detected to obtain $c^{od}$ cluster centers which are defined as $v_1^{od}, \ldots, v_c^{od\,od}$;

step 2: calculating the minimum distance between each data point in the time series and each cluster center;

step 3: determining the threshold of an abnormal distance through a box figure, wherein distance values which are more than the threshold are determined as outliers; first, by arranging the data from small to large, and respectively calculating an upper quartile $Q_3^{od}$ and a lower quartile $Q_1^{od}$; then calculating an interquartile range $IQR^{od}=Q_3^{od}-Q_1^{od}$; and finally, calculating an outlier cut-off point $Q^{od}=Q_3^{od}+1.5*IQR^{od}$;

the accuracy of the method is judged by a misjudgment ratio $\eta_w^{od}$ and an omission factor $\eta_f^{od}$, of which the formulae are respectively shown in formula (1) and formula (2):

$$\eta_{w^{od}}^{od} = \frac{n_{w^{od}}^{od}}{n_{t^{od}}^{od}} \quad (1)$$

$$\eta_{f^{od}}^{od} = \frac{n_{f^{od}}^{od}}{n_{w_r^{od}}^{od}} \quad (2)$$

wherein $n_{w^{od}}^{od}$ and $n_{t^{od}}^{od}$ are respectively the number of misjudgments and the number of detection results, and $n_{f^{od}}^{od}$ and $n_{w_i^{od}}^{od}$ are respectively the number of omissions and the number of actual outliers;

for production data with periodic characteristics, a method based on dynamic time warping is used to detect outliers; and the steps of the outlier detection method are as follows:

step 1: dividing historical data samples into $n^{od}$ sample series $[x_1^{od}, \ldots, x_{n^{od}}^{od}]$ with similar length to the data to be detected according to the periodic characteristics;

step 2: calculating the sum $SumD_{k^{od}}^{od}$ of dynamic time warping (DTW) distances between the series $X_{i^{od}}^{od}$ and other $n^{od}-1$ series; when $SumD_{k^{od}}^{od}=\min\{SumD_{k^{od}}^{od}, \ldots, SumD_{n^{od}}^{od}\}$ for the $(k^{od})^{th}$ series, taking the corresponding $X_{k^{od}}^{od}$, as a center sample, which is recorded as $Y^{od}$; letting the time warping function be $C^{od}=\{c^{od}(1), c^{od}(2), \ldots, c^{od}(N)\}$, where N represents the path length, $c^{od}(n_{x_i}^{od})=(i^{od}, j^{od})$ represents the $(n_{x_i}^{od})^{th}$ matching point pair composed of the feature vector $x_i^{od}$ of the series $X^{od}$ and the $(j^{od})^{th}$ feature vector $y_{j^{od}}$ of the series $Y^{od}$, and the distance $d^{od}(i^{od}, j^{od})$ between the two is the local matching distance; and the DTW algorithm minimizes the sum of distances through local optimization, as shown in formula (3):

$$D^{od}(m_1^{od}, m_2^{od}) = \min\left\{\sum_{n^{od}=1}^{N^{od}} d^{od}(x_{i^{od}}^{od}, y_{j^{od}}^{od})\right\} \quad (3)$$

step 3: with the series $X^{od}$ of a sample to be detected as the reference, scaling the center sample $Y^{od}$ based on DTW to obtain $Y_*^{od}$, wherein the scaling process meets formula (4):

$$Y_*^{od}\left[j^{od}\right] = \frac{1}{\left|\left\{k^{od} \mid x_{j^{od}}^{od} \to y_{j^{od}}^{od}\right\}\right|} \sum_{\substack{x_{j^{od}}^{od} \to y_{j^{od}}^{od}}} y_{j^{od}}^{od} \quad (4)$$

wherein $k^{od}$ represents the number of points corresponding to the series $Y^{od}$ and the series $X^{od}$ in the DTW process, and the symbol $x_{j^{od}}^{od}$ represents that the point $x_{j^{od}}^{od}$ in the series $X^{od}$ corresponds to the point $y_{j^{od}}^{od}$ in the series $Y^{od}$;

step 4: performing AFCM clustering on the scaled series $Y_*^{od}$ to obtain a cluster center $v_*^{od}$, and calculating the minimum distance between each point in the sample to be detected and all cluster centers; and step 5: obtaining a threshold for determining an abnormal distance by calculation through a box figure; wherein the distance values which are more than the threshold are determined as outliers.

2. The distributed industrial energy resource operation optimization platform automatically building intelligent models and algorithms according to claim 1, wherein the filtering model is as follows:

for real-time data of different working condition scenarios, different intelligent methods are integrated into a filtering module;

(1) for working condition scenarios with discrete features in the production process, the feature data are obvious, and a moving average filtering method is adopted;

(2) for working condition scenarios with continuous production features, the data generally contain white noise, and the acquired data are processed by the empirical mode decomposition method.

3. The distributed industrial energy resource operation optimization platform automatically building intelligent models and algorithms according to claim 1, wherein a missing value fill method is as follows:

the basic features are analyzed based on the historical sample data and divided into different working condition scenarios, and different filling methods are respectively proposed for discrete single-point missing and continuous multi-point missing;

case 1, for discrete single-point missing, filling is divided into two conditions according to the data standard deviation; where under the working condition where the standard deviation is less than ε, data are filled by means of moving average; and under the working condition where the standard deviation is more than ε, data are filled by means of cubic spline interpolation;

case 2, for continuous missing in data, an autoregressive integrated moving average model (ARIMA) is used to fill segments; the Akaike Information Criterion (AIC) and the Bayesian Information Criterion (BIC) are taken as evaluation indexes of the autoregressive integrated moving average model, and a ($p^{tb}$, $q^{tb}$) combination minimizing AIC or BIC is taken as the optimum parameter of the model where $p^{tb}$ and $q^{tb}$ respectively represent the two parameters of the autoregressive moving average model, $p^{tb}$ is the number of autoregressive terms, and $q^{tb}$ is the number of moving average terms; then the complete data segments before and after the missing segment are respectively taken as training samples, the data of the missing segment are forecast based on the ARIMA model, and the average value of two forecast results is taken as the fill value to ensure full utilization of the sample information so as to improve the filling accuracy; and steps of the missing value fill method are as follows:

step 1: judging the information features of time series data to be filled comprising the miss rate of data, the missing situations of missing points, the periodicity of time series and the standard deviation of time series; if all the missing points in the time series are discrete missing, executing step 2; where if all the missing points in the time series are continuous missing, executing steps 4-5; and if discrete missing points and continuous missing points both exist in the time series, executing step 2 first, and then executing steps 4-5 repeatedly for each continuous missing data segment;

step 2: if the standard deviation of the series is less than ε, filling discrete points by means of moving average; otherwise, executing step 3;

step 3: carrying out filling by means of cubic spline interpolation;

step 4: filling data based on the autoregressive integrated moving average (ARIMA) model;

and selecting complete series before and after the missing data segment as samples to forecast the data of the missing segment respectively, so as to calculate the average value of the two forecast results as the fill value; and step 5: establishing an ARIMA model to forecast the missing data segment, and taking the average value of the two forecast results as the fill value.

4. The distributed industrial energy resource operation optimization platform automatically building intelligent models and algorithms according to claim 1, wherein an energy trend forecast method is as follows:

an energy generation-consumption forecasting for class period feature working conditions comprises the following specific steps:

step 1: dividing historical sample data into a training set and a validation set, wherein the training set is used for training the model and the validation set is used for validating the model accuracy;

step 2: for an echo state network (ESN) method, optimizing the embedded dimensions of samples and a number of nodes in a reservoir of an ESN model by the particle swarm optimization (PSO) algorithm, the number of nodes being a parameter of the reservoir;

step 3: for a least square support vector machine (LSSVM) method, optimizing the embedded dimensions of samples and the intrinsic parameters (penalty coefficient and kernel parameter) of the algorithm by the PSO algorithm; and step 4: evaluating the ESN and LSSVM methods based on the training accuracy, and taking the computed result of the method with higher accuracy as the forecast result of the model and direct modeling as follows:

step a: initial filling and data set building based on phase space reconstruction; extracting time series data of a period of time from the real-time relational database of an industrial field, detecting and recording positions of missing points in the time series, and filling all missing points with zero values; wherein the function of phase space reconstruction is to build a training sample set; and a discrete time series $\{x_1^{sl}, x_2^{sl}, \ldots, x_{N^{sl}}^{sl}\}$, wherein $x_i^{sl}$ represents the value acquired at the $(i^{sl})^{th}$ sampling moment, and $i^{sl}=1, 2, \ldots, N^{sl}$; wherein the $(j^{sl})^{th}$ phase vector $x_{j^{sl}}^{sl}$ is shown in formula (5):

$$X_{j^{sl}}^{sl} = (x_{j^{sl}}^{sl}, x_{j^{sl}+1}^{sl}, \ldots, x_{j^{sl}+p^{sl}-1}^{sl})^T \qquad (5)$$

wherein $p^{sl}$ is an embedded dimension of the phase vector, and the matrix form of $N^{sl}$ input samples is $X^{sl}=[x_1^{sl}, x_2^{sl}, \ldots, x_{N^{sl}}^{sl}]^T$;

step b: building of relevance vector machine (RVM) model based on incomplete data set; building an initial RVM model, by building a functional relationship between input and output variables; and wherein the mapping relationship between the $(i^{sl})^{th}$ function value $y_{i^{sl}}^{sl} \in R$ and an input vector $x_{j^{sl}}^{sl}$ as shown in formula (6):

$$x_{i^{sl}}^{sl} = \sum_{j^{sl}=1}^{N^{sl}} w_{j^{sl}}^{sl} K(x_{i^{sl}}^{sl}, x_{j^{sl}}^{sl}) + w_0^{sl} + \varepsilon_{i^{sl}}^{sl} = (\phi_{i^{sl}}^{sl})^T w^{sl} + \varepsilon_{i^{sl}}^{sl} \qquad (6)$$

wherein $\phi_{i^{sl}}^{sl} = [1, K(x_{i^{sl}}^{sl}, x_1^{sl}), K(x_{i^{sl}}^{sl}, x_2^{sl}), \ldots, K(x_{i^{sl}}^{sl}, x_{N^{sl}}^{sl})]^T$ and $i^{sl}=1, 2, \ldots, N^{sl}$; $w^{sl}=[w_0^{sl}, w_1^{sl}, \ldots, w_{N^{sl}}^{sl}]^T$ represents a weight vector, and $K(x_{i^{sl}}^{sl}, x_{j^{sl}}^{sl})$ is a kernel function which is a Gaussian kernel function; $\varepsilon_{i^{sl}}^{sl}$ represents a Gaussian distribution noise term with the mean value of 0 and the variance of $\sigma^2$; and the weight vector $w^{sl}$ is considered as a continuous random variable; and each element obeys normal distribution with the mean value of 0 and different variances, as shown in formula (7):

$$p(w^{sl} | \alpha) = \prod_{i^{sl}=0}^{N^{sl}} N(w_{i^{sl}}^{sl} | 0, \alpha_i^{-1}) \qquad (7)$$

wherein $\alpha=[\alpha_0, \alpha_1, \ldots, \alpha_N]^T$, and $A=\text{diag}(\alpha)$; parameters $\alpha$ and $\beta$ are considered as random variables which obey Gamma distribution; a noise variance vector is written as $\beta=[\beta_{[m]}, \beta_{[m]}, \ldots, \beta_{[m]}, \beta_{[obs]}, \beta_{[obs]}]^T$, and $\beta_{[obs]} \equiv \sigma^{-2}$; in addition, $\beta$ also can be written as $\beta=[\beta_{[m]}^T, \beta_{[obs]}]^T$ in the form of diagonal matrices $B_{[m]}=\text{diag}(\beta_{[m]})$, $B_{[obs]}=\text{diag}(\beta_{[obs]})$ and $B=\text{diag}(\beta)$; a training output set is composed of missing points and observable points, wherein $x^{sl}=[(x_{[m]}^{sl})^T, (x_{[obs]}^{sl})^T]^T$, $x_{[m]}^{sl}$ and $x_{[obs]}^{sl}$ respectively represent the vectors of missing points and observable points in the output set, the number of output missing points and that of output observable points are respectively $N_{ymiss}^{sl}$ and $N_{yobs}^{sl}$, and $N^{sl}=N_{ymiss}^{sl}+N_{yobs}^{sl}$; the element $\beta_{[m]}$ in $\beta_{[m]}$ is defined as $10^8$ to ensure that the noise variance of the corresponding missing output point is not affected; and the likelihood function is shown in formula (8):

$$p(x_{[m]}^{sl}, x_{[obs]}^{sl} | w, \beta) = N(x^{sl} | \Phi^{sl} w^{sl}, B^{-1}) = \qquad (8)$$
$$1 / \left[(2\pi)^{N^{sl}/2} |(B^{sl})^{-1}|^{1/2}\right] \times \exp\left\{-\frac{1}{2}[x^{sl} - \Phi w^{sl}]^T B[x^{sl} - \Phi w^{sl}]\right\}$$

wherein $\Phi^{sl}=[\phi_1^{sl}, \phi_2^{sl}, \ldots, \phi_{N^{sl}}^{sl}]^T$ is a kernel function matrix; aiming at the optimization problem of a missing input point $x_{[m]}^{sl}$, and considering the characteristics of the sample set built by phase space reconstruction, each missing input point has a corresponding equivalent missing point in the missing output set; and therefore, the posterior probability of each element in $x_{[m]}^{sl}$ is replaced with the posterior probability of the corresponding missing output point, the posterior average of $x_{[m]}^{sl}$ is filled in the corresponding position of the missing input point, and the kernel matrix $\Phi^{sl}$ is further updated, as shown in formula (9):

$$\mu_{x_{[m],i^{sl}}^{sl}} = \int x_{[m],corr\_i}^{sl} p(x_{[m],corr\_i}^{sl} | x_{[obs]}^{sl}, \alpha, \beta_{[obs]}) dx_{[m],corr\_i}^{sl} \qquad (9)$$

wherein $i_{x_{[m]}}^{sl}=1, 2, \ldots, N_{x_{[m]}}^{sl}$, the set $x_{[m]}^{sl}$ contains $N_{x_{[m]}}^{sl}$ missing input points, $x_{[m],i^{sl}}^{sl}$ represents the $(i^{sl})^{th}$ element in $x_{[m]}^{sl}$, and $\mu_{x_{[m],i^{sl}}^{sl}}$ represents the mean posterior probability of $x_{[m],i^{sl}}^{sl}$; $x_{[m],corr\_i}^{sl}$ represents the corresponding variable of the $(i^{sl})^{th}$ missing input point in the missing output set $x_{[m]}^{sl}$; and by eliminating the integrals of $w^{sl}$ and $x_{[m]}^{sl}$, a log edge likelihood function is given, as shown in formula (10):

$$\tilde{L} = \log \int p(x_{[m]}^{sl}, x_{[obs]}^{sl} | w^{sl}, \beta_{[obs]}) p(w^{sl} | \alpha) dx_{[m]}^{sl} dw^{sl} = \qquad (10)$$
$$-\frac{1}{2}\left(N^{sl} \log 2\pi + \log|\tilde{C}| + (x^{sl})_{[obs]}^T \tilde{C}^{-1} x_{[obs]}^{sl}\right)$$

wherein a covariance matrix $\tilde{C}=\Phi_{x_{[obs]}} A^{-1} \Phi_{x_{[obs]}}^T + \beta_{[obs]}^{-1} I$, and I is a unit matrix; and the extreme values $\alpha^*$ and $\beta^*_{[obs]}$ of $\alpha$ and $\beta_{[obs]}$ are found by maximizing partial lead L, and the iterative formulae are obtained as shown in formula (11) and formula (12):

$$\alpha_{i^{sl}} = \frac{\tilde{\gamma}_{i^{sl}}}{\tilde{\mu}_{i^{sl}}^2} \qquad (11)$$

$$\beta_{[obs]}^{-1} = \frac{\|x_{[obs]}^{sl} - \Phi_{x_{[obs]}} \tilde{\mu}\|^2}{N_{yobs}^{sl} - \beta_{[obs]} Tr\left(\sum \Phi_{x_{[obs]}}^T \Phi_{x_{[obs]}}\right)} \qquad (12)$$

wherein $i^{sl}=1, 2, \ldots, N^{sl}$, $\tilde{\gamma}_i = 1 - \alpha_i \tilde{\Sigma}_{ii}$, $\tilde{\Sigma}=(A+\beta_{[obs]} \Phi_{x_{[obs]}}^T \Phi_{x_{[obs]}})^{-1}$ and $\tilde{\mu}=\beta_{[obs]} \tilde{\Sigma} \Phi_{x_{[obs]}}^T x_{[obs]}^{sl}$; and the method of the RVM model comprises the following steps:

① initializing: $\alpha=[1/(N^{sl})^2, 1/(N^{sl})^2, \ldots, 1/(N^{sl})^2]^T$, and $\beta_{[obs]}$ is initialized as the variance of 10 times $x_{[obs]}^{sl}$; and the related vector set is initialized as a set of all input samples;

② updating mean values and covariance matrices of joint posterior probabilities of $w^{sl}$ and $x_{[m]}^{sl}$;

③ updating $\alpha$ and $\beta_{[obs]}$;

④ if $\alpha_{j^{sl}} > 10^8$, removing the $(j^{sl})^{th}$ sample from the related vector set;

⑤ calculating the mean posterior probability of each element in $x_{[m]}^{sl}$, filling in the corresponding position of the missing input point, and further updating the kernel matrix $\Phi$;

⑥ calculating the value of the log edge likelihood function;

⑦ if the change of an element in $\alpha$ relative to the last iteration or the change of the value of the edge likelihood function is less than the given threshold, stopping the iterative process, thus obtaining a final forecasting model; otherwise, executing step ②;

step c: obtaining the forecast value of a future period of time based on RVM single-step iterative forecasting;

when a new input $x^{sl}_*$ is given, the value of $\beta_{[obs]}$ is replaced with $\beta^*_{[obs]}$; and the forecast distribution of the corresponding output $x^{sl}_*$ is approximately normal distribution, as shown in formula (13):

$$p(t^{sl}_*|t^{sl}_{[obs]}) \approx \int p(t^{sl}_*|x^{sl}_*, w, \beta^*_{[obs]}) p(w|t^{sl}_{[obs]}, \alpha, \beta^*_{[obs]}) dw = N(t^{sl}_*|\mu_*, \sigma_*^2) \quad (13)$$

wherein $\mu_* = \phi_*^T \mu_{[w|obs]}$, and $\sigma_*^2 = (\beta^*_{[obs]})^{-1} + \phi_*^T \tilde{\Sigma} \phi_*$ and $\phi_* = [1, K(x^{sl}_*, x^{sl}_1), K(x^{sl}_*, x^{sl}_2), \ldots, K(x^{sl}_*, x^{sl}_{N^{sl}})]^T$; $\mu_{[w|obs]}$ is the mean posterior probability of the weight vector $w^{sl}$; and then, the forecast mean value of a future period of time is a point, and the next round of forecasting will take the forecast result of the previous round as input to carry out cyclic rolling forecast;

step d: building of LSSVM data set based on incomplete data set; after the parameters $\alpha$ and b are solved, using $x^{sl}_* = \alpha K(x^{sl}, x^{sl}_*) + b$ to calculate an estimated value of the forecast quantity; therefore, inputting data containing missing points filled by moving average into the LSSVM model for training, then forecasting the data containing missing points, replacing the original values of missing points with the forecast result, and repeating the above process until the change of the values of missing points is less than the set threshold, thus completing the data updating process;

step e: obtaining the forecast value of a future period of time based on Gaussian process (GP) forecasting; after updating the missing points by LSSVM, inputting the updated data into the GP model, wherein GP is a probability model with kernel; and where the weight $w^{sl}$ and the noise $\varepsilon^{sl}$ in formula (14) obey zero-mean prior distribution:

$$p(w^{sl}) = N(w^{sl}|0, \alpha^{-1}I)$$

$$p(\varepsilon^{sl}) = N(\varepsilon^{sl}|0, \beta^{-1}) \quad (14)$$

wherein $\alpha$ and $\beta$ are hyperparameters of the weight and the noise distribution, and the output likelihood function is expressed as formula (15):

$$p(x^{sl}|\Phi, w^{sl}, \beta) = N(x^{sl}|\Phi w^{sl}, \beta^{-1}I) \quad (15)$$

according to Bayes formula, deducing the posterior distribution of the weight as shown in formula (16):

$$p(w^{sl}|x^{sl}, \Phi, \alpha, \beta) = \frac{p(x^{sl}|\Phi, w^{sl})p(w^{sl})}{p(x^{sl}|\Phi)} = N(w^{sl}|m_{N^{sl}}, \Sigma) \quad (16)$$

wherein $m_N = \beta \Sigma \Phi^T x^{sl}$ and $\Sigma = (\alpha I + \beta \Phi^T \Phi)^{-1}$; and then selecting the Gaussian kernel function and maximizing the likelihood function, thus obtaining optimal hyperparameters;

step f: algorithm selection; calculating the mean absolute percentage error (MAPE) of the validation sets obtained by the RVM algorithm and the GP algorithm respectively, selecting the algorithm with the lowest MAPE, and saving and outputting the hyperparameter values and the information of the kernel function optimized by the selected algorithm; and step g: forecasting; after real data are acquired, using the selected algorithm and the parameters thereof for forecasting.

5. The industrial energy resource operation optimization platform automatically building intelligent models and algorithms according to claim 1, wherein the scheduling method for multiple by-product gas systems is as follows:

first, according to the capacity operation states of a blast furnace gas system, a coke oven gas system and a linz-donawitz converter gas system, the balance of each system is judged with system safety indexes as constraints to give scheduling suggestions of each single-medium system; second, with the adjustable range of each single-gas medium and the load capacity of each adjustable user as constraints, the comprehensive adjustable range of multiple gas media is calculated; finally, the adjustable range for optimal scheduling is obtained by integrating the adjustable range of a pipe network and the adjustable range of multiple media; and the calculation method for the adjustable range of each stage is as follows:

(1) solving the adjustable range of a single medium wherein the adjustment of the pipe network is judged according to the state of the pipe network using is a two-stage judgment method; wherein the first stage is a short-term period, and the second stage is a long-term period; each stage is divided into three parts, the state of each part is judged, and the overall state of each stage is judged according to the state of each part, so as to judge the adjustment of the pipe network; the system adjustable range is obtained by repeatedly judging the state of the pipe network under each adjustment value; when the capacity state under this adjustment value is judged to require no adjustment, the adjustment value at this moment can be adopted; the adjustment value within the adjustment range is judged repeatedly, finally obtaining the adjustable range; and supposing that the use flow of blast furnace gas, coke oven gas and linz-donawitz converter gas is $x^s$, $y^s$ and $z^s$ respectively, the adjustable ranges is defined as $[x_1^s, x_2^s]$, $[y_1^s, y_2^s]$ and $[z_1^s, z_2^s]$ respectively;

(2) solving the adjustable range of multiple media wherein the use range of each medium within the adjustable range under the multi-media adjusting user is calculated as shown in formula (24):

$$\text{Total\_cal} = \text{bfg\_cal} \times x + \text{cog\_cal} \times y + \text{ldg\_cal} \times z \quad (24)$$

wherein Total_cal is the gross calorific value of the multi-media adjusting user, and bfg_cal, cog_cal and ldg_cal are respectively the calorific value of each gas medium; and formula (25) is obtained by the elimination method:

$$x^s = \frac{\text{Total\_cal} - (\text{cog\_cal} \times y + \text{ldg\_cal} \times z)}{\text{bfg\_cal}} \quad (25)$$

the value ranges $[x_1^{s'}, x_2^{s'}]$, $[y_1^{s'}, y_2^{s'}]$ and $[z_1^{s'}, z_2^{s'}]$ of $x^s$, $y^s$ and $z^s$ in the case of $x^s \in [y_1^s, y_2^s]$, $z^s \in [z_1^s, z_2^s]$ and $x^s \in [x_1^s, x_2^s]$ are solved, that is the adjustable range of each gas medium after multi-media adjustment is considered; and then, the final adjustable ranges $[x_1^{s''}, x_2^{s''}]$, $[y_1^{s''}, y_2^{s''}]$ and $[z_1^{s''}, z_2^{s''}]$ for optimal scheduling are obtained through interval differencing, as shown in formulae (26)-(28) respectively:

$$[x_1^{s''}, x_2^{s''}] = [x_1^s, x_2^s] - [x_1^{s'}, x_2^{s'}] \quad (26)$$

$$[y_1^{s''}, y_2^{s''}] = [y_1^s, y_2^s] - [y_1^{s'}, y_2^{s'}] \quad (27)$$

$$[z_1^{s''}, z_2^{s''}] = [z_1^s, z_2^s] - [z_1^{s'}, z_2^{s'}] \quad (28).$$

6. The industrial energy resource operation optimization platform automatically building intelligent models and algorithms according to claim 1, wherein a method for collaborative optimization and scheduling of comprehensive energy is as follows:

considering that the adjustable range of byproduct gas and the total steam demand within a forecasting period $t_0$-$t_1$ have been determined based on the aforementioned forecasting model, the energy consumption of combined heat and power sets and boilers is distributed to minimize the energy cost and maximize the comprehensive energy efficiency, and the corresponding objective functions are respectively shown in formula (29) and formula (30):

$$\min J_{co} = \sum_{i^{mf}}^{3} q_{i^{mf}}^u X_{i^{mf}} - q_{power}^g P_{total}^g - q_{steam}^g F^g \quad (29)$$

$$\max J_{effc}(KH_{steam}F^g + KH_{ele}P_{total}^g) / \Sigma_{i^{mf}=1}^3 KH_{i^{mf}} X_{i^{mf}} \quad (30)$$

wherein $J_{co}$ represents energy cost, g represents generating capacity, and u represents consumption;

$$\sum_{i^{mf}}^{3} q_{i^{mf}}^u X_{i^{mf}}$$

is the sum of consumption costs of byproduct gas and purchased coal, $q_{i^{mf}}^u$ is the unit price of the $(i^{mf})^{th}$ medium, and $i^{mf}=1, 2, 3$, respectively representing BFG, coke oven gas (COG) and coal, $X_{i^{mf}}$ a is the corresponding consumption amounts: $q_{power}^g$ and $q_{steam}^g$ respectively represent the unit price of power generation and the unit price of steam generation of a heat and power system, and $P_{total}^g$ and $F^g$ are respectively the total amount of self-generating electricity and the total amount of steam generation; $J_{effc}$ is the comprehensive energy efficiency of a heat and power set; $KH_{steam}$ and $KH_{ele}$ respectively represent conversion coefficients of total steam consumption and total power generation into standard coal; $KH_{i^{mf}}$ represents the conversion coefficient of each energy medium; and the corresponding constraint conditions are shown in formula (31):

$$\begin{cases} X_1 = 1/(1-\delta_B) \sum_{i_1=1}^{6} F_{BFG,i_1}^{BLR} & (c1) \\ X_2 = 1/(1-\delta_C) \sum_{i_1=1}^{6} F_{COG,i_1}^{BLR} & (c2) \\ X_3 = 1/(1-\delta_M) \sum_{i_2=1}^{2} F_{M,i_2}^{BLR} & (c3) \\ D_{S,i_2}^{BLR} = f_{i_2}(F_{BFG,i_2}^{BLR}, F_{COG,i_2}^{BLR}, F_{M,i_2}^{BLR}), (i_2 = 1, 2) & (c4) \\ D_{S,j_1}^{BLR} = f_{j_1}(F_{BFG,j_1}^{BLR}, F_{COG,j_1}^{BLR}), (j_1 = 3, 4, 5, 6) & (c5) \\ \sum_{i_2=1}^{2} D_{S,i_2}^{BLR} = \sum_{j_2=1}^{2} D_{T,j_2}^{ST} & (c6) \\ \sum_{i_3=1}^{4} D_{HS,i_3}^{BLR} = \sum_{j_3=3}^{4} D_{T,j_3}^{ST} & (c7) \\ D_{T,j_2}^{ST} = D_{P,j_2}^{ST} + D_{S,j_2}^{ST}, (j_2 = 1, 2) & (c8) \\ P_{total}^g = \sum_{i_3=1}^{4} P_{i_3}^{ST} & (c9) \\ F_M^u = (1-\delta_S)\left(\sum_{i_2=1}^{2} D_{S,i_2}^{ST} + \sum_{j_1=3}^{6} D_{S,j_1}^{BLR} + F^r\right) & (c10) \\ \sum_{i_3=3}^{4} D_{T,i_3}^{ST} = (1-\delta_S) \sum_{j_1=3}^{6} D_{HS,j_1}^{BLR} & (c11) \\ F^g = 1/(1-\delta_S)\left(F_M^u + \sum_{i_3=3}^{4} D_{T,i_3}^{ST}\right) & (c12) \\ Pa^L < Pa_0 + K_{pa}F^g < Pa^H & (c13) \end{cases} \quad (31)$$

wherein the constraint conditions in formula (31) can be described as follows:

c1-c3: $X_1$ and $X_2$ are respectively the total flow of BFG and the total flow of COG input of all the boilers, where $F_{FLG,i_1}^{BLR}$ and $F_{COG,i_1}^{BLR}$ are the BFG and COG consumption flow of the $i_1$th boiler, $X_3$ is the total consumption of coal, and $F_{M,i_2}^{BLR}$ is the coal consumption of the $i_2$th boiler; $\delta_B$, $\delta_C$ and $\delta_M$ are respectively the corresponding loss rates;

c4-c6: the relationship between the input and the output of each device, and $f(\bullet)$ is the corresponding fitting relationship; $D_{S,j_2}^{BLR}$ is the steam generation flow of the $i_2$th boiler of the power plant, and $D_{S,j_1}^{DBLR}$ represents the steam generation flow of the $j_1$th boiler which are supplying steam into the network separately; $D_{T,j_2}^{ST}$ is the steam consumption flow of the $j_2$th 300 MW steam turbine;

c7-c8: balance of generation and consumption of high pressure steam and medium pressure steam; $D_{HS,j_3}^{BTR}$ denotes the generation flow of the high pressure steam by the four steam supplying boilers and $D_{T,j_3}^{ST}$ means the consumption flow of a $j_3$th 25 MW steam turbine; $D_{P,j_2}^{ST}$ is the steam that used to generate power of a $j_2$th 300 MW steam turbine, and $D_{S,j_2}^{ST}$ is the corresponding extraction steam;

c9: constraints on self-generating capacity, and $P_{i_3}^{ST}$ is the power generation of the $i_3$th steam turbine;

c10-c12: balance constrains on steam pipe network, $F^r$ is the total recovery amount of waste heat, and $\delta_s$ is the loss rate of steam; $D_{S,j_1}^{BLR}$ is the steam generation flow of the $j_1$th steam supplying boiler, and $F_M^u$ is the total steam consumption flow of the steam users (without the four steam turbines); and c13: constraints on pressure of steam pipe network; $Pa^L$ and $Pa^H$ are respectively the upper limit and the lower limit of the pressure of a steam pipe network in the south area, and $Pa_0$ represents the initial state of the pressure; $K_{pa}$ is the conversion coefficient of flow to pressure; then the swarm intelligence optimization method is adopted for solution, thus obtaining a scheduling scheme with optimal economy.

7. The distributed industrial energy resource operation optimization platform automatically building intelligent models and algorithms according to claim 1, wherein an energy trend forecast method is as follows:

energy generation-consumption forecasting for aperiodic feature working conditions comprising the following specific steps:

(1) preparing data; extracting time series data of blast furnace gas (BFG) consumption flow for cold rolling of a period of time from the real-time relational database of an industrial field;

(2) acquiring variational mode decomposition (VMD) parameters optimized by the Bayesian optimization method and decomposing and reorganizing the data;

for the original series $f^{ns}(t)$, the problem of constraint variation is shown in formula (17):

$$\min_{\{u_{k^{ns}}^{ns}, \omega_{k^{ns}}^{ns}\}} \left\{ \sum_{k^{ns}=1}^{K^{ns}} \left\| \partial_t \left[ \left( \delta(t) + \frac{j^{ns}}{\pi t} \right) u_{k^{ns}}^{ns}(t) \right] e^{-j\omega_{k^{ns}} t} \right\|_2^2 \right\} \text{ s.t. } \sum_{k^{ns}} u_{k^{ns}}^{ns}(t) = f^{ns}(t) \quad (17)$$

wherein $K^{ns}$ is the number of modes, $u_{k^{ns}}^{ns}(t)$ is the $(k^{ns})^{th}$ mode, $\omega_{k^{ns}}^{ns}$ is the center frequency, and $\delta(t)$ represents Dirac distribution; and to solve the constraint variation problem of formula (17), the quadratic penalty term and the Lagrange multiplier $\lambda^{ns}$ are used to transform the formula (17) into an unconstrained problem, as shown in formula (18):

$$L(\{u_{k^{ns}}^{ns}\}, \{\omega_{k^{ns}}^{ns}\}, \lambda^{ns}) = \alpha^{ns} \sum_{k^{ns}} \left\| \partial_t \left[ \left( \delta(t) + \frac{j^{ns}}{\pi t} \right) * u_{k^{ns}}^{ns}(t) \right] e^{-j\omega_{k^{ns}} t} \right\|_2^2 + \left\| f^{ns}(t) - \sum_{k^{ns}} u_{k^{ns}}^{ns}(t) \right\|_2^2 + \left\langle \lambda^{ns}(t), f^{ns}(t) - \sum_{k^{ns}} u_{k^{ns}}^{ns}(t) \right\rangle \quad (18)$$

in order to solve the mode $u_{k^{ns}}^{ns}$ and the center frequency $\omega_{k^{ns}}^{ns}$, the problem in the formula (18) is transformed into a minimization problem and solved by an alternating direction method of multipliers, and then the optimal solutions can be expressed as formula (19) and formula (20):

$$\hat{u}_{k^{ns}}^{ns}(\omega^{ns}) = \frac{\hat{f}^{ns}(\omega^{ns}) - \sum_{j^{ns} \neq k^{ns}} \hat{u}_{j^{ns}}^{ns}(\omega^{ns}) + (\hat{\lambda}^{ns}(\omega^{ns})/2)}{1 + 2\alpha^{ns}(\omega^{ns} - \omega_{k^{ns}}^{ns})^2} \quad (19)$$

$$\omega_{k^{ns}}^{ns} = \frac{\int_0^\infty \omega^{ns} |\hat{u}_{k^{ns}}^{ns}(\omega^{ns})|^2 d\omega^{ns}}{\int_0^\infty |\hat{u}^{ns}(\omega^{ns})|^2 d\omega^{ns}} \quad (20)$$

wherein $\hat{f}_{ns}(\omega^{ns})$, $\hat{u}_{i^{ns}}^{ns}(\omega^{ns})$, $\hat{\lambda}^{ns}(\omega^{ns})$ and $u_{k^{ns}}^{ns}(\omega^{ns})$ represent Fourier transform forms of corresponding variables respectively; and after $u_{k^{ns}}^{ns}$ and $\omega_{k^{ns}}^{ns}$ are updated, the Lagrange multiplier is also updated according to formula (21):

$$\hat{\lambda}_{t+1}^{ns}(\omega^{ns}) = \hat{\lambda}_t^{ns}(\omega^{ns}) + \tau \left( \hat{f}^{ns}(\omega^{ns}) - \sum_{k^{ns}} \hat{u}_{k^{ns}}^{ns}(\omega^{ns}) \right) \quad (21)$$

then the above updating process is repeated until the convergence condition of formula (22) is satisfied:

$$\sum_{k^{ns}} \frac{\|\hat{u}_{k^{ns}}^{ns}(t+1) - \hat{u}_{k^{ns}}^{ns}(t)\|_2^2}{\|\hat{u}_{k^{ns}}^{ns}(t)\|_2} < \varepsilon^{ns} \quad (22)$$

wherein $\varepsilon^{ns}$ is a threshold satisfying the convergence condition; and a Bayesian parameter optimization process comprises two parts; first, the previous function must be selected to represent the hypothesis about the optimized function; Gauss processes are selected as a probability model for Bayesian parameter optimization; and second, an acquisition parameter for building an acquisition function from model posteriori to determine the next parameter combination to be estimated; wherein a set of hyperparameters is $X^{ns}=x^{ns}_1, x^{ns}_2, \ldots, x^{ns}_{n^{ns}}$, which has a functional relationship with the target to be optimized; for $f^{ns}(X^{ns})$ and GP is a Gaussian process model of input data $X^{ns}$ and an objective function $f^{ns}$, and $S^{ns}$ is an acquisition function; first, time series data are decomposed by complete ensemble empirical mode decomposition with adaptive noise (CEEMDAN) to obtain the number $K^{ns}_{k^{ns}}$ of VMD reserved series; for the VMD method, the decomposition number $K^{ns}=K^{ns}_{d^{ns}}+K^{ns}_{k^{ns}}$ wherein the number $K^{ns}_{d^{ns}}$ of discarded series and the balance factor $\alpha^{ns}$ are optimized by the Bayesian optimization method; and the objective function of the Bayesian optimization method is expressed as formula (23):

$$f_{obj}^{ns}(K_{d^{ns}}^{ns}, \alpha^{ns}) = e_{origin}^{ns} + e_{model}^{ns} \quad (23)$$

wherein $e_{origin}^{ns}$ represents the error between the series composed of first $K_{k^{ns}}^{ns}$ components after decomposition by the VMD method and the original series, and $e_{model}^{ns}$ is the error of VMD reorganized series in model training; and after the optimization parameters $K^{ns}$ and $\alpha^{ns}$ of VMD are obtained, the original series is decomposed adding and combining the first $K_{k^{ns}}^{ns}$ series into a new time series, and input/output samples are built by using the time series and then divided into a training set and a validation set;

(3) training a bidirectional multi-layer long short-term memory (LSTM) model;

wherein the parameters of the bidirectional multi-layer LSTM model are as follows: the input dimension, the number of LSTM layers, the number of hidden nodes of each LSTM layer, the learning rate, the number of samples of a training batch, and the parameter optimization method is grid search with early stopping, wherein the input dimension is optimized first, then the number of LSTM layers and the number of hidden nodes of each LSTM layer are optimized, and finally, the learning rate and the number of samples of a training batch are optimized; and the training steps of the LSTM model are as follows:

① determining the optimization range and granularity of the parameters, the optimization direction is decreasing the number of LSTM layers, the number of hidden nodes of each LSTM layer is decreased, and the objective function is the root-mean-square error;

②  recording errors between searches during grid search, and stopping search when the error is less than a threshold ò;
③  when optimizing the number of LSTM layers and the number of hidden nodes of each LSTM layer, setting the learning rate and the number of samples of a training batch to the maximum values to shorten the search time, and then using the optimized parameters to train the bidirectional multi-layer LSTM model, thus obtaining a forecasting model;
(4) carrying out forecasting based on the latest data acquired from the database; taking the latest 1,000 sample points, performing VMD decomposition and reorganization to reduce noise first, and then taking the first input dimension sample points as the input to forecast points at the next moment;

for the aperiodic feature time series containing missing points, the missing data are filled by cubic spline interpolation first, as shown in formula (15) and formula (16), and then a forecasting method for complete aperiodic feature data is adopted to forecast such data.

8. The distributed industrial energy resource operation optimization platform automatically building intelligent models and algorithms according to claim 1, wherein an energy trend forecast method is as follows:

forecasting of gas reserves for factor model comprising the following steps:

step 1: pre-processing data; extracting the input flow of a plurality of blast furnace gas pipe networks of a period of time and the consumption flow of each gas consumption link from the real-time relational database of an industrial field as input factors of the model, and adding the sum of the capacities at the previous moment to the input factors; and supposing that the sum of capacities at the current moment is the output value; meanwhile, normalizing all the input data and the output data; and selecting the first 70% of samples as training samples and the remaining 30% as validation samples;

step 2: building a relevance vector machine (RVM) regressive model;

step 3: building a Gaussian process (GP) regressive model;

step 4: building an LSSVM model; and step 5: after the output estimated values of the validation sets of the RVM regressive model, the GP regressive model and the LSSVM model are respectively obtained by using the validation sets, comparing the model performance by using the error evaluation index MAPE, so as to obtain the optimal model; wherein the smaller the MAPE value is, the more accurate the forecasting effect of the model is; selecting the optimal model with lowest MAPE, and forecasting the estimated value of a forecast point of a future period of time.

* * * * *